(12) United States Patent
Okada et al.

(10) Patent No.: US 12,641,424 B2
(45) Date of Patent: May 26, 2026

(54) COMMUNICATION ANALYSIS SYSTEM, ANALYSIS METHOD, AND RECORDING MEDIUM

(71) Applicant: Panasonic Intellectual Property Corporation of America, Torrance, CA (US)

(72) Inventors: Hiroyuki Okada, Osaka (JP); Tatsumi Oba, Chiba (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 300 days.

(21) Appl. No.: 18/598,799

(22) Filed: Mar. 7, 2024

(65) Prior Publication Data

US 2024/0214809 A1 Jun. 27, 2024

Related U.S. Application Data

(63) Continuation of application No. PCT/JP2022/033444, filed on Sep. 6, 2022.

(30) Foreign Application Priority Data

Sep. 16, 2021 (JP) ................................. 2021-151133

(51) Int. Cl.
*H04W 12/00* (2021.01)
*H04L 41/16* (2022.01)
(Continued)

(52) U.S. Cl.
CPC ............. *H04W 12/08* (2013.01); *H04L 41/16* (2013.01); *H04W 76/10* (2018.02)

(58) Field of Classification Search
CPC ...... H04W 12/08; H04W 76/10; H04L 41/16; H04L 63/101; H04L 63/1408;
(Continued)

(56) References Cited

U.S. PATENT DOCUMENTS

| | | | | |
|---|---|---|---|---|
| 11,954,656 | B1* | 4/2024 | Garner, IV | ............... G07G 1/00 |
| 2015/0067764 | A1* | 3/2015 | Kim | ...................... H04L 63/101 |
| | | | | 726/1 |

(Continued)

FOREIGN PATENT DOCUMENTS

| | | |
|---|---|---|
| JP | 2015/050767 | 3/2015 |
| WO | 2019/225710 | 11/2019 |

OTHER PUBLICATIONS

Anderson, "Protect Critical Infrastructure Systems with Whitelisting", SANS Institute, Jul. 30, 2014, pp. 1-20.

(Continued)

*Primary Examiner* — Ping Y Hsieh
(74) *Attorney, Agent, or Firm* — Greenblum & Bernstein, P.L.C.

(57) ABSTRACT

A communication analysis system includes: an information obtainer that obtains past communication information indicating communication performed by a monitoring target; a prediction target link extractor that extracts, based on the past communication information obtained, an unestablished communication link of communication that has not been established in the past communication information, the unestablished communication link being at least one communication link that is a prediction target; a link confidence level calculator that calculates a confidence level indicating the likelihood that the unestablished communication link extracted will be established as a normal communication link in the future; and a NW graph creator that creates a NW graph, in which the unestablished communication link and information regarding the unestablished communication link are mapped, as graph information for determining whether to add the communication link to a whitelist, using the unestablished communication link extracted, the confidence (Continued)

level calculated, and the past communication information obtained.

12 Claims, 41 Drawing Sheets

(51) Int. Cl.
H04W 12/08 (2021.01)
H04W 76/10 (2018.01)

(58) Field of Classification Search
CPC ..... H04L 63/1425; H04L 12/22; H04L 12/66; H04L 43/045; G06N 20/00
See application file for complete search history.

(56) References Cited

U.S. PATENT DOCUMENTS

| | | | |
|---|---|---|---|
| 2020/0169482 A1* | 5/2020 | Narayan | H04L 43/20 |
| 2021/0203660 A1* | 7/2021 | Nagayama | H04L 63/101 |
| 2022/0012076 A1* | 1/2022 | Natarajan | G06Q 10/40 |
| 2022/0103592 A1* | 3/2022 | Semel | H04L 63/1408 |
| 2022/0222122 A1* | 7/2022 | Jasleen | G06N 20/00 |

OTHER PUBLICATIONS

Oba et al., "Graph Convolutional Network-based Suspicious Communication Pair Estimation for Industrial Control Systems", arXiv:2007.10204v1 [cs.CR], Jul. 17, 2020, pp. 1-9.
International Search Report issued in International Pat. Appl. No. PCT/JP2022/033444, dated Nov. 29, 2022, along with an English language translation thereof.

* cited by examiner

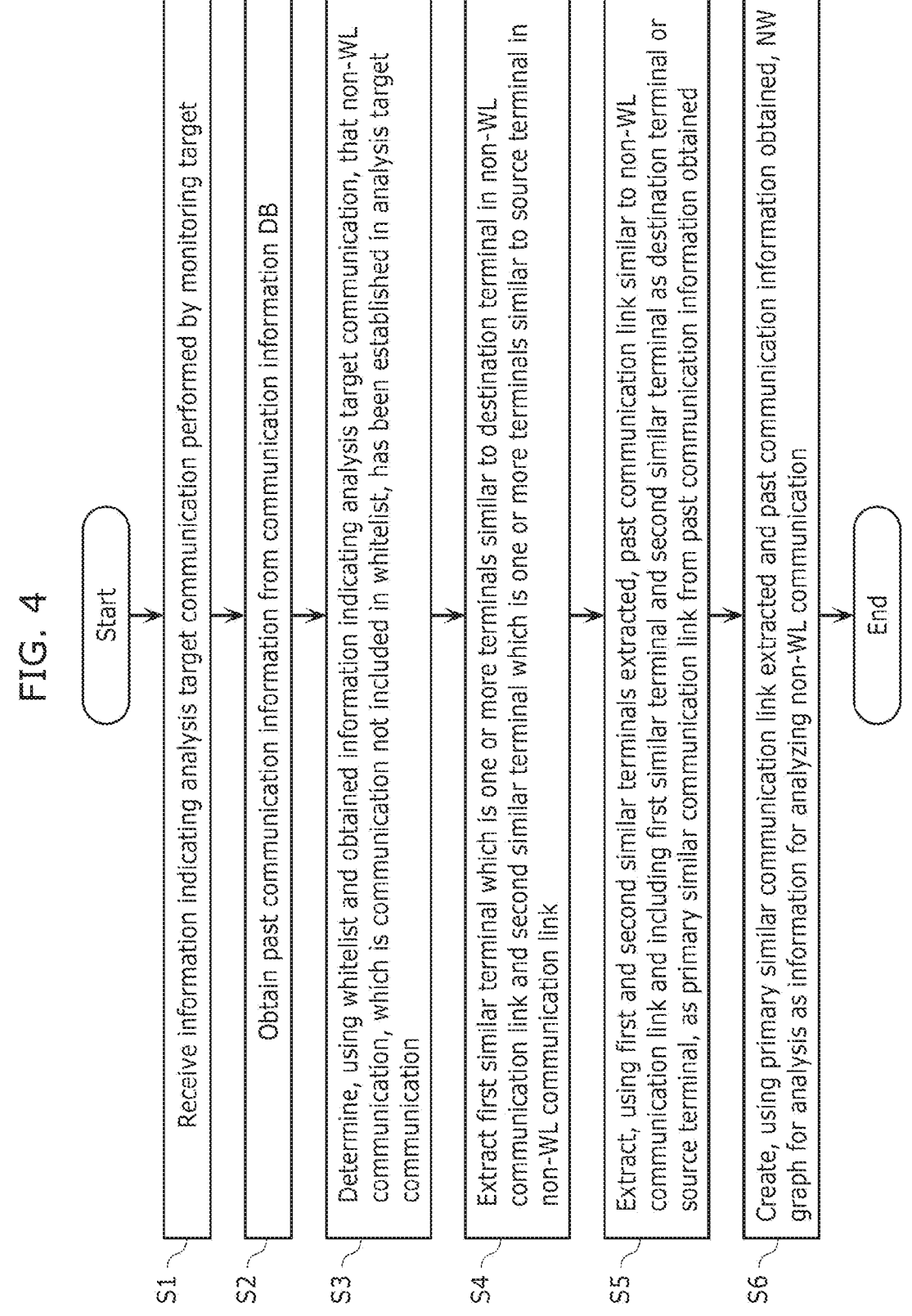

Start

S1 — Receive information indicating analysis target communication performed by monitoring target S2 — Obtain past communication information from communication information DB S3 — Determine, using whitelist and obtained information indicating analysis target communication, that non-WL communication, which is communication not included in whitelist, has been established in analysis target communication S4 — Extract first similar terminal which is one or more terminals similar to destination terminal in non-WL communication link and second similar terminal which is one or more terminals similar to source terminal in non-WL communication link S5 — Extract, using first and second similar terminals extracted, past communication link similar to non-WL communication link and including first similar terminal and second similar terminal as destination terminal or source terminal, as primary similar communication link from past communication information obtained S6 — Create, using primary similar communication link extracted and past communication information obtained, NW graph for analysis as information for analyzing non-WL communication End S421    Obtain learning model S422    Obtain one non-WL communication link S423    Calculate degree of similarity S424    Extract source similar terminal/ destination similar terminal

FIG. 8B

Extraction condition (primary similar communication extraction condition)

| Src IP | Src Port | Dst IP | Dst Port | Protocol | Method | Target | Response |
|---|---|---|---|---|---|---|---|
| Y/terminal similar to Y | * | X/terminal similar to X | 80/8080/443 | http/s | * | * | * |

FIG. 8C

Past communication information

| time stamp | Src IP | Src Port | Dst IP | Dst Port | Protocol | Method | Target | Response |
|---|---|---|---|---|---|---|---|---|
| ts1 | Y | 40000 | X' | 80 | http | POST | /C/D/E.txt | 200 |
| ts2 | Y' | 40001 | X'' | 8080 | http | GET | /A/F.csv | 200 |
| ... | | | | | | | | |

FIG. 10A

| time stamp | Src IP | Src Port | Dst IP | Dst Port | Protocol | Method | Target | Response |
|---|---|---|---|---|---|---|---|---|
| ts1 | X | 50001 | A | 445 | smb | OPEN | /A/B.txt | 0 |
| ts2 | Y | 50002 | B | 21 | ftp | STOR | /C/D.csv | 226 |
| ts3 | C | 50003 | Y | 135 | dce-rpc | - | IWbemService:: ExecMethod | - |
| ts4 | D | 50004 | X | 502 | modbus | read coils | 3048 | - |
| ... | | | | | | | | |

Terminal Y

Terminal X

Non-WL communication

FIG. 10B

Extraction condition (secondary similar communication extraction condition)

| no. | Src IP | Src Port | Dst IP | Dst Port | Protocol | Method | Target | Response |
|---|---|---|---|---|---|---|---|---|
| 1 | Terminal similar to X | * | A/terminal similar to A | 445 | smb | * | * | * |
| 2 | Terminal similar to Y | * | B/terminal similar to B | 21 | ftp | * | * | * |
| 3 | C/terminal similar to C | * | Terminal similar to Y | 135 | dce-rpc | * | * | * |
| 4 | D/terminal similar to D | * | Terminal similar to X | 502 | modbus | * | * | * |
| ... | | | | | | | | |

FIG. 10C

Past communication information

| time stamp | Src IP | Src Port | Dst IP | Dst Port | Protocol | Method | Target | Response |
|---|---|---|---|---|---|---|---|---|
| ts1 | X' | 49600 | A | 445 | smb | OPEN | /A/C.txt | C |
| ts2 | C' | 49601 | Y' | 135 | dce-rpc | - | WbemServices::ExecMethod | - |
| ... | | | | | | | | |

FIG. 11

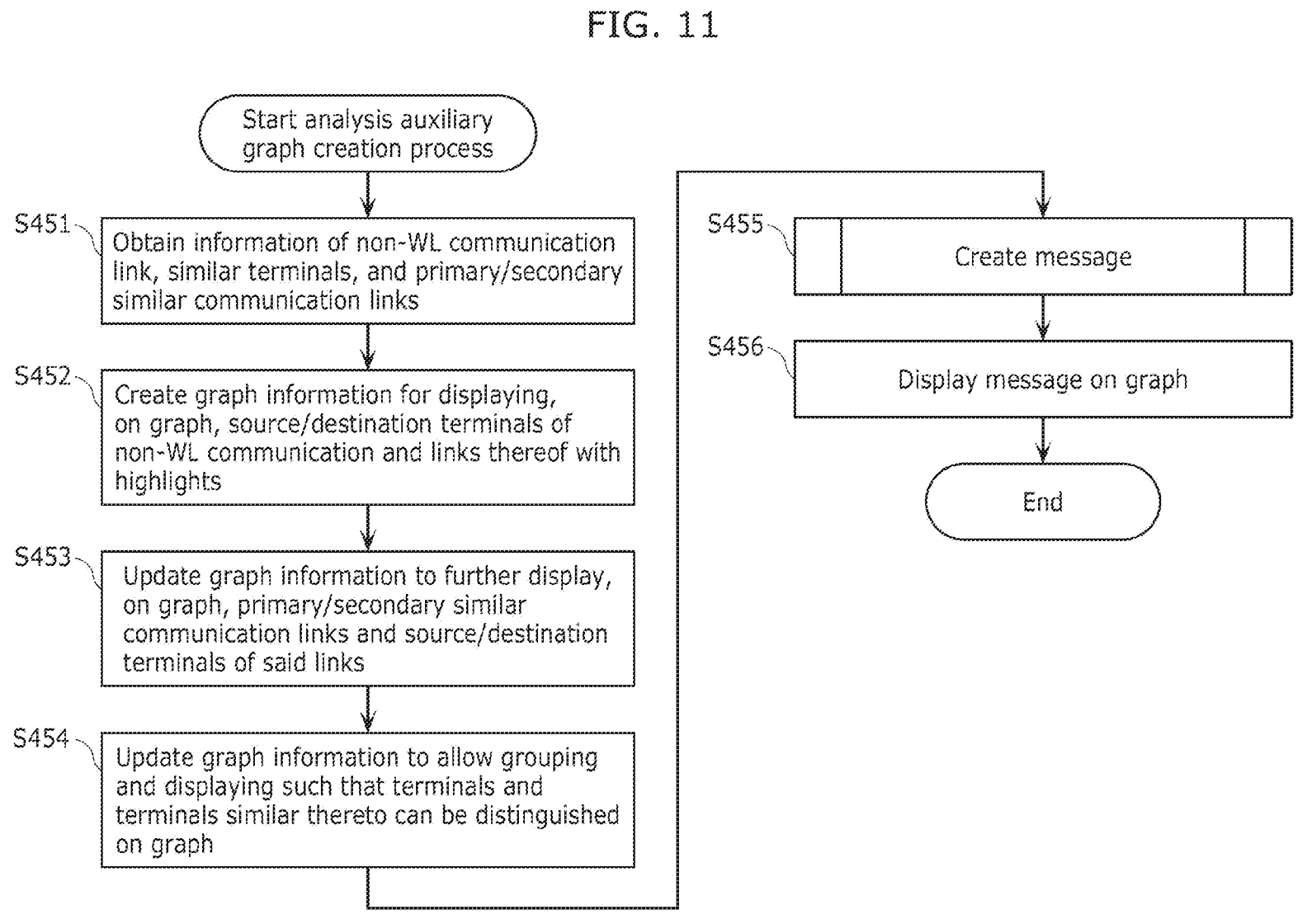

Start analysis auxiliary graph creation process

S451 — Obtain information of non-WL communication link, similar terminals, and primary/secondary similar communication links S452 — Create graph information for displaying, on graph, source/destination terminals of non-WL communication and links thereof with highlights S453 — Update graph information to further display, on graph, primary/secondary similar communication links and source/destination terminals of said links S454 — Update graph information to allow grouping and displaying such that terminals and terminals similar thereto can be distinguished on graph S455 — Create message S456 — Display message on graph End

FIG. 20

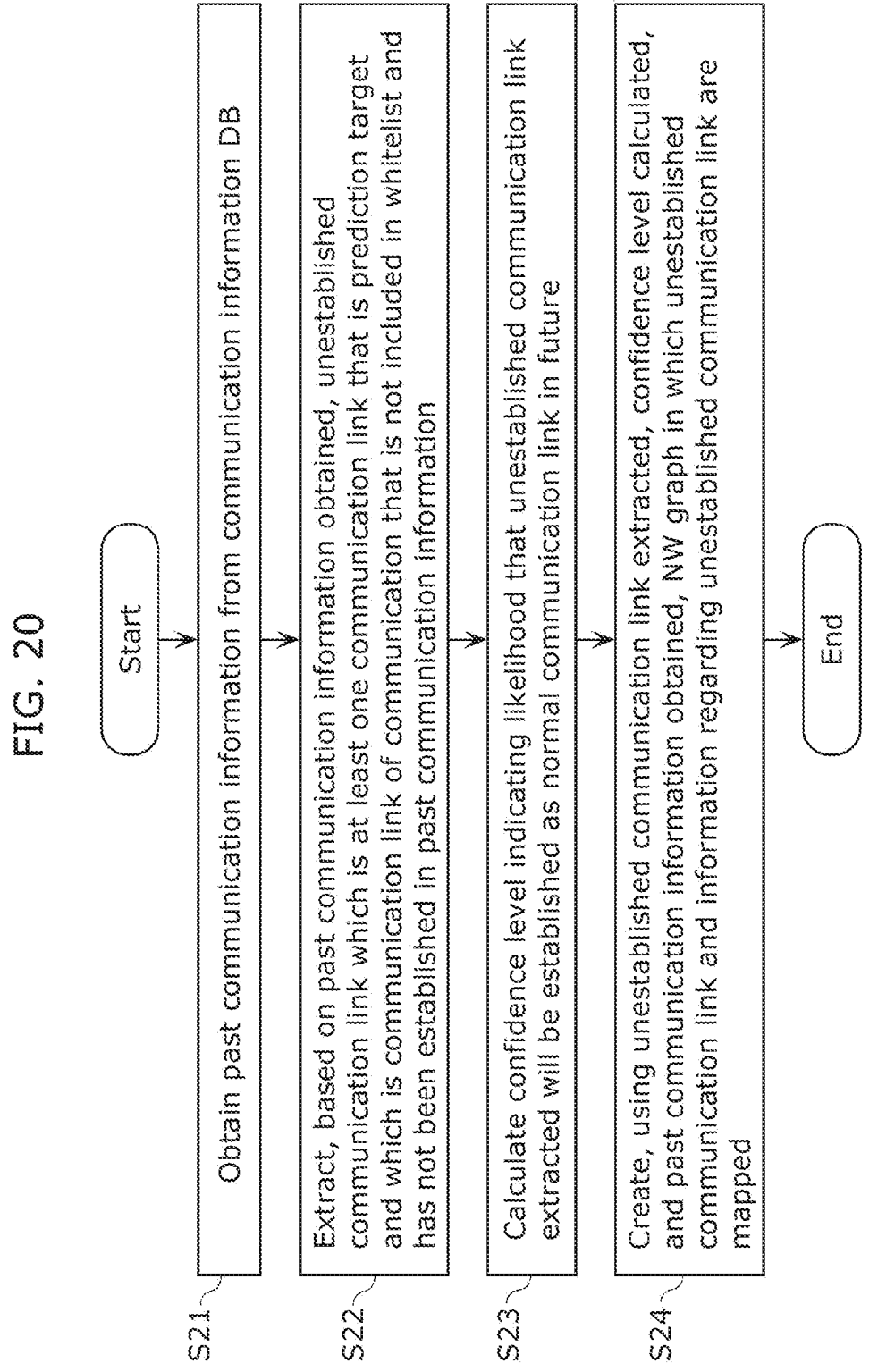

Start

S21 — Obtain past communication information from communication information DB

S22 — Extract, based on past communication information obtained, unestablished communication link which is at least one communication link that is prediction target and which is communication link of communication that is not included in whitelist and has not been established in past communication information S23 — Calculate confidence level indicating likelihood that unestablished communication link extracted will be established as normal communication link in future S24 — Create, using unestablished communication link extracted, confidence level calculated, and past communication information obtained, NW graph in which unestablished communication link and information regarding unestablished communication link are mapped End

FIG. 21

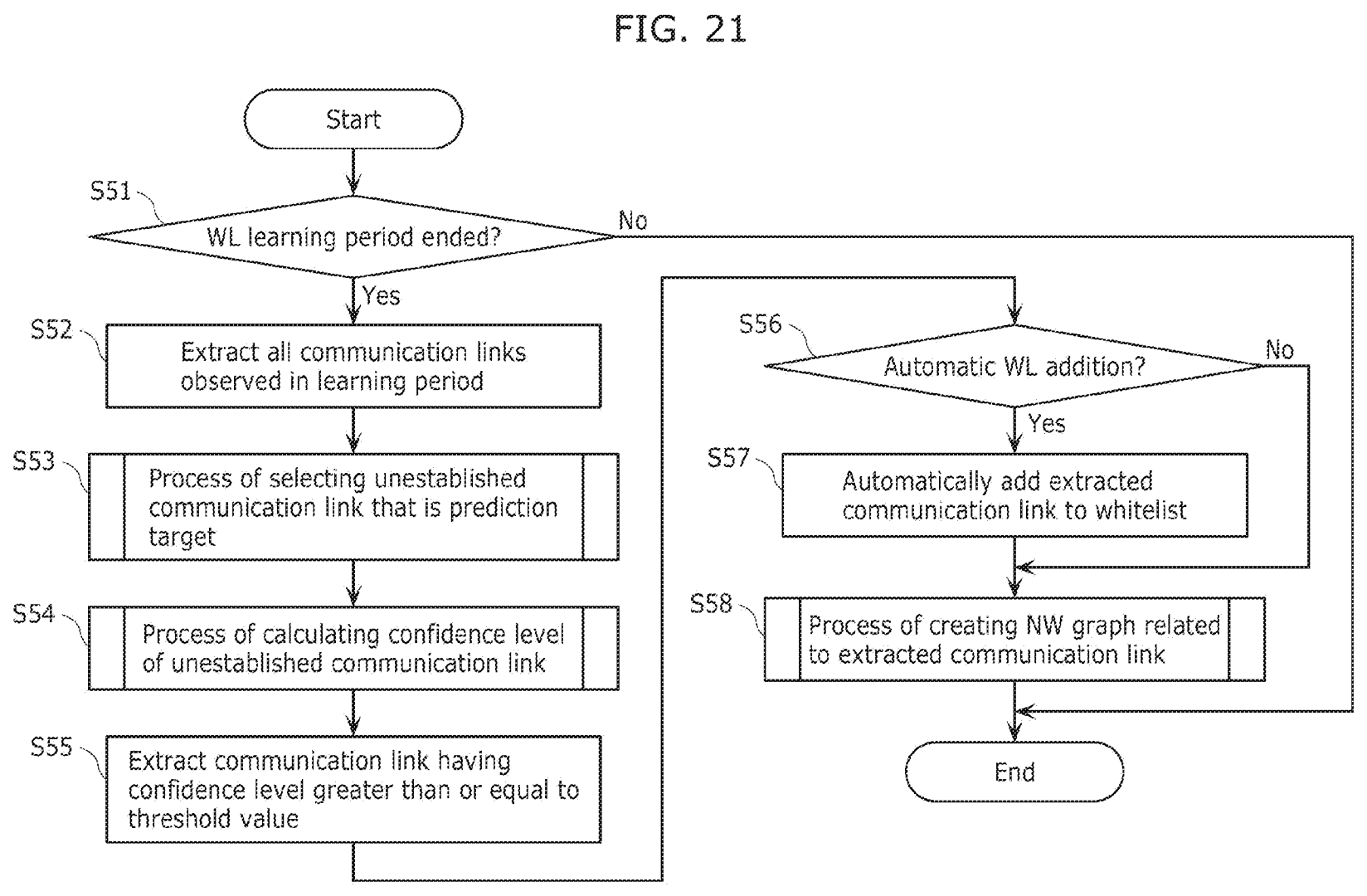

Start

S51 — WL learning period ended?

No

Yes

S52 — Extract all communication links observed in learning period

S53 — Process of selecting unestablished communication link that is prediction target S54 — Process of calculating confidence level of unestablished communication link S55 — Extract communication link having confidence level greater than or equal to threshold value S56 — Automatic WL addition?

No

Yes

S57 — Automatically add extracted communication link to whitelist

S58 — Process of creating NW graph related to extracted communication link

End

Prediction target list

| Src IP | Protocol | Dst IP |
|--------|----------|--------|
| A | smb | B |
| C | mssql | D |
| B | ftp | D |
| ... | | |

Start confidence level calculation process

S5401 — Obtain learning model

S5402 — Calculate confidence level for each communication link included in prediction target list End Prediction target list

| Src IP | Protocol | Dst IP | Confidence level (Score) |
|--------|----------|--------|--------------------------|
| A | smb | B | 80 |
| C | mssql | D | 60 |
| B | ftp | D | 40 |
| ... | | | |

FIG. 26

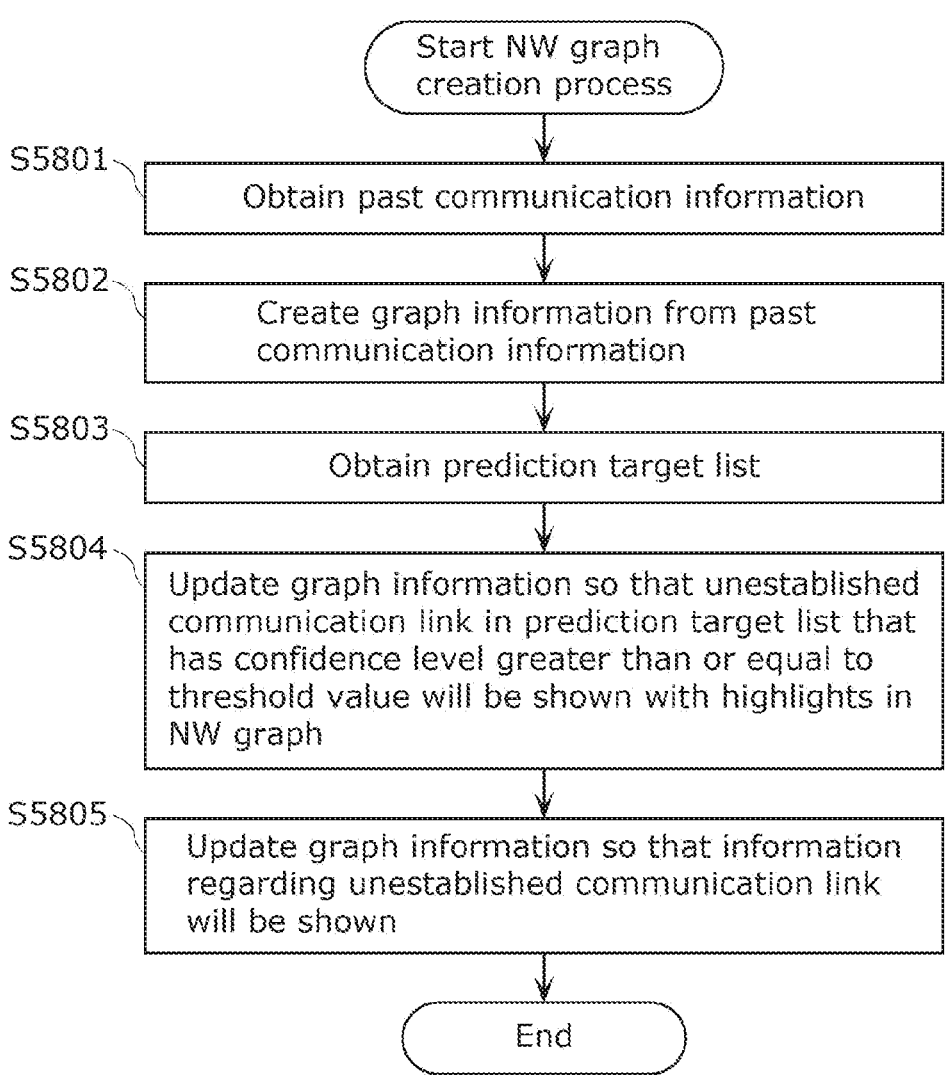

Start NW graph creation process

S5801 — Obtain past communication information

S5802 — Create graph information from past communication information

S5803 — Obtain prediction target list

S5804 — Update graph information so that unestablished communication link in prediction target list that has confidence level greater than or equal to threshold value will be shown with highlights in NW graph S5805 — Update graph information so that information regarding unestablished communication link will be shown End

FIG. 27

Threshold value determination result

| Src IP | Protocol | Dst IP | Confidence level (Score) | At least threshold value |
|--------|----------|--------|--------------------------|--------------------------|
| A | smb | B | 80 | O |
| C | mssql | D | 60 | O |
| B | ftp | D | 40 | X |
| ... | | | | |

| IP address | Name of equipment |  |
|---|---|---|
| 192.168.1.1 | Control server (main) | … |
| … |  |  |
| 192.168.1.5 | Power equipment controller |  |
| 192.168.1.6 | Lighting equipment controller (1F) |  |
| … |  |  |

COMMUNICATION ANALYSIS SYSTEM, ANALYSIS METHOD, AND RECORDING MEDIUM

CROSS REFERENCE TO RELATED APPLICATIONS

This is a continuation application of PCT International Application No. PCT/JP2022/033444 filed on Sep. 6, 2022, designating the United States of America, which is based on and claims priority of Japanese Patent Application No. 2021-151133 filed on Sep. 16, 2021. The entire disclosures of the above-identified applications, including the specifications, drawings and claims are incorporated herein by reference in their entirety.

FIELD

The present disclosure relates to communication analysis systems, analysis methods, and recording media for analyzing whether communication not included in a whitelist is anomalous.

BACKGROUND

Conventionally, a unique communication standard has been used in a communication network (NW) in an industrial control system (ICS) that manages and controls equipment such as factory facilities. In recent years, in order to retrofit the ICS using artificial intelligence and improve convenience and versatility thereof, an open communication standard has come into use for the NW in the ICS.

However, changing the configuration of equipment included in the ICS and updating said equipment are not easy, leading to insufficient security measures. Therefore, susceptibility to cyber-attacks is high, and the number of damages is growing year after year.

Furthermore, in the ICS, various terminals are connected in the same segment, and terminals belonging to the same segment perform less communication with terminals outside the segment, but perform more communication within the segment using various protocols. In other words, in the ICS, since predetermined processes are performed, closed communication between specific terminals tends to be performed. Thus, the terminals used in the ICS have communication characteristics different from those of terminals used in a typical office or the like.

In the ICS, because of such communication characteristics, anomaly detection using a whitelist is considered as effective and is widely used (for example, refer to Non Patent Literature (NPL) 1). Thus, by using the whitelist, it is possible to detect communication that has never been established.

On the other hand, when a whitelisting period, specifically, a period for obtaining past communication to be used to create a whitelist, is not sufficient, meaning that whitelisting is not sufficient, there is a risk that numerous false detections may occur in normal communication in which whitelisting is unsuccessful. This may result in a burden on an analyst at a security operation center for analyzing alerts, which may lead to a failure to properly handle a cyber-attack to be dealt with.

In this regard, there has been disclosed a method for presenting the priority level of an alert to be dealt with by learning a status of communication of a terminal through machine learning and quantifying an anomaly level of a communication link in communication not included in a whitelist (for example, refer to NPL 2). The communication link indicates a combination of IP addresses (or MAC address information) specifying terminals that are a source and a destination of transmission, a protocol to be used in the exchange between these terminals, and the category of information.

CITATION LIST

Non Patent Literature

NPL 1: Dwight Anderson (2014). "Protect Critical Infrastructure Systems With Whitelisting"

NPL 2: Tatsumi Oba, et al. (2020). "Graph Convolutional Network-based Suspicious Communication Pair Estimation for Industrial Control Systems"

SUMMARY

Technical Problem

However, only with the priority level of an alert presented such as that disclosed in NPL 2, the analyst may fail to learn how to actually handle an issue and even when alerts to be handled are ranked in order of priority according to priority levels, it may not be possible to streamline the task of analysis that is conducted by the analyst.

The present disclosure is conceived in view of the above-described circumstances and provides a communication analysis system, etc., capable of easily analyzing whether communication not included in a whitelist is anomalous.

Solution to Problem

In order to solve the aforementioned problem, a communication analysis system according to one aspect of the present disclosure is a communication analysis system for analyzing communication performed in a network of a plurality of terminals in a predetermined environment, the plurality of terminals being a monitoring target, the communication analysis system including: a whitelist created by learning communication established at the monitoring target; a communication information DB that holds past communication information including information indicating past communication established at the monitoring target; and a communication link prediction graph creation system that creates graph information for determining whether to add, to the whitelist, a communication link of communication that is not included in the whitelist and has not been established in the past communication information. The communication link prediction graph creation system includes: an information obtainer that obtains the past communication information from the communication information DB; a prediction target link extractor that extracts an unestablished communication link of communication that has not been established in the past communication information based on the past communication information obtained by the information obtainer, the unestablished communication link including one or more communication links each being a prediction target; a link confidence level calculator that calculates a confidence level indicating a likelihood that the unestablished communication link extracted by the prediction target link extractor will be established as a normal communication link in the future; and a NW graph creator that creates a NW graph as the graph information for determining whether to add the communication link to the whitelist, using the unestablished communication link extracted by the prediction target link extractor, the confidence level calculated by the link confidence level calculator, and the past communication information obtained by the information obtainer, the NW graph being a graph in which the unestablished communication link and information regarding the unestablished communication link are mapped.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

According to the present disclosure, it is possible to provide a communication analysis system, etc., capable of easily analyzing whether communication not included in a whitelist is anomalous.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A is a block diagram illustrating one example of the configuration of an analysis auxiliary graph creation system according to Embodiment 1.

FIG. 2B is a block diagram illustrating minimum elements of the analysis auxiliary graph creation system illustrated in FIG. 2A.

FIG. 4 is a flowchart illustrating an operation in an analysis method performed by a communication analysis system according to Embodiment 1.

FIG. 8B is a diagram illustrating one example of a primary similar communication link extraction process according to Embodiment 1.

FIG. 8C is a diagram illustrating one example of a primary similar communication link extraction process according to Embodiment 1.

FIG. 10A is a diagram illustrating one example of a secondary similar communication link extraction process according to Embodiment 1.

FIG. 10B is a diagram illustrating one example of a secondary similar communication link extraction process according to Embodiment 1.

FIG. 10C is a diagram illustrating one example of a secondary similar communication link extraction process according to Embodiment 1.

FIG. 11 is a flowchart illustrating one example of the analysis auxiliary graph creation process illustrated in FIG. 5.

FIG. 20 is a flowchart illustrating an operation in an analysis method performed by a communication analysis system according to Embodiment 2.

FIG. 21 is a flowchart illustrating the overall process of a communication link prediction graph creation system according to Embodiment 2.

FIG. 26 is a flowchart illustrating one example of a prediction NW graph creation process illustrated in FIG. 21.

FIG. 27 is a diagram illustrating one example of unestablished communication links in a prediction target list indicated in FIG. 26 that are to be shown with highlights in a NW graph.

FIG. 29 is a diagram illustrating another example of screen information to be displayed on a screen for analysis of unestablished communication links according to Embodiment 2.

FIG. 32 is a diagram illustrating a description example of a construction contract document for a building.

DESCRIPTION OF EMBODIMENTS

Figure 1:
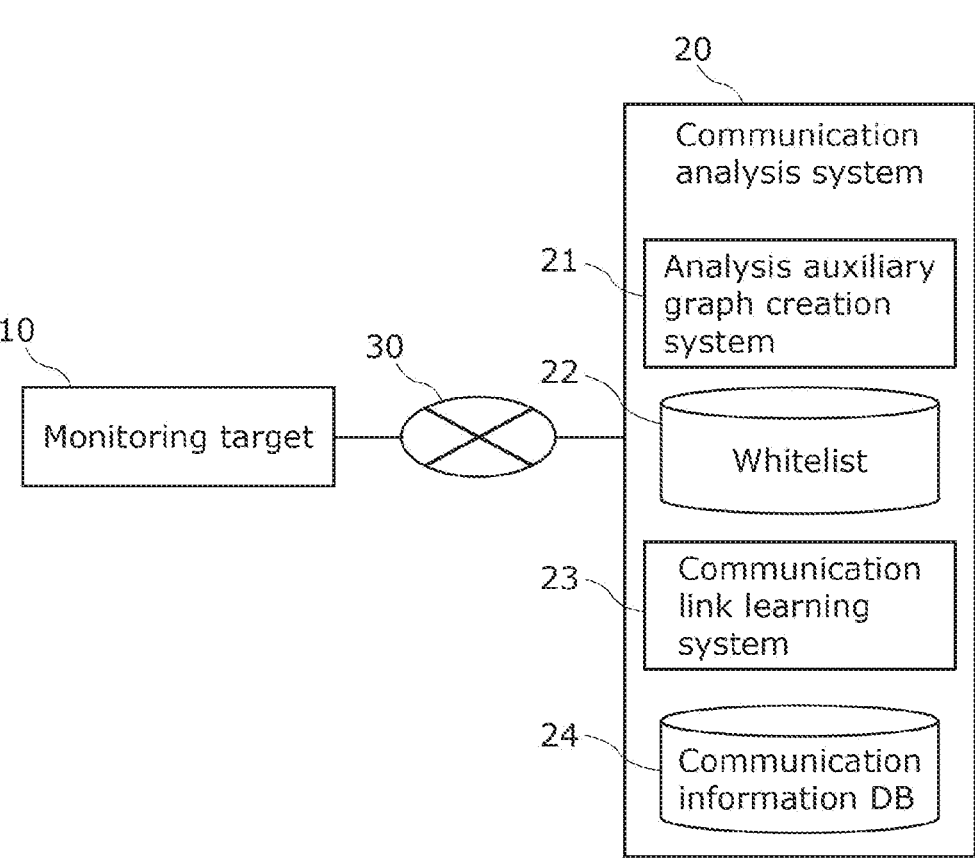
FIG. 1 is a diagram illustrating an overall configuration including a communication analysis system according to Embodiment 1.

Underlying Knowledge Forming Basis of the Present Disclosure

In an ICS, each terminal to be connected to a NW is connected to a NW that is used in a typical office or the like and, unlike a terminal operated by a person, often has a role that suits an ICS environment and is automated to operate according to operational settings for said role.

Examples of the ICS environment include a factory field network. In the factor field network, there is an actuator that operates according to each workflow inside a factory. The actuator receives an instruction transmitted from supervisory control and data acquisition (SCADA). Each programmable logic controller (PLC) converts digital signals, analog signals, and the like to control the actuator.

Furthermore, the SCADA collects equipment information from a plurality of sensors, records the equipment information, transmits information to a human machine interface (HMI), and visualizes data so that an on-site manager can grasp a situation on the HMI.

Thus, in the ICS, there is a tendency that among the terminals, specific terminals perform only communication required to execute a predetermined process, meaning that established communication is often limited. In view of such a background, creating a whitelist that has learned specific communication between the terminals is considered as an effective countermeasure against cyber-attacks in the ICS.

Thus, first, the inventors attempted to put anomaly detection using a whitelist into practice in an actual ICS environment. However, without knowing that there is normal communication of a rare event or the like, specifically, normal communication that is established at a long interval, the inventors implemented the process of training the whitelist in a learning period that does not include such a long interval. This resulted in numerous false detections in which normal communication that is established at a long interval is determined as communication links (also referred to as non-WL communication links) of communication not included in the whitelist (also referred to as non-WL communication).

The inventors analyzed these false detections and found that communication that is substantially the same as the falsely detected communication has been established in the past at another terminal having the same role as that of a terminal that performs the falsely detected communication in said ICS environment.

In this regard, the inventors have conceived of, when a non-WL communication link is established, presenting, to the analysist, information about communication similar to the non-WL communication link and a terminal similar to a terminal of the non-WL communication link. Furthermore, the inventors have discovered that with this information, the analyst can check whether the established non-WL communication link is communication that should not be established in normal operation, allowing alerts of these false detections to be more efficiently addressed.

Furthermore, in the case where the whitelist is used on-site, learning of the whitelist may become insufficient because a learning period in which learning of the whitelist can become sufficient varies from site to site. If a whitelist that has not undergone sufficient learning is put into operation, a normal communication link may be falsely detected as a non-WL communication link and moreover, a large number of such false detections may occur. Assume that the use of a whitelist in the operation begins while the training thereof is still insufficient; when non-WL communication that is actually normal is established, an analyst is supposed to manually analyze said non-WL communication and add said non-WL communication to the whitelist, which may impose a burden on the analyst and lead to a failure to properly handle a cyber-attack to be dealt with.

In this regard, the inventors discovered that when an unestablished communication link that had not been established in the learning period, but is likely to be a normal communication link is added to a whitelist before the whitelist is put into operation, the whitelist can be efficiently used in operation, and it is possible to reduce false detections that occur after the whitelist is applied. Furthermore, the inventors discovered that by efficiently using the whitelist in operation in this manner, it is possible to easily check the validity of non-WL communication that is established while the whitelist is used in operation, allowing alerts to be more efficiently addressed.

As a result of the foregoing, the inventors have arrived at a communication analysis system, etc., described below.

Specifically, a communication analysis system according to one aspect of the present disclosure is a communication analysis system for analyzing communication performed in a network of a plurality of terminals in a predetermined environment, the plurality of terminals being a monitoring target, the communication analysis system including: a whitelist created by learning communication established at the monitoring target; a communication information DB that holds past communication information including information indicating past communication established at the monitoring target; and a communication link prediction graph creation system that creates graph information for determining whether to add, to the whitelist, a communication link of communication that is not included in the whitelist and has not been established in the past communication information. The communication link prediction graph creation system includes: an information obtainer that obtains the past communication information from the communication information DB; a prediction target link extractor that extracts an unestablished communication link of communication that has not been established in the past communication information based on the past communication information obtained by the information obtainer, the unestablished communication link including one or more communication links each being a prediction target; a link confidence level calculator that calculates a confidence level indicating a likelihood that the unestablished communication link extracted by the prediction target link extractor will be established as a normal communication link in the future; and a NW graph creator that creates a NW graph as the graph information for determining whether to add the communication link to the whitelist, using the unestablished communication link extracted by the prediction target link extractor, the confidence level calculated by the link confidence level calculator, and the past communication information obtained by the information obtainer, the NW graph being a graph in which the unestablished communication link and information regarding the unestablished communication link are mapped.

In this manner, before whitelist 22 that has completed learning is put into operation, it is possible to create the graph information for assisting the process of analyzing a communication link predicted to be established as a normal communication link in the future among communication links that have not been established in the learning period, and adding the communication link to whitelist 22. Thus, an unestablished communication link that had not been established in the learning period, but is likely to be a normal communication link can be added to whitelist 22 before whitelist 22 is put into operation, allowing for a reduction in false detections that may occur during the operation. When whitelist 22 is efficiently used in the operation as just described, an analyst can easily check whether non-WL communication that is established during the operation is anomalous.

Furthermore, for example, the communication link prediction graph creation system may further include: a NW graph display that displays, on a screen, the NW graph created by the NW graph creator; and a WL change operator that adds the communication of the unestablished communication link to the whitelist according to an instruction from a user.

With this, the unestablished communication link predicted to be established as a normal communication link in the future can be added to the whitelist according to a user instruction provided from a user to the screen.

Furthermore, for example, the NW graph display may display, on the screen, a scrollbar for performing an operation to adjust a threshold value of a confidence level of the unestablished communication link, and display, on the screen, the NW graph in which the unestablished communication link and the information regarding the unestablished communication link that are shown have been updated according to the threshold value changed by the operation performed by the user on the scrollbar.

In this manner, the display range of the unestablished communication link and the information regarding the unestablished communication link can be adjusted by the operation on the scrollbar, and thus it may be possible to easily analyze the unestablished communication link predicted to be established as a normal communication link in the future.

Furthermore, for example, the NW graph displayed on the screen may include a list of the one or more communication links included in the unestablished communication link. The NW graph display may display, on the screen, the list, a checkbox that allows the user to select whether to add each of the one or more communication links in the list to the whitelist, and a button for adding, to the whitelist, a communication link selected by using the checkbox among the one or more communication links.

Thus, the user can add the unestablished communication link predicted to be established as a normal communication link in the future to the whitelist by a simple operation.

Furthermore, for example, the communication link prediction graph creation system may further include: a WL automatic addition determiner that determines whether the confidence level calculated by the link confidence level calculator is greater than or equal to a threshold value, to determine whether to add the communication of the unestablished communication link to the whitelist, and when the WL automatic addition determiner determines that the confidence level is greater than or equal to the threshold value, the WL automatic addition determiner may instruct the WL change operator to add the communication of the unestablished communication link having the confidence level greater than or equal to the threshold value to the whitelist, and cause the WL change operator to add the communication of the unestablished communication link having the confidence level greater than or equal to the threshold value to the whitelist.

Thus, an unestablished communication link that had not been established in the learning period, but is likely to be a normal communication link can be automatically added to whitelist 22 before whitelist 22 is put into operation, allowing for a reduction in false detections that may occur during the operation.

Furthermore, for example, when the user selects one communication link among the one or more communication links included in the unestablished communication link in the NW graph displayed on the screen, the NW graph display may display detailed information of the one communication link selected and detailed information of past communication that is included in the past communication information and is similar to the one communication link selected, side by side on the screen as comparison information for determining whether to add, to the whitelist, the one communication link selected.

In this manner, the comparison information can be shown, and thus it may be possible to easily analyze the unestablished communication link predicted to be established as a normal communication link in the future.

Furthermore, for example, the prediction target link extractor may calculate a degree of similarity between the plurality of terminals using a machine learning model that has been trained, and extract the unestablished communication link using the degree of similarity calculated and the past communication information.

In this manner, when the trained machine learning model is used, the degree of similarity between the terminals can be accurately calculated, and the unestablished communication link can be extracted using the calculated degree of similarity. Accordingly, a NW graph created using the unestablished communication link that has been extracted can be used, allowing a user to easily analyze the unestablished communication link predicted to be established as a normal communication link in the future.

Furthermore, for example, the link confidence level calculator may calculate the confidence level of the unestablished communication link using the machine learning model.

Furthermore, for example, the machine learning model may be generated by learning the communication performed by the monitoring target, using link prediction or a node classification algorithm that allows creation of a vector of a fixed dimension for each terminal that has appeared in the communication and allows creation of a matrix of a fixed size for each communication type that has appeared in the communication.

Furthermore, for example, the machine learning model may include one of LinkFeat, COMPosition-based multi-relational Graph Convolutional Networks (COMPGCN), Relational Graph Convolutional Network (R-GCN), Dist-Mult, Translating Embeddings for Modeling Multi-relational Data (TransE), Holographic Embeddings of Knowledge Graphs (HolE), or Complex Embeddings for Simple Link Prediction (ComplEx).

Note that each exemplary embodiment described below shows one specific example of the present disclosure. The numerical values, shapes, structural elements, steps, the processing order of the steps etc., shown in the following exemplary embodiment are mere examples, and are not intended to limit the present disclosure. Among the structural elements in the following exemplary embodiment, structural elements not recited in any one of the independent claims will be described as optional structural elements. In every exemplary embodiment, various features can be combined.

Embodiment 1

Hereinafter, communication analysis system 20 according to Embodiment 1 will be described with reference to the drawings.

1 Overall Configuration

FIG. 1 is a diagram illustrating an overall configuration including communication analysis system 20 according to Embodiment 1.

As illustrated in FIG. 1, communication analysis system 20 is connected via network 30 to monitoring target 10 that is remotely located. Communication analysis system 20 analyzes communication performed in a network of a plurality of terminals in a predetermined environment which are monitoring target 10. In the present exemplary embodiment, communication analysis system 20 sequentially collects communication information of a network for monitoring target 10 via network 30, and learns communication content, conducts various analyses such as anomaly detection, and stores information. Details will be described later.

Monitoring target 10, which is a plurality of terminals in a predetermined environment such as an ICS environment represented by a factory, a building, or the like, transmits, to communication analysis system 20, communication performed by monitoring target 10. In the present exemplary embodiment, communication data collected by a terminal that is connected to a NW in an ICS and collects communication packets exchanged in said NW is transmitted to communication analysis system 20 as communication information of monitoring target 10.

Network 30 is, for example, a typical Internet line or a dedicated line. In network 30, the communication information of monitoring target 10 can be safely transmitted to communication analysis system 20 using the virtual private network (VPN) communication, for example.

1.2 Communication Analysis System 20

Communication analysis system 20 creates graph information for an analyst to efficiently address an alert of a non-WL communication link detected using whitelist 22 that has been trained, and presents the graph information. Communication analysis system 20 extracts past communication that may be useful in analyzing a non-WL communication link, and creates, from the extracted past communication, a graph for analysis and graph information for presenting information about each communication to the analyst.

Communication analysis system 20 according to the present exemplary embodiment includes analysis auxiliary graph creation system 21, whitelist 22, communication link learning system 23, and communication information DB 24, as illustrated in FIG. 1. Communication analysis system 20 is located in a cloud or an on-premise analysis environment and is connected to monitoring target 10 via network 30.

[1.2.1 Whitelist 22]

Whitelist 22 is a list in which non-anomalous communication events are listed. Whitelist 22 is created by learning the communication performed by monitoring target 10. In the present exemplary embodiment, the communication content (the content of a communication link) of properly operating monitoring target 10 that is included in the communication information of monitoring target 10 is stored into whitelist 22. Whitelist 22 is used to determine whether the communication established at monitoring target 10 is normal communication.

[1.2.2 Communication Information DB 24]

Communication information DB 24 is realized by a hard disk drive (HDD) or a semiconductor memory such as a solid state drive (SSD) flash memory, for example. Communication information DB 24 holds past communication information including information indicating past communication performed by monitoring target 10. The past communication information includes communication information indicating which terminal (a destination terminal and a source terminal) each terminal in monitoring target 10 has communicated with in the past using which protocol, for example.

[1.2.3 Analysis Auxiliary Graph Creation System 21]

Analysis auxiliary graph creation system 21 creates graph information for analyzing non-whitelist (non-WL) communication which is communication not included in whitelist 22. In the present exemplary embodiment, analysis auxiliary graph creation system 21 grasps a non-WL communication link at monitoring target 10 using whitelist 22. Furthermore, using the machine learning model trained at communication link learning system 23 and the past communication information held in communication information DB 24, analysis auxiliary graph creation system 21 creates graph information for assisting in analyzing whether the non-WL communication is anomalous.

Figure 2A:
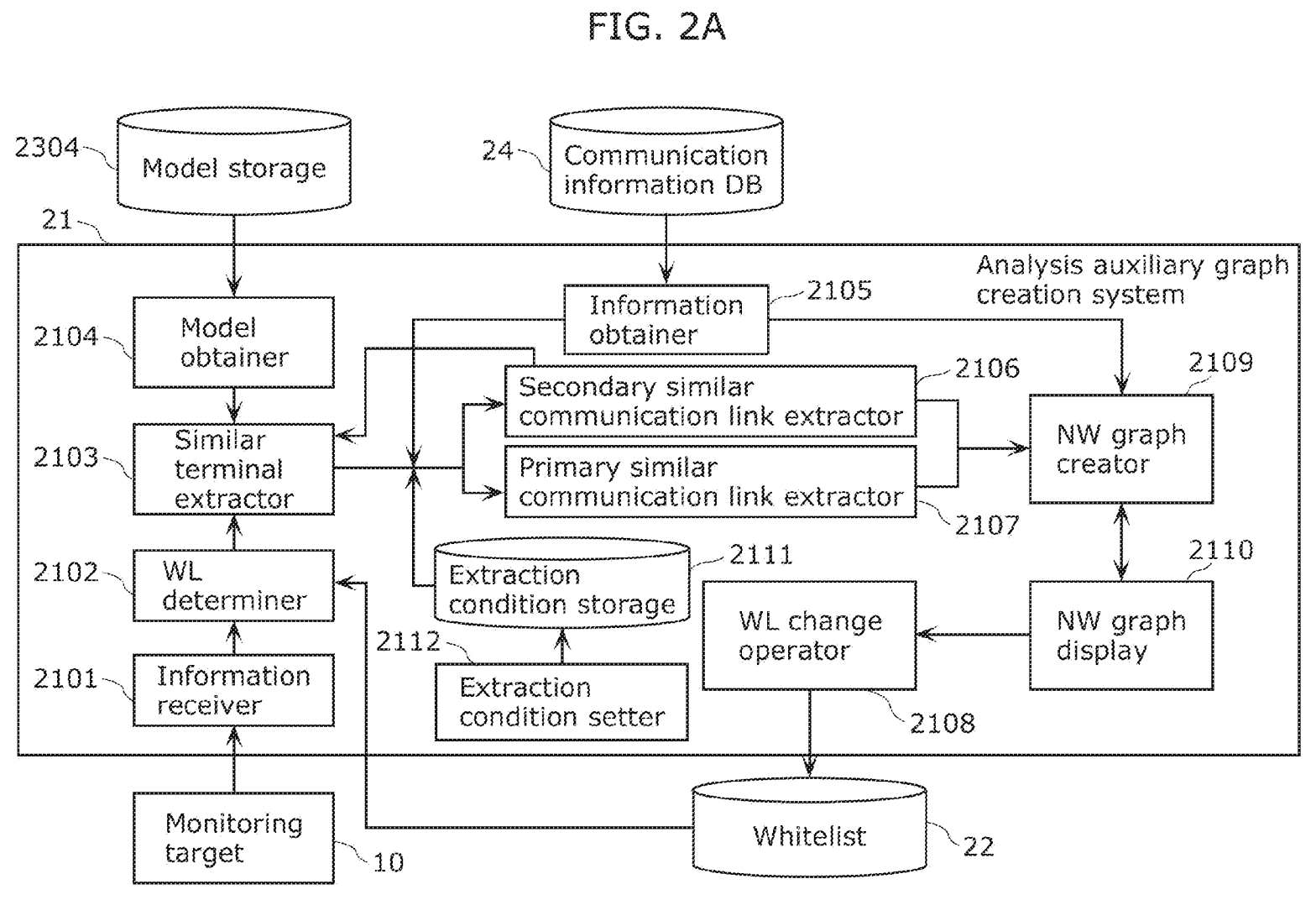
Figure 2B:
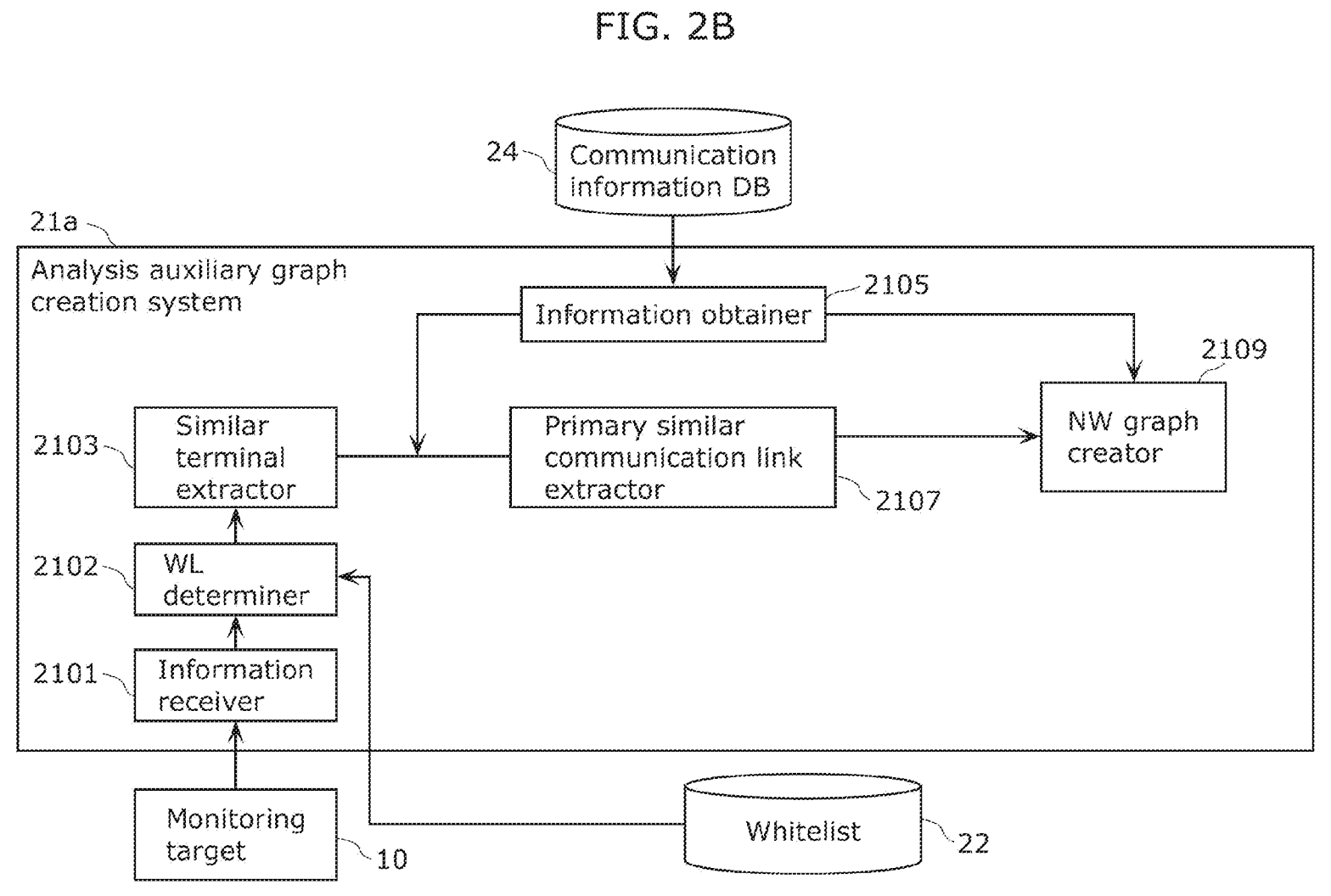

FIG. 2A is a block diagram illustrating one example of the configuration of analysis auxiliary graph creation system 21 according to Embodiment 1. FIG. 2B is a block diagram illustrating minimum elements of analysis auxiliary graph creation system 21 illustrated in FIG. 2A.

As illustrated in FIG. 2A, analysis auxiliary graph creation system 21 includes information receiver 2101, WL determiner 2102, similar terminal extractor 2103, model obtainer 2104, information obtainer 2105, secondary similar communication link extractor 2106, primary similar communication link extractor 2107, WL change operator 2108, NW graph creator 2109, NW graph display 2110, extraction condition storage 2111, and extraction condition setter 2112. It is sufficient that analysis auxiliary graph creation system 21a include, as minimum elements, information receiver 2101, WL determiner 2102, similar terminal extractor 2103, information obtainer 2105, primary similar communication link extractor 2107, and NW graph creator 2109, as illustrated in FIG. 2B.

Analysis auxiliary graph creation system 21, which includes a computer including a memory and a processor (a microprocessor), for example, implements the functions of each element by the processor executing a predetermined program stored in the memory.

Information receiver 2101 receives communication information that is information indicating analysis target communication performed by monitoring target 10. In the present exemplary embodiment, information receiver 2101, which is a communication interface, for example, receives the communication data of monitoring target 10 from monitoring target 10 and extracts the communication information of monitoring target 10 from the received communication data.

Using whitelist 22 and the communication information indicating analysis target communication, WL determiner 2102 determines that a non-WL communication has been established in the analysis target communication. WL determiner 2102, which includes a computer including a memory and a processor (a microprocessor), for example, may implement a determination function by the processor executing a predetermined program stored in the memory. In the present exemplary embodiment, using whitelist 22 and analysis target communication information of monitoring target 10 that has been received by information receiver 2101, WL determiner 2102 determines whether the analysis target communication includes communication considered as non-WL communication.

Model obtainer 2104 obtains a machine learning model from communication link learning system 23. In the present exemplary embodiment, model obtainer 2104 obtains the machine learning model generated by learning the communication performed by monitoring target 10.

Similar terminal extractor 2103, which includes a computer including a memory and a processor (a microprocessor), for example, may implement the following extraction function by the processor executing a predetermined program stored in the memory.

For example, similar terminal extractor 2103 extracts: a first similar terminal which is one or more terminals similar to the destination terminal in a non-WL communication link which is the communication link of the non-WL communication that has been determined by WL determiner 2102; and a second similar terminal which is one or more terminals similar to the source terminal in the non-WL communication link.

Furthermore, similar terminal extractor 2103 may also extract a third similar terminal which is one or more terminals similar to a counterpart terminal, which is different from the aforementioned source terminal, of the communication performed in the past by the destination terminal included in the non-WL communication link. Similar terminal extractor 2103 may also extract a fourth similar terminal which is one or more terminals similar to a counterpart terminal, which is different from the aforementioned destination terminal, of the communication performed in the past by the source terminal included in the non-WL communication link.

Using a machine learning model that has been trained, for example, similar terminal extractor 2103 may also calculate a degree of similarity between a plurality of terminals in a predetermined environment and thus extract a similar terminal. By using a machine learning model that has been trained, it is possible to accurately extract a similar terminal. Accordingly, it is possible to use a NW graph created using the similar terminal accurately extracted. Furthermore, using a predetermined rule, similar terminal extractor 2103 may extract (determine) a similar terminal in a predetermined environment.

In other words, in the present exemplary embodiment, similar terminal extractor 2103 extracts a similar terminal that is similar to each of the terminals (the source terminal and the destination terminal) of the non-WL communication link. In addition, similar terminal extractor 2103 may further regard, as a similar terminal, a terminal associated with each of the terminals (the source terminal and the destination terminal) of the non-WL communication link. The similar terminal is a terminal having a similar communication tendency or a terminal having a similar role.

In the example illustrated in FIG. 2A, similar terminal extractor 2103 extracts a terminal similar to each of the source terminal and the destination terminal of the non-WL communication link using the communication information of the non-WL communication link that has been determined by WL determiner 2102, for example, and the machine learning model obtained by model obtainer 2104, for example.

Information obtainer 2105 obtains the past communication information from communication information DB 24. Information obtainer 2105 is, for example, a communication interface. As described above, the past communication information includes communication information indicating which terminal (a destination terminal and a source terminal) each terminal in monitoring target 10 has communicated with in the past using which protocol, for example.

Extraction condition setter 2112 sets an extraction condition for extracting information required to create the graph information. In the present exemplary embodiment, according to a user, extraction condition setter 2112 configures various settings for an element for extracting communication that is to be used as a primary similar communication link and a secondary similar communication link among the elements included in the past communication links.

Extraction condition storage 2111 holds the extraction condition for extracting information required to create the graph information. In the present exemplary embodiment, extraction condition storage 2111 stores the settings of the extraction condition that has been set by extraction condition setter 2112.

Primary similar communication link extractor 2107, which includes a memory and a processor (a microprocessor), for example, may implement a primary similar communication link extraction function by the processor executing a predetermined program stored in the memory.

Using the first similar terminal and the second similar terminal extracted by similar terminal extractor 2103, primary similar communication link extractor 2107 extracts the primary similar communication link from the past communication information obtained by information obtainer 2105. The primary similar communication link is a past communication link similar to the non-WL communication link and including the first similar terminal and the second similar terminal as the destination terminal or the source terminal.

In other words, in the present exemplary embodiment, using the similar terminal extracted by similar terminal extractor 2103, primary similar communication link extractor 2107 extracts, from the past communication information obtained by information obtainer 2105, a primary similar communication link which is a past communication link similar to the non-WL communication link.

In the example illustrated in FIG. 2A, using the similar terminal extracted by similar terminal extractor 2103 and the extraction condition obtained by extraction condition storage 2111, primary similar communication link extractor 2107 extracts the primary similar communication link from the past communication information obtained by information obtainer 2105.

Secondary similar communication link extractor 2106, which includes a memory and a processor (a microprocessor), for example, may implement a secondary similar communication link extraction function by the processor executing a predetermined program stored in the memory.

Secondary similar communication link extractor 2106 extracts the secondary similar communication link which is a communication link different from the primary similar communication link and the non-WL communication link. More specifically, secondary similar communication link extractor 2106 extracts the secondary similar communication link using the first similar terminal, the second similar terminal, the third similar terminal, and the fourth similar terminal extracted by similar terminal extractor 2103, and the past communication information obtained by information obtainer 2105. The secondary similar communication link is a communication link that is different from the non-WL communication link and the primary similar communication link obtained by primary similar communication link extractor 2107 and is a communication link of past communication similar to the communication performed in the past by the source terminal or the destination terminal included in the non-WL communication link.

In other words, in the present exemplary embodiment, using the similar terminal extracted by similar terminal extractor 2103, secondary similar communication link extractor 2106 extracts the secondary similar communication link from the past communication information obtained by information obtainer 2105. In the example illustrated in FIG. 2A, using the similar terminal extracted by similar terminal extractor 2103 and the extraction condition obtained by extraction condition storage 2111, secondary similar communication link extractor 2106 extracts the secondary similar communication link from the past communication information obtained by information obtainer 2105. The secondary similar communication link is a past communication link that may be associated with the non-WL communication link and is different from the primary similar communication link. Specifically, the secondary similar communication link is a similar communication link established between the source terminal of the non-WL communication link and a terminal similar thereto and a similar communication link established between the destination terminal of the non-WL communication link and a terminal similar thereto.

NW graph creator 2109, which includes a memory and a processor (a microprocessor), for example, may implement the following creation function by the processor executing a predetermined program stored in the memory. Using the primary similar communication link extracted by primary similar communication link extractor 2107 and the past communication information obtained by information obtainer 2105, NW graph creator 2109 creates a NW graph for analysis as the graph information for analyzing the non-WL communication.

Furthermore, NW graph creator 2109 may create a NW graph for analysis using the primary similar communication link and the secondary similar communication link extracted and the past communication information obtained by information obtainer 2105.

In the example illustrated in FIG. 2A, NW graph creator 2109 creates a NW graph using the similar communication extracted by primary similar communication link extractor 2107 and secondary similar communication link extractor 2106 and the past communication information obtained by information obtainer 2105.

NW graph creator 2109 may cause NW graph display 2110 to display the created NW graph in such a manner that a non-WL communication link and those other than the non-WL communication link can be distinguished from each other. Specifically, NW graph creator 2109 may create graph information to be displayed on NW graph display 2110 in such a manner that a non-WL communication link is shown with highlights, to allow a user who is an analyst to distinguish the non-WL communication link from other communication links in the created NW graph. With this, the user can intuitively grasp the non-WL communication link.

Furthermore, NW graph creator 2109 may cause NW graph display 2110 to display grouped graph information so that in the created NW graph, a user can distinguish similar terminals belonging to the same group from each other and distinguish different groups from each other. For example, NW graph creator 2109 may cause NW graph display 2110 to display groups of: the destination terminal and the source terminal included in the non-WL communication link; and a plurality of similar terminals including the first similar terminal, the second similar terminal, the third similar terminal, and the fourth similar terminal. With this, the user can grasp a similarity relationship between one or more terminals similar to the terminal of the non-WL communication link.

Furthermore, NW graph creator 2109 may create a message to a user who is an analyst according to the content of the created NW graph. Specifically, NW graph creator 2109 may not only create a NW graph, but also create a message based on the created NW graph as auxiliary information for a user who is an analyst to conduct an analysis. Thus, the message serving as auxiliary information for a user to conduct an analysis can be displayed, and therefore the use of the message allows the user to conduct the analysis more easily.

NW graph display 2110 displays, on a screen, the NW graph created by NW graph creator 2109. NW graph display 2110, which is a display or a touch panel, for example, presents, to a user who is an analyst, the NW graph created by NW graph creator 2109 and information regarding the NW graph. NW graph display 2110 may perform various processes according to an operation performed at a predetermined position on the touch panel or an operation performed at a predetermined position on the display using an input device such as a computer mouse.

For example, NW graph display 2110 may display a button for determining, when a user selects a non-WL communication link, whether to add the non-WL communication of the selected non-WL communication link to whitelist 22. With this, the user can add the non-WL communication to whitelist 22 by a simple operation.

Furthermore, for example, NW graph display 2110 may display, on the screen, a scrollbar for performing the operation to adjust the threshold value of the degree of similarity to the destination terminal and the source terminal included in the non-WL communication link. In this case, NW graph display 2110 can display, on the screen, a NW graph updated according to the threshold value changed by a user operation on the scrollbar. Since the number (display range) of terminals similar to the terminal of the non-WL communication link can be adjusted by such an operation on the scrollbar, checking of the validity of the non-WL communication can be made easier.

Furthermore, NW graph display 2110 may display comparison information on the screen. Specifically, a user may select, in the NW graph displayed on the screen by NW graph display 2110, two communication links that are a non-WL communication link and one of one or more primary similar communication links or two communication links that are a non-WL communication link and one of one or more secondary similar communication links. In this case, it is sufficient that NW graph display 2110 display detailed information of the two selected communication links on the screen as comparison information for analyzing the non-WL communication. When the comparison information is displayed, checking of the validity of the non-WL communication can be made easier. Note that NW graph display 2110 may display a message related to an operating procedure for selecting two communication links and guide a user so that the comparison information is displayed on the screen. Thus, by referring to the operating procedure, the user can cause the comparison information to be displayed.

WL change operator 2108 adds the non-WL communication to whitelist 22 according to an instruction from a user. For example, WL change operator 2108 may receive an instruction from NW graph display 2110 and add a new non-WL communication link to whitelist 22. Specifically, WL change operator 2108 may add the non-WL communication to whitelist 22 according to input performed by a user on a button displayed on the screen by NW graph display 2110.

[1.2.4 Communication Link Learning System 23]

Next, communication link learning system 23 illustrated in FIG. 1 will be described.

Figure 3:
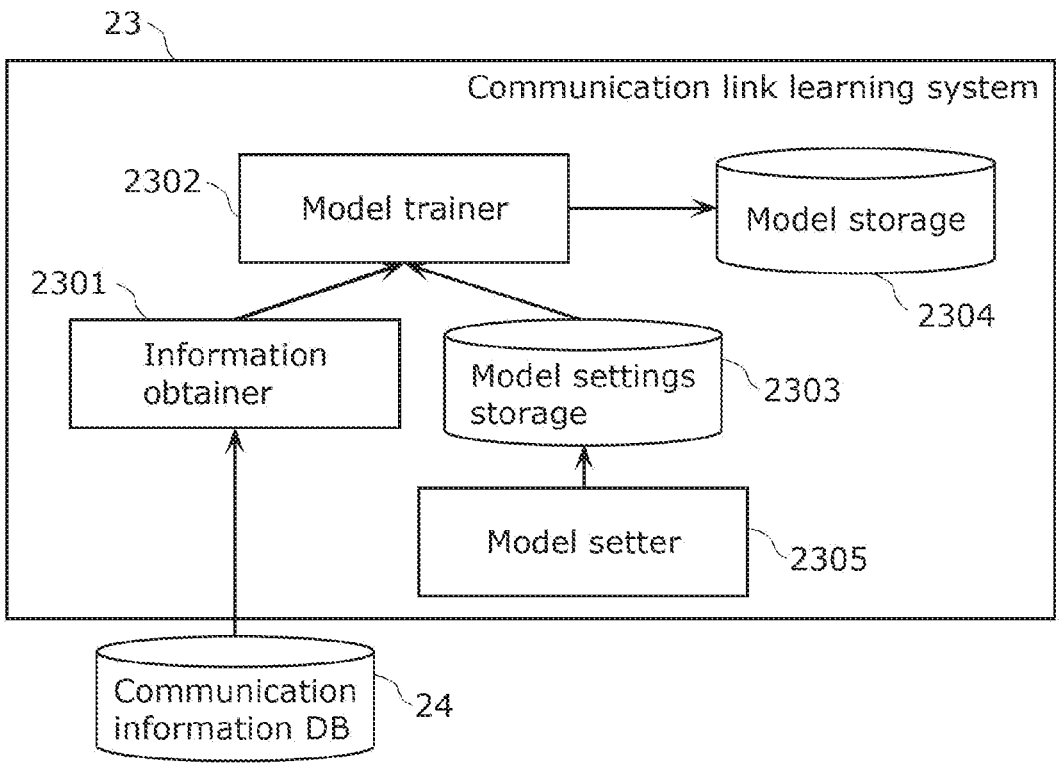
FIG. 3 is a block diagram illustrating one example of the configuration of a communication link learning system according to Embodiment 1.

FIG. 3 is a block diagram illustrating one example of the configuration of communication link learning system 23 according to Embodiment 1.

As illustrated in FIG. 3, communication link learning system 23 includes information obtainer 2301, model trainer 2302, model settings storage 2303, model storage 2304, and model setter 2305.

Communication link learning system 23, which includes a computer including a memory and a processor (a microprocessor), for example, implements the functions of each element by the processor executing a predetermined program stored in the memory.

Information obtainer 2301 obtains past communication information from communication information DB 24. Information obtainer 2301 is, for example, a communication interface. The past communication information obtained by information obtainer 2301, which may be the same as the past communication information obtained by information obtainer 2105, is used in learning for generating a machine learning model.

Model setter 2305 configures various settings information of the machine learning model and causes model settings storage 2303 to store the configured various settings information.

Model trainer 2302 obtains various data from model settings storage 2303 and trains the machine learning model using the past communication information obtained by information obtainer 2301.

In the present exemplary embodiment, the machine learning model is generated using the graph analysis technique disclosed in NPL 2. More specifically, the machine learning model includes one of LinkFeat, COMPosition-based multi-relational Graph Convolutional Networks (COMPGCN), Relational Graph Convolutional Network (R-GCN), Translating Embeddings for Modeling Multi-relational Data (TransE), DistMult, Holographic Embeddings of Knowledge Graphs (HolE), and Complex Embeddings for Simple Link Prediction (ComplEx), for example. This machine learning model is generated by learning the past communication information obtained by information obtainer 2301, that is, the communication performed by monitoring target 10, using link prediction or a node classification algorithm. The link prediction or the node classification algorithm is a technique that allows creation of a vector of a fixed dimension for each terminal that has appeared in communication and allows creation of a matrix of a fixed size for each communication type that has appeared in said communication. For example, the vector representation of each of the plurality of terminals in monitoring target 10 and the coefficient matrix for each protocol are initialized based on the past communication information. Next, the training is carried out so that the quadratic form of a pair in the communication link that has been established in the past is large while the quadratic form of a pair in the communication link that has not been established in the past is small. In this manner, a machine learning model that has acquired the vector representation of each terminal can be trained and generated based on the past communication information obtained by information obtainer 2301.

Model storage 2304 is realized by a hard disk drive (HDD), a solid-state drive (SSD), or the like. Model storage 2304 stores various settings data. Furthermore, model storage 2304 stores the trained machine learning model generated through training of model trainer 2302.

1.3 Operation of Communication Analysis System 20

Next, the operation of communication analysis system 20 configured as described above will be described.

1.3.1 Operation in Analysis Method

FIG. 4 is a flowchart illustrating an operation in an analysis method performed by communication analysis system 20 according to Embodiment 1. FIG. 4 illustrates, as the operation in the analysis method, an analysis auxiliary graph creation process performed by the minimum elements of analysis auxiliary graph creation system 21 illustrated in FIG. 2B.

First, analysis auxiliary graph creation system 21 of communication analysis system 20 receives information indicating analysis target communication which is communication performed by monitoring target 10 (S1). The communication performed by monitoring target 10 is communication performed in a network of a plurality of terminals in a predetermined environment which are monitoring target 10.

Next, analysis auxiliary graph creation system 21 obtains the past communication information from communication information DB 24 (S2). More specifically, analysis auxiliary graph creation system 21 obtains the past communication information from communication information DB 24 that holds past communication information including information indicating the past communication performed by monitoring target 10.

Next, using whitelist 22 and the information obtained in Step S2 that indicates the analysis target communication, analysis auxiliary graph creation system 21 determines that the non-WL communication, which is communication not included in whitelist 22, has been established in the analysis target communication (S3).

Next, analysis auxiliary graph creation system 21 extracts a first similar terminal which is one or more terminals similar to a destination terminal included in the non-WL communication link and a second similar terminal which is one or more terminals similar to a source terminal included in the non-WL communication link (S4). In this manner, analysis auxiliary graph creation system 21 extracts the similar terminals that are similar to the terminals (the source terminal and the destination terminal) of the non-WL communication link.

Next, using the first similar terminal and the second similar terminal extracted in Step S4, analysis auxiliary graph creation system 21 extracts a primary similar communication link from the past communication information obtained in Step S2 (S5). The primary similar communication link is a past communication link similar to the non-WL communication link and including the first similar terminal and the second similar terminal as the destination terminal or the source terminal.

Next, using the primary similar communication link extracted in Step S5 and the past communication information obtained in Step S2, analysis auxiliary graph creation system 21 creates a NW graph for analysis as information for analyzing the non-WL communication (S6).

By performing such an analysis method, it is possible to create graph information for analyzing non-WL communication which is communication not included in whitelist 22.

1.3.2 Detailed Operation in Analysis Method

Next, an analysis auxiliary graph creation process performed by analysis auxiliary graph creation system 21 illustrated in FIG. 2A will be described as a detailed operation in the analysis method.

Figure 5:
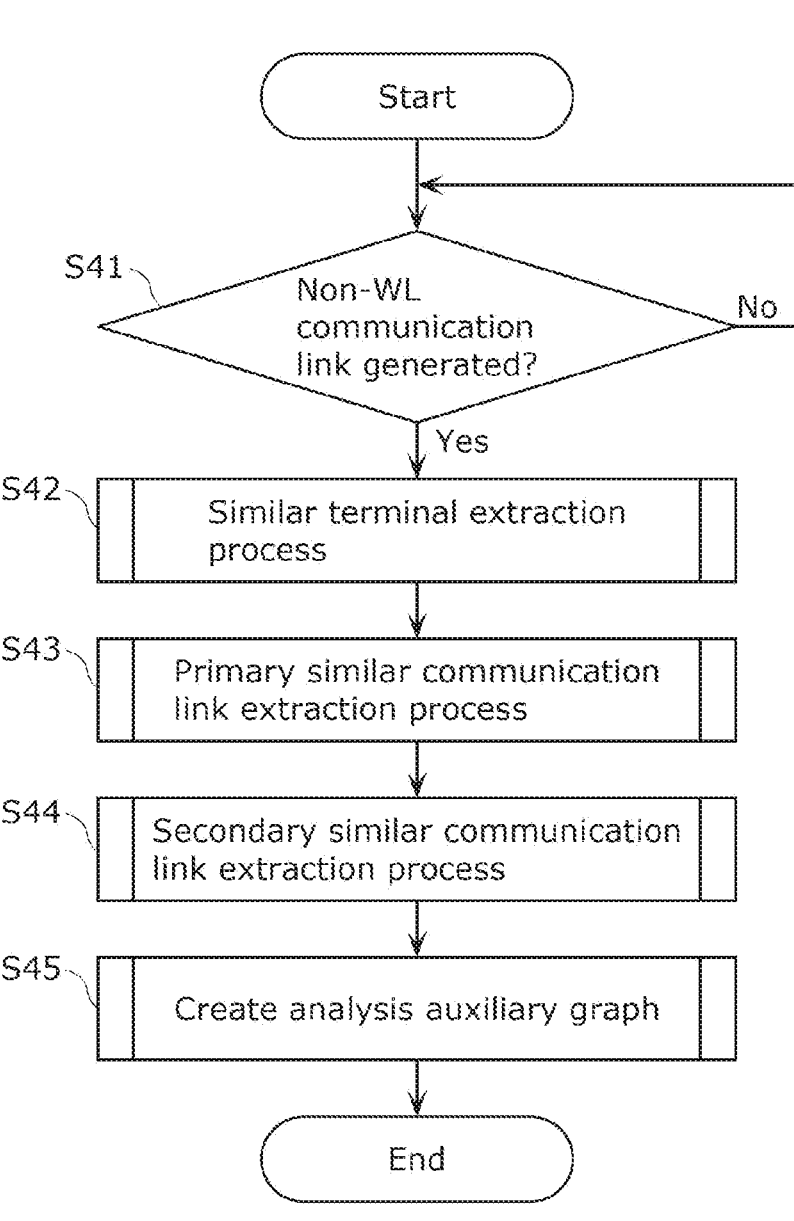
FIG. 5 is a flowchart illustrating an analysis auxiliary graph creation process performed by an analysis auxiliary graph creation system according to Embodiment 1.

FIG. 5 is a flowchart illustrating the analysis auxiliary graph creation process performed by analysis auxiliary graph creation system 21 according to Embodiment 1.

First, analysis auxiliary graph creation system 21 receives information (communication information) indicating analysis target communication performed by monitoring target 10.

Next, as indicated in FIG. 5, using whitelist 22 that has been learned, analysis auxiliary graph creation system 21 determines whether the received communication information of monitoring target 10 indicates establishment of any non-WL communication link (S41).

When it is determined in Step S41 that no non-WL communication link has been established (no in Step S41), analysis auxiliary graph creation system 21 performs Step S41 again after waiting for the next communication information of monitoring target 10 to be obtained.

On the other hand, when it is determined in Step S41 that a non-WL communication link has been established (yes in Step S41), analysis auxiliary graph creation system 21 performs a similar terminal extraction process of extracting a terminal similar to each of the terminals (the source terminal and the destination terminal) of the non-WL communication link (S42).

Next, analysis auxiliary graph creation system 21 performs the process of extracting past communication information that can be used in the analysis of the non-WL communication (S43, S44). Specifically, using the similar terminal extracted by the similar terminal extraction process in Step S42, analysis auxiliary graph creation system 21 performs the primary similar communication link extraction process of extracting a primary similar communication link which is a past communication link similar to the non-WL communication link (S43). Subsequently, using the similar terminal extracted by the similar terminal extraction process in Step S42, analysis auxiliary graph creation system 21 performs the secondary similar communication link extraction process of extracting a secondary similar communication link which is a past communication link that may be associated with the non-WL communication link (S44). Note that the secondary similar communication link does not include the primary similar communication link.

Next, using the past communication information extracted in Steps S43, S44, analysis auxiliary graph creation system 21 performs the analysis auxiliary graph creation process of creating a NW graph for analysis (S45). More specifically, analysis auxiliary graph creation system 21 creates a NW graph for analysis using the primary similar communication link and the secondary similar communication link extracted in Steps S43, S44.

With reference to FIG. 6 to FIG. 12, Step S42 to Step S45 indicated in FIG. 5 will be described in detail below.

Figure 6:
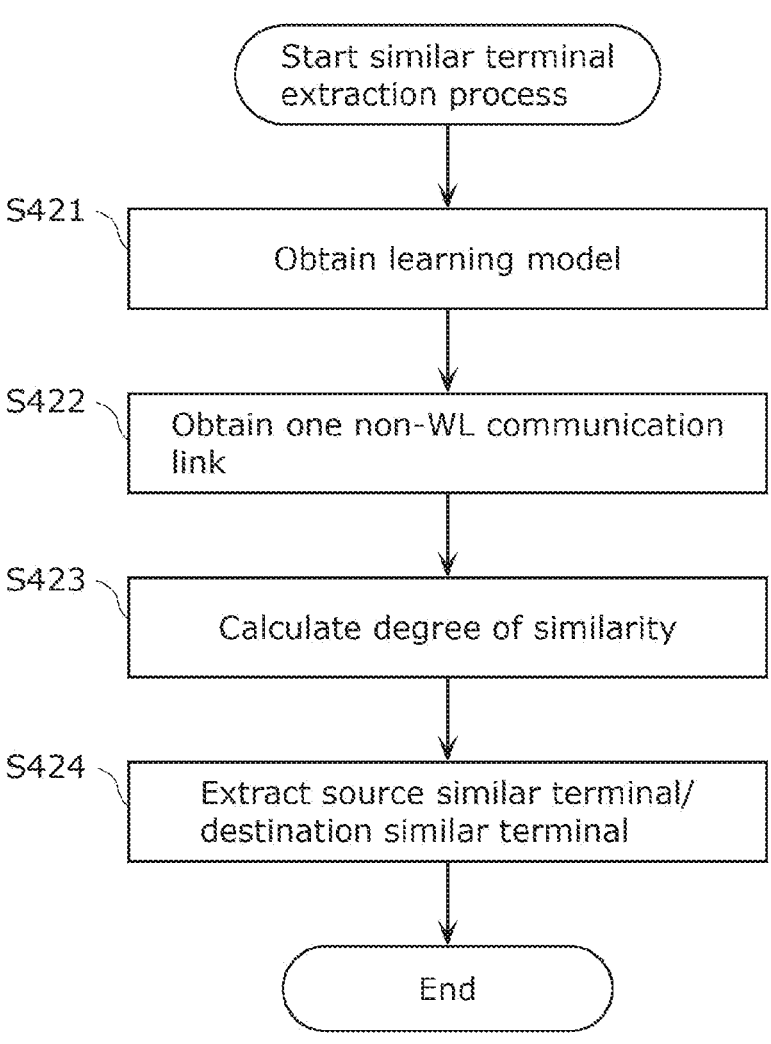
FIG. 6 is a flowchart illustrating one example of a similar terminal extraction process illustrated in FIG. 5.

FIG. 6 is a flowchart illustrating one example of the similar terminal extraction process illustrated in FIG. 5. FIG. 6 illustrates the similar terminal extraction process performed by similar terminal extractor 2103 of analysis auxiliary graph creation system 21.

As illustrated in FIG. 6, first, analysis auxiliary graph creation system 21 obtains a machine learning model (S421). More specifically, model obtainer 2104 illustrated in FIG. 2A obtains the machine learning model stored in model storage 2304.

Next, analysis auxiliary graph creation system 21 obtains one non-WL communication link (S422). More specifically, similar terminal extractor 2103 obtains one non-WL communication link established. Note that when two or more non-WL communication links are established, similar terminal extractor 2103 obtains the non-WL communication links one by one in chronological order. In this case, for each of all the non-WL communication links established, analysis auxiliary graph creation system 21 performs the processes in Step S422 to Step S424 described below.

Next, analysis auxiliary graph creation system 21 calculates a degree of similarity between each of the terminals (the source terminal and the destination termina) of the non-WL communication link and each of the plurality of terminals in monitoring target 10 from the past communication information including information indicating the past communication performed by monitoring target 10 (S423). By acquiring the vector representations of the plurality of terminals of monitoring target 10 using the past communication information, analysis auxiliary graph creation system 21 can calculate the degree of similarity between a terminal of the non-WL communication link and a terminal other than said terminal. In the present exemplary embodiment, using the machine learning model obtained in Step S421, similar terminal extractor 2103 calculates a degree of similarity (the degree of source terminal similarity degree and the degree of destination terminal similarity) between each of the terminals (the source terminal and the destination terminal) of the non-WL communication link and another terminal that has been observed so far. This machine learning model has acquired the vector representation of each of the plurality of terminals in monitoring target 10 described above.

Note that the graph analysis technique disclosed in NPL 2 can be used as a method for calculating a degree of similarity between terminals. Specifically, first, using the machine learning model generated by learning the past communication information, an embedded vector of a fixed length is calculated as the vector representation of each of the plurality of terminals in monitoring target 10. Next, a degree of cosine similarity between the vector representations of the terminals is calculated, and thus the degree of similarity is obtained.

Next, analysis auxiliary graph creation system 21 extracts terminals (a source similar terminal and a destination similar terminal) similar to the respective terminals (the source terminal and the destination terminal) of the non-WL communication link (S424). In the present exemplary embodiment, similar terminal extractor 2103 performs threshold value determination on the calculated degree of similarity of each of the terminals, and extracts a terminal having a value greater than or equal to a threshold value as the source similar terminal or the destination similar terminal. When it is assumed that the degree of similarity is calculated to be between 0 and 1 and indicates a higher degree of similarity with a value closer to 1, it is sufficient that the threshold value be set to, for example, 0.8, as a value close to 1. Note that the source similar terminal is one or more terminals similar to the source terminal and corresponds to the first similar terminal described above. Similarly, the destination similar terminal is one or more terminals similar to the destination terminal and corresponds to the second similar terminal described above.

Figure 7:
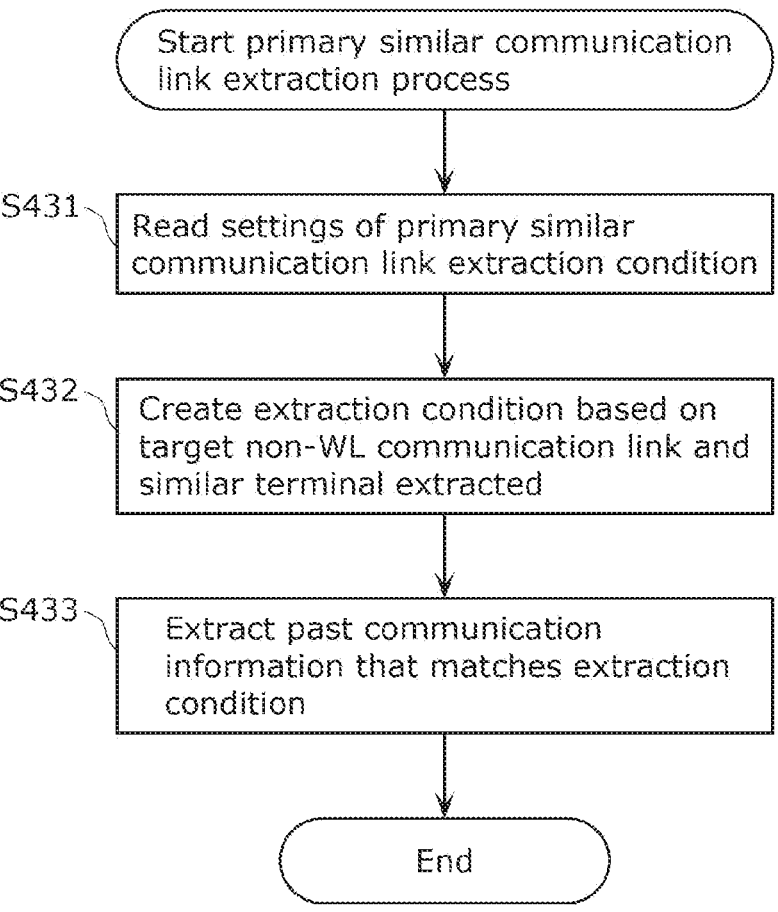
FIG. 7 is a flowchart illustrating one example of a primary similar communication link extraction process illustrated in FIG. 5.
Figure 8A:
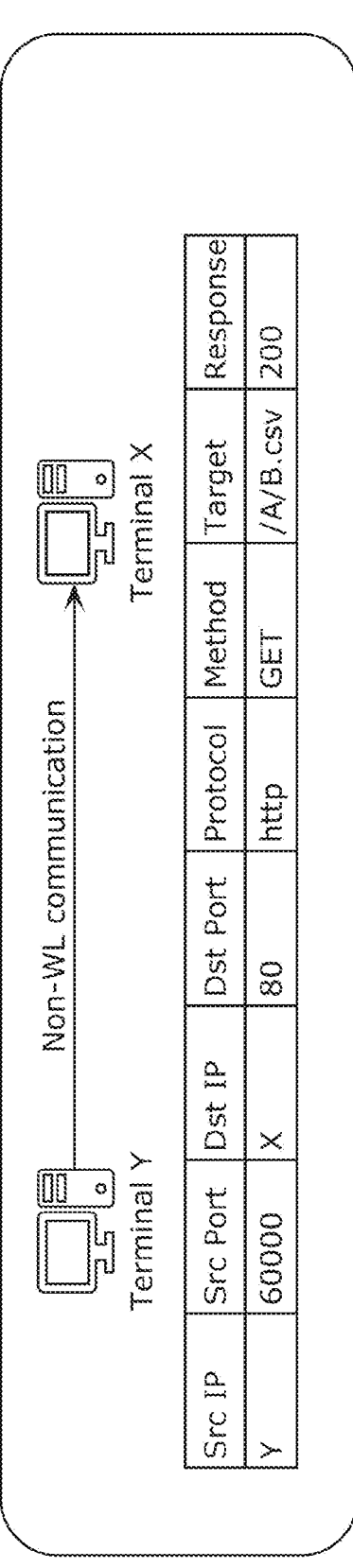
FIG. 8A is a diagram illustrating one example of a primary similar communication link extraction process according to Embodiment 1.

FIG. 7 is a flowchart illustrating one example of the primary similar communication link extraction process illustrated in FIG. 5. FIG. 7 illustrates the primary similar communication link extraction process performed by primary similar communication link extractor 2107 of analysis auxiliary graph creation system 21. FIG. 8A to FIG. 8C are diagrams each illustrating one example of the primary similar communication link extraction process according to Embodiment 1.

As illustrated in FIG. 7, first, primary similar communication link extractor 2107 obtains the settings of a primary similar communication link extraction condition from extraction condition storage 2111 (S431).

Next, primary similar communication link extractor 2107 creates an extraction condition (the primary similar communication link extraction condition) using information regarding the non-WL communication link that is a target of the primary similar communication link extraction process (S432). For example, on the basis of the information regarding the target non-WL communication link and the similar terminals extracted in the similar terminal extraction process in Step S42, primary similar communication link extractor 2107 creates an extraction condition (the primary similar communication link extraction condition) in accordance with the settings obtained in Step S431.

Assume now that in the target non-WL communication link, the source terminal is Y, the destination terminal is X, the destination port number is Z, and the protocol in use is W. In this case, the settings of the condition that a communication link including source terminal A, destination terminal B, destination port number C, and protocol in use D is extracted as the primary similar communication link are as follows. Specifically, the settings are (A=Y or A is a terminal similar to Y) and (B=X or B is a terminal similar to X) and (Z=C or Z is a protocol port similar to C) and (W=D or W is a protocol similar to D). Note that the non-WL communication link itself is excluded from the primary similar communication link.

FIG. 8A illustrates one specific example of the information regarding the non-WL communication link that is a target of the primary similar communication link extraction process. Specifically, FIG. 8A illustrates a non-WL communication link in which the source terminal (Src IP) is Y, the source port number (Src port) is 60000, the destination terminal (Dst IP) is X, the destination portion number (Dst port) is 80, and the protocol in use (Protocol) is http, for example.

Next, FIG. 8B illustrates one example of the extraction condition (the primary similar communication link extraction condition) created using the information regarding the non-WL communication link illustrated in FIG. 8A. More specifically, FIG. 8B illustrates one example of the extraction condition (the primary similar communication link extraction condition) created in accordance with the settings on the basis of the target non-WL communication and the terminals similar to the terminals of the non-WL communication link that have been extracted in the similar terminal extraction process in Step S42. In other words, FIG. 8B illustrates the extraction condition in which the source terminal is terminal Y or a terminal similar to terminal Y, the destination terminal is terminal X or a terminal similar to terminal X, the destination port number is 80, 8080, or 443, and the protocol in use is http or https. Note that in FIG. 8B, * (asterisk) indicates a wild card, meaning that there are no extraction conditions for the source port number, the method, the target, and the response.

Next, primary similar communication link extractor 2107 extracts past communication information that matches the extraction condition created in Step S432 (S433). More specifically, primary similar communication link extractor 2107 extracts, from the past communication information held by communication information DB 24, past communication that matches the extraction condition created in Step S432. Note that the communication link of the past communication extracted corresponds to the primary similar communication link.

FIG. 8C illustrates the past communication information extracted using the extraction condition illustrated in FIG. 8B. More specifically, FIG. 8C illustrates the past communication information that matches the extraction condition illustrated in FIG. 8B, that is, a plurality of past communication events with the primary similar communication links.

Note that the extraction condition (the primary similar communication link extraction condition) illustrated in FIG. 8B is one example; this is not limiting. For example, the extraction condition for the destination port number is 80, 8080, or 443 in FIG. 8B, but may be 80 or 8080 or may be 80 only. Furthermore, there may be no extraction condition for the destination port number, meaning that an asterisk may be given thereto. Moreover, there may or may not be an extraction condition for the protocol in use because the multigraph form of a communication link is represented using the destination terminal, the source terminal, and the protocol.

In this manner, in the primary similar communication link extraction process, a primary similar communication link which is a communication link similar to the non-WL communication link is extracted from the communication established in the past and included in the past communication information.

Figure 9:
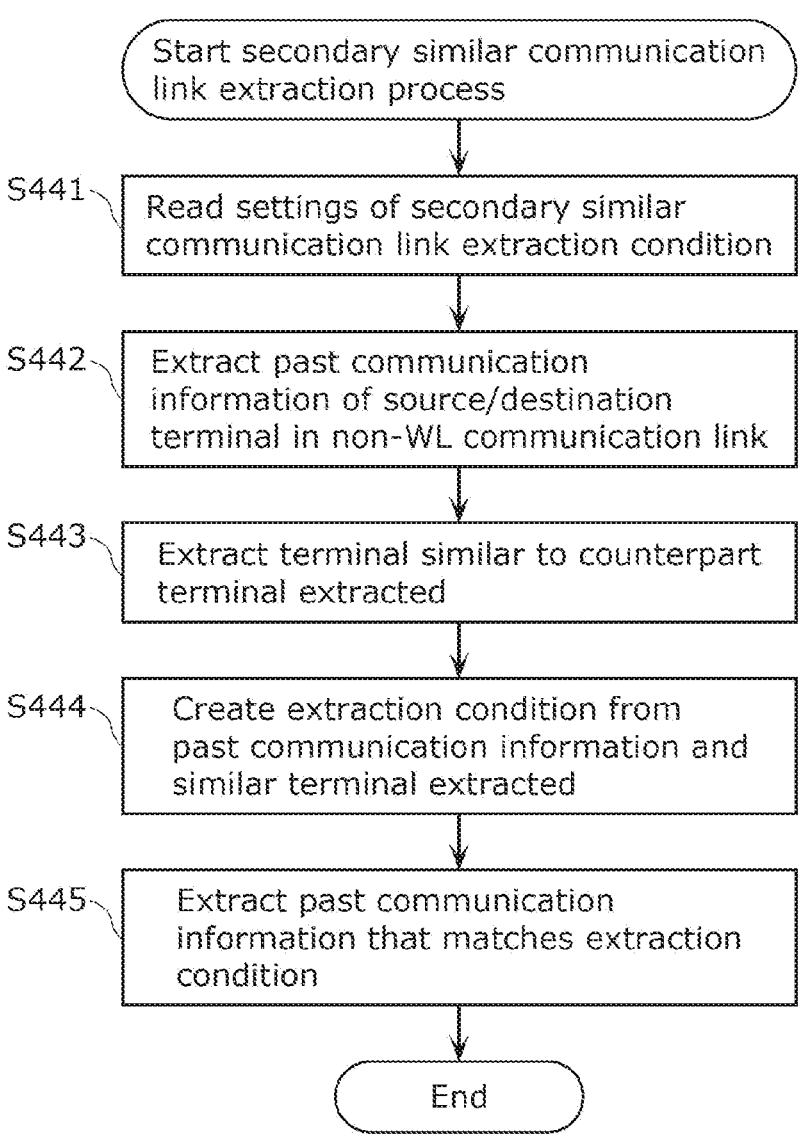
FIG. 9 is a flowchart illustrating one example of a secondary similar communication link extraction process illustrated in FIG. 5.

FIG. 9 is a flowchart illustrating one example of the secondary similar communication link extraction process illustrated in FIG. 5. FIG. 9 illustrates the secondary similar communication link extraction process performed by secondary similar communication link extractor 2106 of analysis auxiliary graph creation system 21. FIG. 10A to FIG. 10C are diagrams each illustrating one example of the secondary similar communication link extraction process according to Embodiment 1.

As illustrated in FIG. 9, first, secondary similar communication link extractor 2106 obtains the settings of a secondary similar communication link extraction condition from extraction condition storage 2111 (S441).

Next, secondary similar communication link extractor 2106 extracts, from communication information DB 24, the past communication information of the source terminal or the destination terminal which is a terminal of the non-WL communication link (S442).

FIG. 10A specifically illustrates one example of the past communication information of the source terminal and the destination terminal which are terminals of the non-WL communication link that is a target of the secondary similar communication link extraction process. Specifically, FIG. 10A illustrates information included in the past communication information and related to the communication performed in the past by a terminal of the non-WL communication link. More specifically, FIG. 10A illustrates past communication information of source terminal Y, which is a terminal of the non-WL communication link, having communicated in the past with a counterpart terminal, namely, terminal B or terminal C, as a source or a destination. Similarly, FIG. 10A illustrates past communication information of destination terminal X, which is a terminal of the non-WL communication link, having communicated in the past with a counterpart terminal, namely, terminal A or terminal D, as a source or a destination.

Next, secondary similar communication link extractor 2106 extracts counterpart terminals for the terminals (the source terminal and the destination terminal) of the non-WL communication link from the past communication information extracted in Step S442, and extracts terminals similar to the counterpart terminals extracted (S443). In the present exemplary embodiment, secondary similar communication link extractor 2106 extracts a terminal similar to the counterpart terminal extracted using the machine learning model.

Next, secondary similar communication link extractor 2106 creates an extraction condition (a secondary similar communication link extraction condition) from the past communication information extracted in Step S442, the terminal similar to the counterpart terminal that has been extracted in Step S443, and the terminal similar to the terminal of the non-WL communication link that has been extracted in the similar terminal extraction process (S444). Secondary similar communication link extractor 2106 creates this extraction condition (the secondary similar communication link extraction condition) in accordance with the settings obtained in Step S441.

Assume now that in the target non-WL communication link, the source terminal is Y and the destination terminal is X. In this case, an extraction condition is set in which a past unique communication link including X as a source or a destination or a past unique communication link including Y as a source or a destination is extracted as the secondary similar communication link. Assume that the communication link is a combination of elements that are the IP address of the source terminal, the IP address of the destination terminal, the destination number port, and the protocol in use, for example. In this case, the extraction condition is set for each of the elements in the combination of a terminal of the target non-WL communication link, the counterpart terminal thereof, and the protocol in use.

For example, in the case of a combination in which the source terminal is Y, the destination terminal is Z1, the destination port number is W1, and the protocol in use is V1, the settings of the condition that a communication link including source terminal A, destination terminal B, destination port number C, and protocol in use D is extracted as the secondary similar communication link are as follows. Specifically, the settings are (A is a terminal similar to Y) and (B=Z1 or B is a terminal similar to Z1) and (C=W1 or C is a protocol port similar to W1) and (D=V1 or D is a protocol similar to V1).

For example, in the case of a combination in which the source terminal is Z2, the destination terminal is X, the destination port number is W2, and the protocol in use is V2, the settings of the condition that a communication link including source terminal A, destination terminal B, destination port number C, and protocol in use D is extracted as the secondary similar communication link are as follows. Specifically, the settings are (A=Z2 or A is a terminal similar to Z2) and (B is a terminal similar to X) and (C=W2 or C is a protocol port similar to W2) and (D=V2 or D is a protocol similar to V2).

In other words, the extraction condition of being extracted as the secondary similar communication link is set for a required element among the elements included in a past unique communication link including the terminals of the target non-WL communication link, namely, X and Y, as a source or a destination. Note that the non-WL communication link and the primary similar communication link are excluded from the secondary similar communication link.

FIG. 10B illustrates one example of the extraction condition (the secondary similar communication link extraction condition) created using the information regarding the communication performed in the past by the terminals of the non-WL communication link illustrated in FIG. 10A. More specifically, FIG. 10B illustrates one example of the extraction condition (the secondary similar communication link extraction condition) created in accordance with the settings, on the basis of the past communication information, the terminals similar to the terminals of the non-WL communication link, and the terminals similar to the counter terminals for the terminals of the non-WL communication link.

The first row (no. 1) of the extraction condition illustrated in FIG. 10B indicates an extraction condition for time stamp ts1 indicated in FIG. 10A. In (no. 1), the source terminal indicated by Src IP is a terminal similar to terminal X, the destination terminal indicated by Dst IP is terminal A or a terminal similar to terminal A, the destination port number indicated by Dst Port is 445, and the protocol in use indicated by Protocol is smb. Note that (no. 1) shows that there are no extraction conditions for the method, the target, and the response.

The second row (no. 2) of the extraction condition illustrated in FIG. 10B indicates an extraction condition for time stamp ts2 indicated in FIG. 10A. In (no. 2), the source terminal indicated by Src IP is a terminal similar to terminal Y, the destination terminal indicated by Dst IP is terminal B or a terminal similar to terminal B, the destination port number indicated by Dst Port is 21, and the protocol in use indicated by Protocol is ftp. Note that (no. 2) also shows that there are no extraction conditions for the method, the target, and the response.

The third row (no. 3) of the extraction condition illustrated in FIG. 10B indicates an extraction condition for time stamp ts3 indicated in FIG. 10A. In (no. 3), the source terminal indicated by Src IP is terminal C or a terminal similar to terminal C, the destination terminal indicated by Dst IP is a terminal similar to terminal Y, the destination port number indicated by Dst Port is 135, and the protocol in use indicated by Protocol is dce-rpc. Note that (no. 3) also shows that there are no extraction conditions for the method, the target, and the response.

The fourth row (no. 4) of the extraction condition illustrated in FIG. 10B indicates an extraction condition for time stamp ts4 indicated in FIG. 10A. In (no. 4), the source terminal indicated by Src IP is terminal D or a terminal similar to terminal D, the destination terminal indicated by Dst IP is a terminal similar to terminal X, the destination port number indicated by Dst Port is 502, and the protocol in use indicated by Protocol is modbus. Note that (no. 4) also shows that there are no extraction conditions for the method, the target, and the response.

In this manner, the extraction condition illustrated in FIG. 10B is generated for each time stamp row of the past communication information illustrated in FIG. 10A.

This discussion will return to FIG. 9.

Next, secondary similar communication link extractor 2106 extracts past communication information that matches the extraction condition created in Step S444 (S445). More specifically, secondary similar communication link extractor 2106 extracts, from the past communication information held by communication information DB 24, past communication that matches the extraction condition created in Step S444. Note that the communication link of the past communication extracted corresponds to the secondary similar communication link.

FIG. 10C illustrates the past communication information extracted using the extraction condition illustrated in FIG. 10B. More specifically, FIG. 10C illustrates the past communication information that matches the extraction condition illustrated in FIG. 10B, that is, a plurality of past communication events with the secondary similar communication links.

Note that the extraction condition (the secondary similar communication link extraction condition) illustrated in FIG. 10B is one example; this is not limiting. For example, in FIG. 10B, there may be no extraction condition for the destination port number, meaning that an asterisk may be given thereto. Moreover, there may or may not be an extraction condition for the protocol in use.

In this manner, in the secondary similar communication link extraction process, the communication performed in the past by the terminals (the destination terminal and the source terminal) of the non-WL communication link is extracted, and communication similar to the extracted communication is extracted from communication events included in the past communication information that have been established in the past. The similar communication extracted is past communication that may be associated with the non-WL communication link, and the communication link of said similar communication corresponds to the secondary similar communication link.

FIG. 11 is a flowchart illustrating one example of the analysis auxiliary graph creation process illustrated in FIG. 5. FIG. 11 illustrates the analysis auxiliary graph creation process performed by NW graph creator 2109 of analysis auxiliary graph creation system 21. As illustrated in FIG. 11, first, NW graph creator 2109 obtains the information of the non-WL communication link, the information of the similar terminals, the information of the primary similar communication link, and the information of the secondary similar communication link from primary similar communication link extractor 2107 and secondary similar communication link extractor 2106 (S451).

Next, NW graph creator 2109 creates graph information for showing, on a graph (a screen), the terminals (the source terminal and the destination terminal) of the non-WL communication and the non-WL communication link with such highlight that other terminals different from said terminals and communication links different from the non-WL communication link can be distinguished (S452).

Next, NW graph creator 2109 updates the graph information to further display, on the graph, the primary similar communication link, the secondary similar communication link, and the terminals (the source terminals and the destination terminals) of the primary similar communication link and the secondary similar communication link (S453).

Next, NW graph creator 2109 updates the graph information to allow grouping and displaying such that the terminals and terminals similar thereto can be distinguished on the graph (S454). More specifically, NW graph creator 2109 updates the graph information to allow grouping such that on the graph, a user can distinguish similar terminals belonging to the same group from each other and distinguish different groups from each other. Here, NW graph creator 2109 groups the terminals (the destination terminal and the source terminal) in the non-WL communication link and a plurality of terminals similar to each of said terminals.

Next, NW graph creator 2109 creates, as auxiliary information for an analyst to conduct an analysis, a message based on the graph information updated in Step S454 (S455). In the present exemplary embodiment, the message is created in accordance with the content of the NW graph indicated by the graph information updated in Step S454.

Next, NW graph creator 2109 causes the NW graph based on the graph information updated in Step S454 and the message created in Step S455 to be displayed on the screen (S456). In the present exemplary embodiment, NW graph creator 2109 causes NW graph display 2110 to display, on the screen, the NW graph based on the graph information and the message created.

In this manner, NW graph creator 2109 can create, from the information obtained in Step S451, the graph information for an analyst to analyze the non-WL communication, and cause the graph information to be displayed on the screen.

Figure 12:
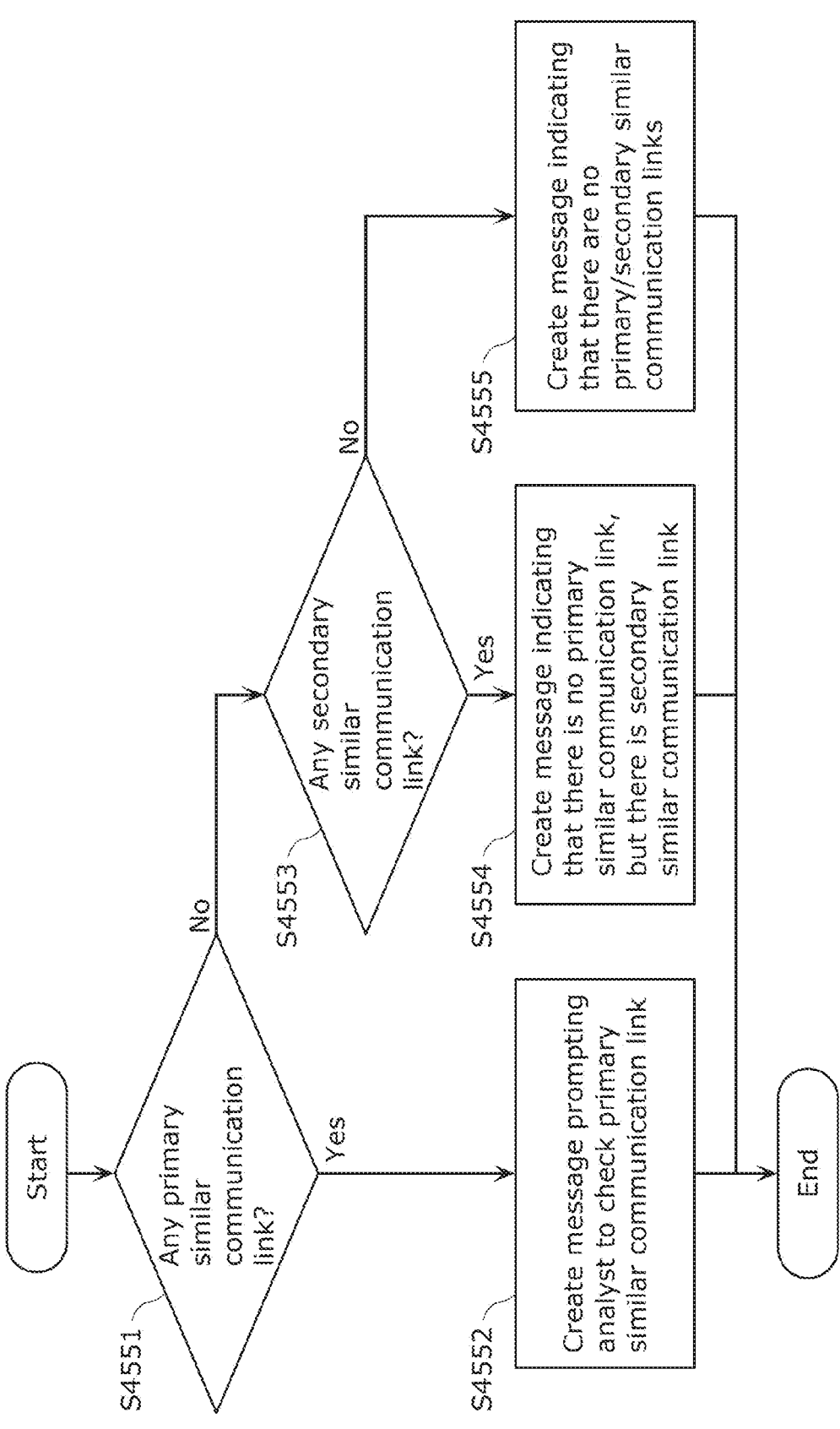
FIG. 12 is a flowchart illustrating one example of a detailed process in Step S455 illustrated in FIG. 11.

FIG. 12 is a flowchart illustrating one example of a detailed process in Step S455 illustrated in FIG. 11. FIG. 12 illustrates a message creation process performed by NW graph creator 2109 of analysis auxiliary graph creation system 21.

As illustrated in FIG. 12, first, NW graph creator 2109 determines whether there is any primary similar communication link (S4551).

When it is determined in Step S4551 that there is a primary similar communication link (yes in S4551), NW graph creator 2109 creates a message prompting an analyst to check past communication (the primary similar communication link) similar to the non-WL communication (S4552).

On the other hand, when it is determined in Step S4551 that there is no primary similar communication link (no in S4551), NW graph creator 2109 determines whether there is any secondary similar communication link (S4553).

When it is determined in Step S4553 that there is a secondary similar communication link (yes in S4553), NW graph creator 2109 creates a message indicating that there is no primary similar communication link, but there is a secondary similar communication link (S4554). The message created here is not required to be a message indicating that there is a secondary similar communication link only, that is, a message directly indicating that there is no primary similar communication link, but there is a secondary similar communication link. Since there is a possibility that the non-WL communication link may be anomalous, it is sufficient that the message created be a reminder prompting the analyst to check the non-WL communication link without fail.

On the other hand, when there is no secondary similar communication link in Step S4553 (no in S4553), NW graph creator 2109 creates a message indicating that there is neither primary similar communication link nor secondary similar communication link (S4555).

1.3.3 Example of Screen for Analyzing Non-WL Communication

The following will describe an example of a screen on which graph information for an analyst to check whether the non-WL communication link is anomalous or is valid (normal) is displayed.

Figure 13A:
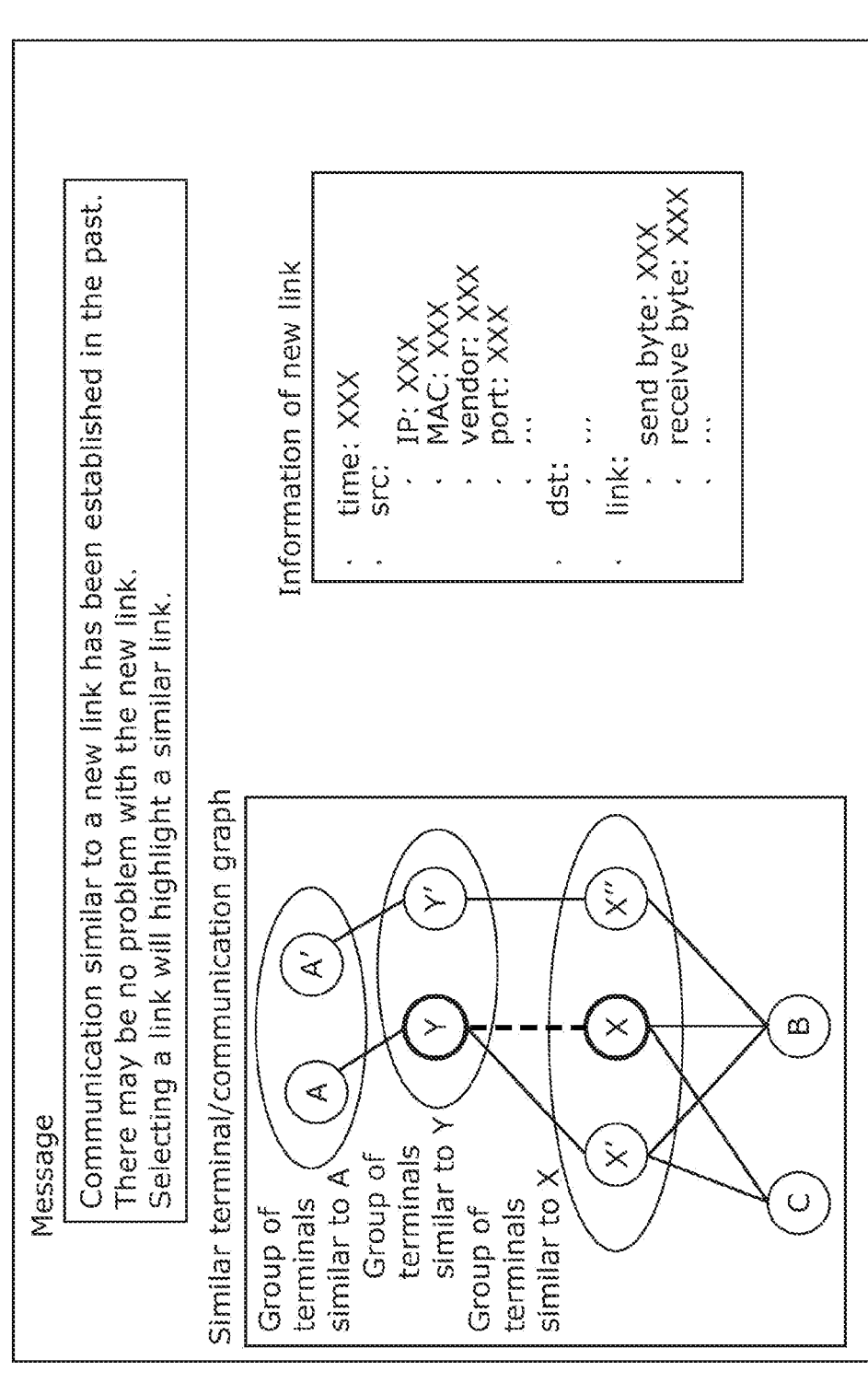
FIG. 13A is a diagram illustrating one example of screen information according to Embodiment 1 that is displayed on a screen when there is a primary similar communication link.
Figure 13B:
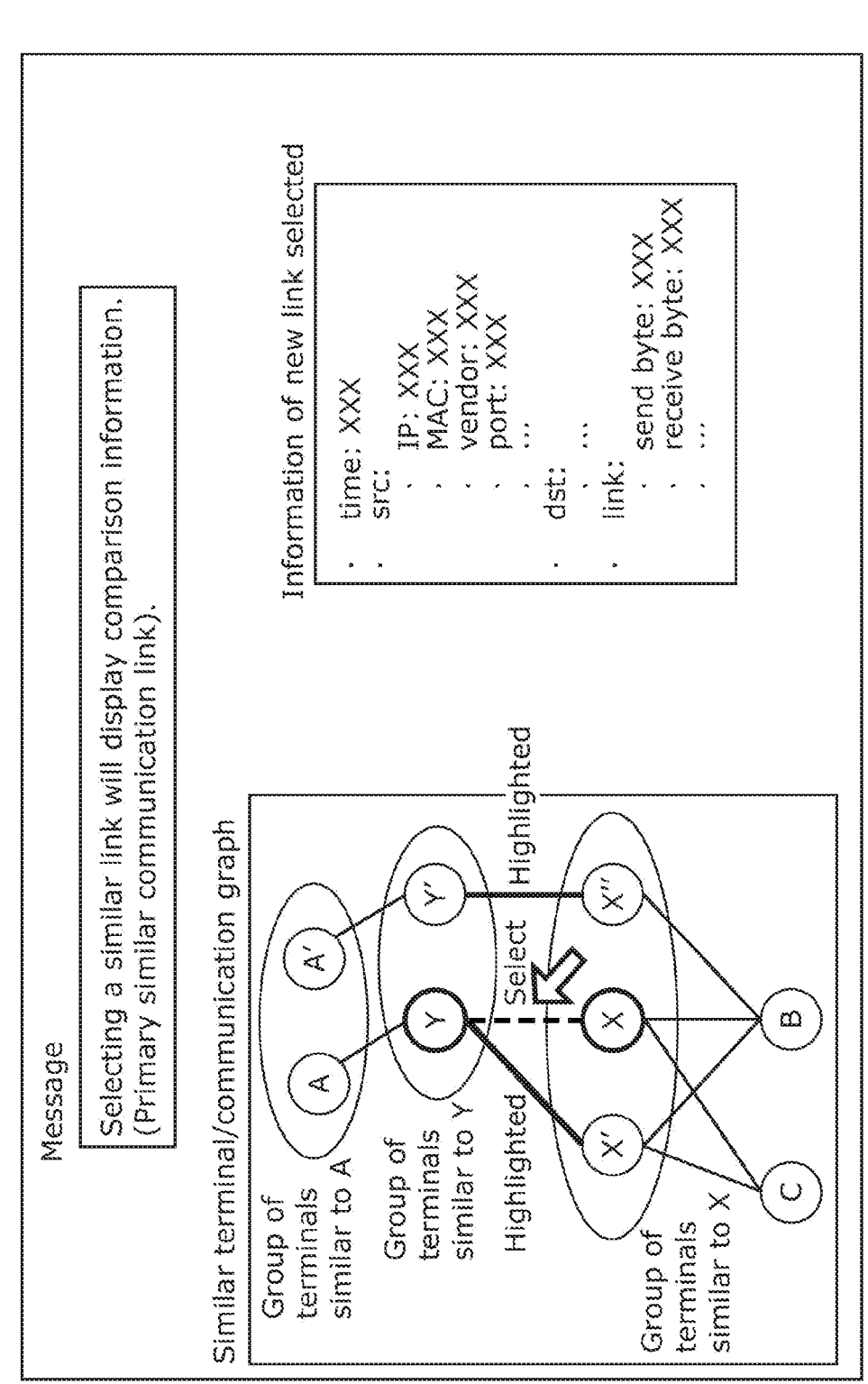
FIG. 13B is a diagram illustrating one example of screen information according to Embodiment 1 that is displayed on a screen when there is a primary similar communication link.
Figure 13C:
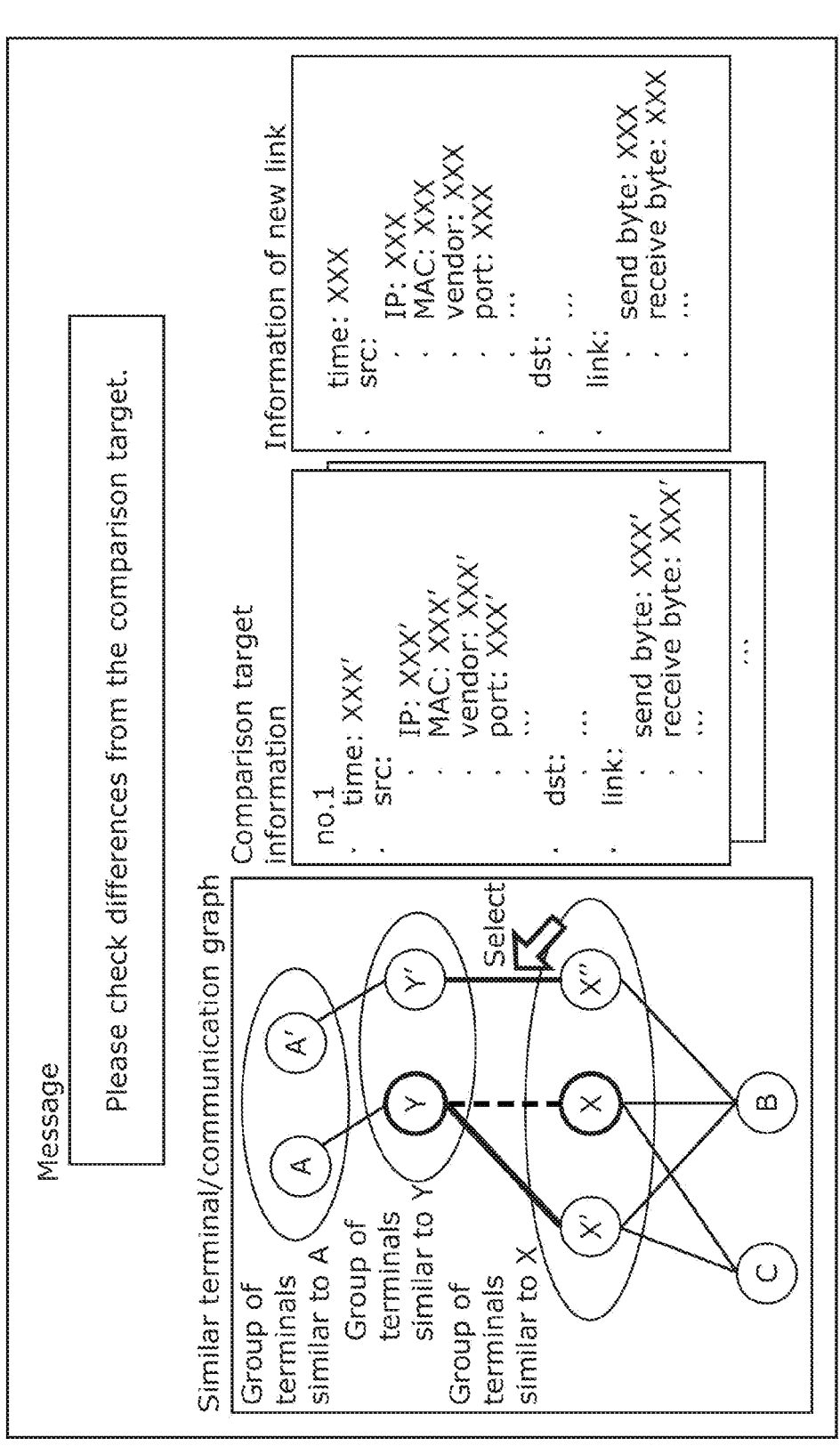
FIG. 13C is a diagram illustrating one example of screen information according to Embodiment 1 that is displayed on a screen when there is a primary similar communication link.

FIG. 13A to FIG. 13C are diagrams each illustrating one example of screen information according to Embodiment 1 that is displayed on a screen when there is a primary similar communication link. As illustrated in FIG. 13A to FIG. 13C, the screen information is one example of the graph information created by analysis auxiliary graph creation system 21 when there is a primary similar communication link, and includes a message, a similar terminal/communication graph, and information of a new link. The new link refers to a non-WL communication link, and the information of a new link refers to information of a non-WL communication link.

NW graph display 2110 presents, to an analyst, the screen information created by NW graph creator 2109. Furthermore, NW graph display 2110 receives screen input from an analyst and performs various processes.

On the similar terminal/communication graph illustrated in FIG. 13A, terminals X, Y, in other words, the terminals (the source terminal and the destination terminal) of the non-WL communication, and the communication link connecting terminals X, Y, in other words, the non-WL communication link, are shown with highlights. Furthermore, on the similar terminal/communication graph, the group of terminal X and terminals similar thereto, the group of terminal Y and terminals similar thereto, and the group of terminal A and terminals similar thereto, in other words, the groups of similar terminals, are displayed in a distinguishable manner.

The message indicated in FIG. 13A includes an indication that a primary similar communication link similar to a new link that is a non-WL communication link has been established in the past, and a message prompting an analyst to check whether there are any problems with the new link. This message content is one example of the message prompting an analyst to check the primary similar communication link similar to the non-WL communication link.

The message indicated in FIG. 13A further includes an indication that when a link is selected, a similar link will be highlighted. Thus, a message content related to an operating procedure for guiding a user may be included.

The information of a new link illustrated in FIG. 13A includes information regarding the new link (the non-WL communication link) connecting terminals X, Y shown with highlights on the similar terminal/communication graph. In the example illustrated in FIG. 13A, time that is a point in time when a new link is established and information of a source terminal and a destination terminal, for example, are shown in the information of a new link.

Next, assume that by following the guidance in the message indicated in FIG. 13A, an analyst has selected the new link (the non-WL communication link) highlighted in FIG. 13A.

In this case, as illustrated in FIG. 13B, the communication link between terminal X' and terminal Y and the communication link between terminal X" and terminal Y' are shown with highlights as the primary similar communication links. Furthermore, as illustrated in FIG. 13B, the information of the new link illustrated in FIG. 13A is displayed as the information of the new link selected.

Note that in this case, the message indicated in FIG. 13B may further include a message content related to an operating procedure for guiding a user such as an indication that when a similar link is selected, comparison information will be displayed.

Next, assume that by following the guidance in the message indicated in FIG. 13B, an analyst has selected the communication link between terminal X" and terminal Y', which is one of the primary similar communication links highlighted in FIG. 13B. In this case, as illustrated in FIG. 13C, the comparison information is displayed; specifically, the new link (the non-WL communication link) and comparison target information that is the information of the primary similar communication link selected are displayed.

The comparison target information which is the information of the primary similar communication link selected is displayed using the past communication information extracted in the primary similar communication link extraction process described above. When there are a large number of pieces of past communication information extracted, an item (element) of the past communication information to be checked by an analyst may be preferentially displayed.

Examples of the item to be preferentially displayed include an item by which the degree of match between the details of communication in the past communication information and the details of communication of the non-WL communication link can be checked. For example, the protocol in the past communication information and the protocol in the non-WL communication link are both the hypertext transfer protocol (http), the degree of match between the details of communication can be checked by items such as a method used, a file path to be operated, and a response code for a request. It is sufficient that among the items by which the degree of match between the details of communication can be checked, the pieces of past communication information be displayed in descending order of items that match those of the non-WL communication link.

Furthermore, examples of the item to be preferentially displayed include a time stamp. In this case, the large number of pieces of past communication information may be displayed in reverse chronological order of the time stamp.

Thus, an analyst can compare or check the details shown in screen information such as that illustrated in FIG. 13C to confirm the details of communication in a new link and the fact that a similar terminal has performed similar communication in the past. When the analyst has successfully confirmed the details of communication in a new link and the fact that a similar terminal has performed similar communication in the past, the analyst can determine that the anomaly level of the new link is low.

Figure 14A:
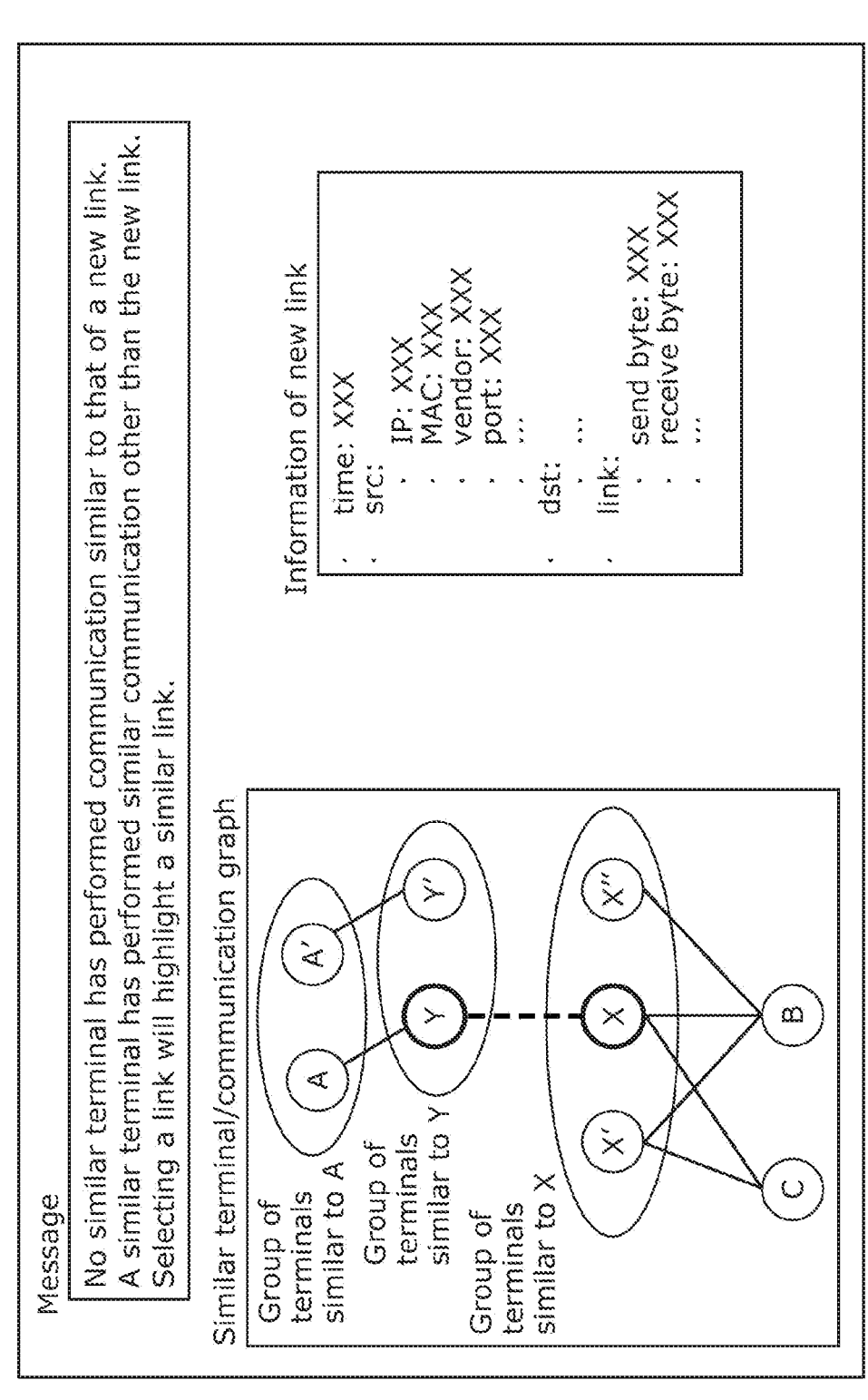
FIG. 14A is a diagram illustrating one example of screen information according to Embodiment 1 that is displayed on a screen when there is a secondary similar communication link while there is no primary similar communication link.
Figure 14B:
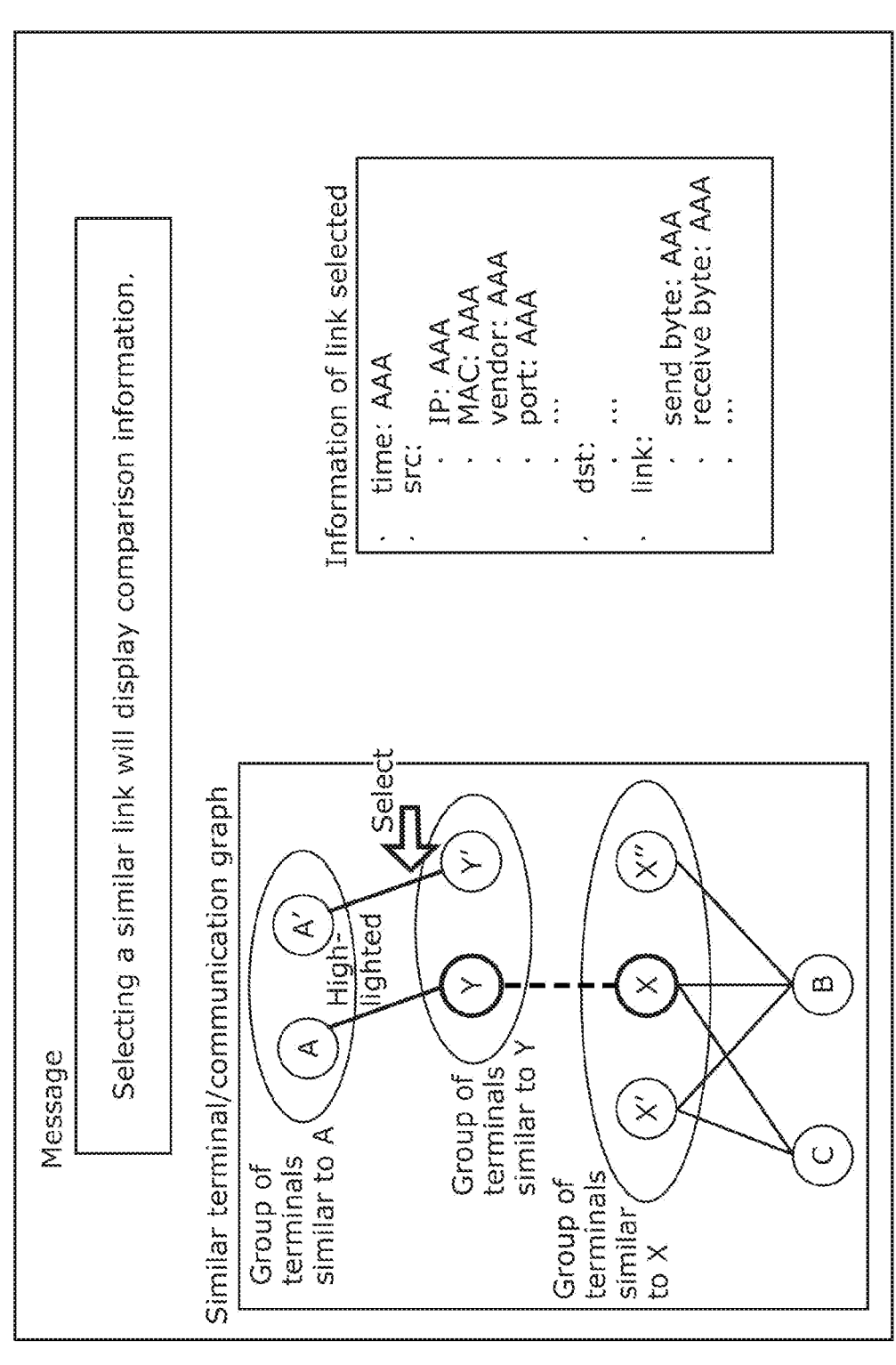
FIG. 14B is a diagram illustrating one example of screen information according to Embodiment 1 that is displayed on a screen when there is a secondary similar communication link while there is no primary similar communication link.
Figure 14C:
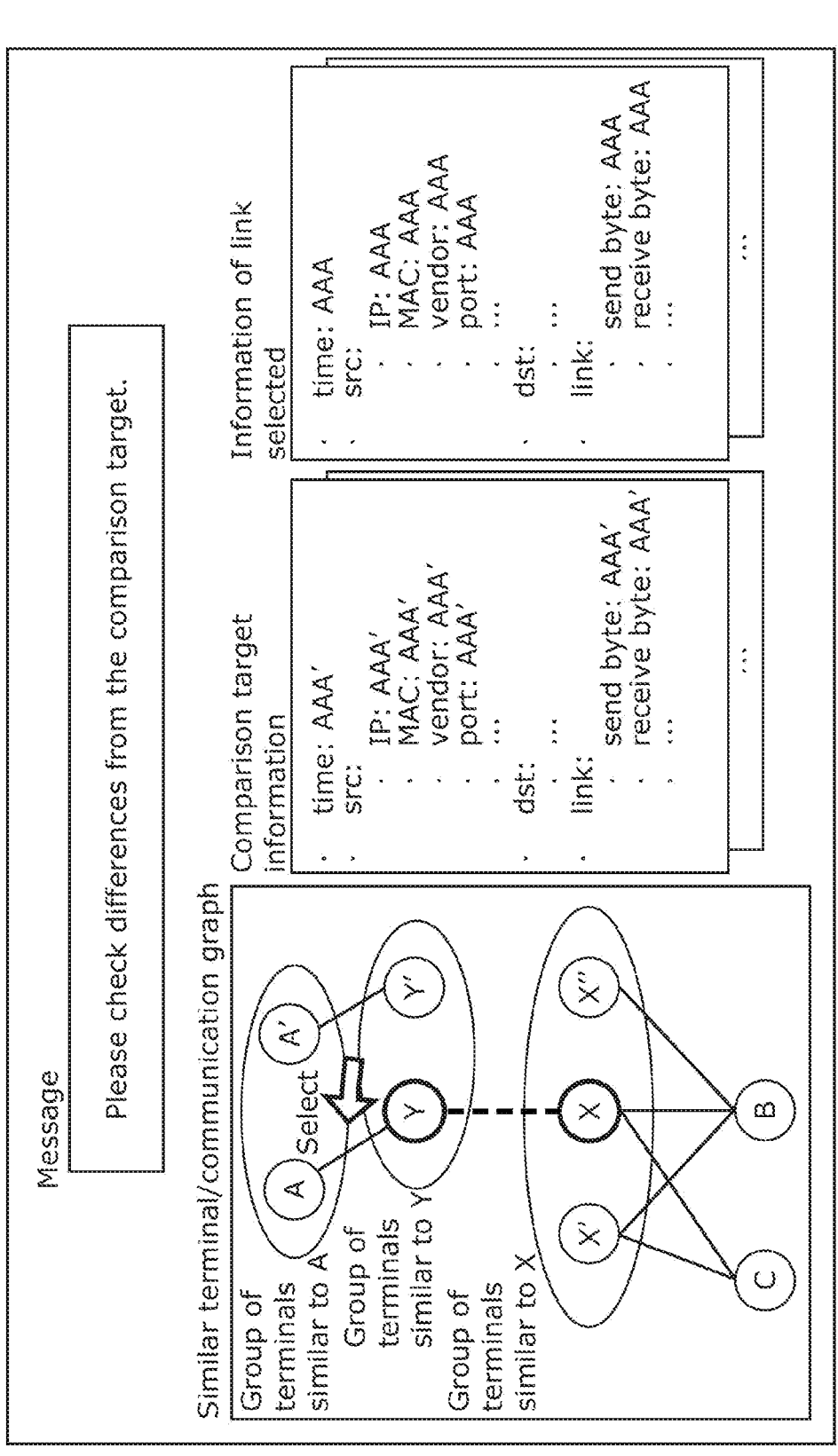
FIG. 14C is a diagram illustrating one example of screen information according to Embodiment 1 that is displayed on a screen when there is a secondary similar communication link while there is no primary similar communication link.

FIG. 14A to FIG. 14C are diagrams each illustrating one example of screen information according to Embodiment 1 that is displayed on a screen when there is a secondary similar communication link while there is no primary similar communication link. Elements that are substantially the same as those illustrated in FIG. 13A to FIG. 13C are assigned the same names and detailed description thereof will be omitted.

The similar terminals/communication graphs illustrated in FIG. 14A to FIG. 14C are different from the similar terminals/communication graphs illustrated in FIG. 13A to FIG. 13C in that there is no communication link (primary similar communication link) similar to the new link (non-WL communication link) connecting terminals X, Y.

Therefore, in the similar terminals/communication graphs illustrated in FIG. 14A to FIG. 14C, there are only a new link and a secondary similar communication link. Therefore, the content of the message illustrated in FIG. 14A is different from the content of the message illustrated in FIG. 13A.

The message illustrated in FIG. 14A includes an indication that a primary similar communication link similar to a new link that is a non-WL communication link has not been established in the past and an indication that a secondary similar communication link has been established in the past. Since the content of the message illustrated in FIG. 14A is one example and there is a possibility that the non-WL communication link may be anomalous, it is sufficient that the content of the message be a reminder prompting the analyst to check the non-WL communication link without fail. The message indicated in FIG. 14A further includes an indication that when a link is selected, a similar link will be highlighted. Thus, a message content related to an operating procedure for guiding a user may be included.

Next, assume that by following the guidance in the message indicated in FIG. 14A, an analyst has selected the communication link between terminal Y' and terminal A', which is one of the secondary similar communication links in FIG. 14A. In this case, as illustrated in FIG. 14B, the communication link between terminal Y' and terminal A' and the communication link between terminal Y and terminal A are shown with highlights as the secondary similar communication links.

Furthermore, as illustrated in FIG. 14B, the information of the secondary similar communication link that is the communication link between terminal Y' and terminal A' that has been selected in FIG. 14A is displayed as the information of the link selected.

Next, assume that by following the guidance in the message indicated in FIG. 14B, an analyst has selected the communication link between terminal Y and terminal A, which is one of the secondary similar communication links highlighted in FIG. 14B. In this case, the comparison information illustrated in FIG. 14C, that is, the information of the communication link between terminal Y' and terminal A' (the information of the link selected) and the information of the communication link between terminal Y and terminal A (the comparison target information) are displayed.

Thus, an analyst can compare or check the details of a new link (non-WL communication link) and the details of the secondary similar communication link shown in screen information such as that illustrated in FIG. 14C to check, from the role, etc., of a terminal in the new link (non-WL communication link), whether the communication is normal. Note that if merely comparing and checking the details shown in the screen information such as that illustrated in FIG. 14C do not lead to a definitive determination that the non-WL communication link is normal or anomalous, an analyst may conduct a separate, detailed analysis.

Figure 15A:
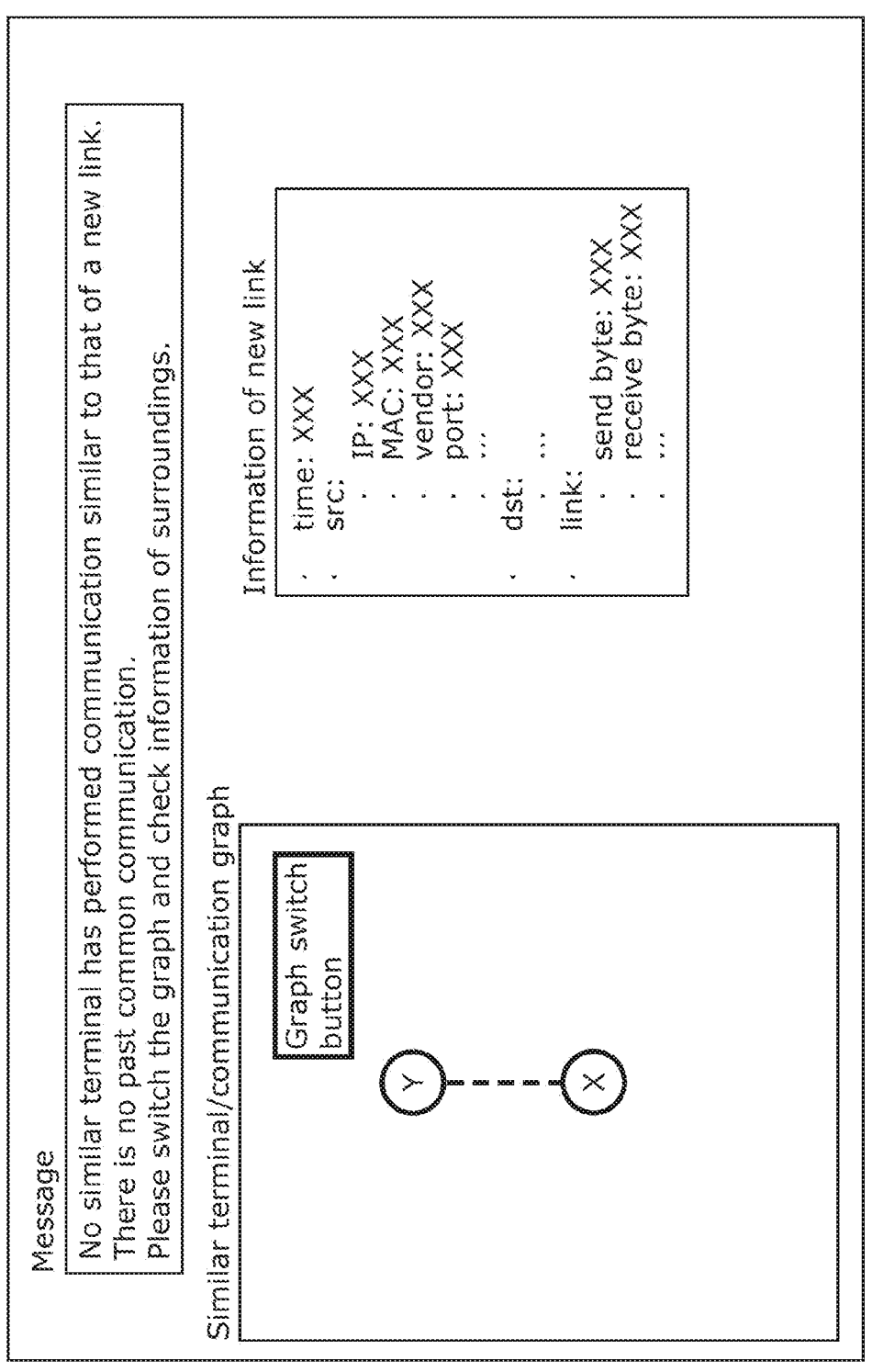
FIG. 15A is a diagram illustrating one example of screen information according to Embodiment 1 that is displayed on a screen when there are no primary similar communication link and no secondary similar communication link.

FIG. 15A is a diagram illustrating one example of screen information according to Embodiment 1 that is displayed on a screen when there are no primary similar communication link and no secondary similar communication link. Elements that are substantially the same as those illustrated in FIG. 13A to FIG. 13C are assigned the same names and detailed description thereof will be omitted.

The similar terminal/communication graph illustrated in FIG. 15A is different from the similar terminals/communication graphs illustrated in FIG. 13A to FIG. 13C in that there are neither primary similar communication links nor secondary similar communication links for the new link (non-WL communication link) connecting terminals X, Y. Therefore, the content of the message illustrated in FIG. 15A is different from the content of the messages illustrated in FIG. 13A and FIG. 14A.

The message indicated in FIG. 15A includes an indication that the primary similar communication link and the secondary similar communication link for a new link that is a non-WL communication link have not been established in the past. Furthermore, the message indicated in FIG. 15A includes a message prompting an analyst to switch the graph and check information of the surroundings. Thus, a message content related to an operating procedure for guiding a user may be included.

Figure 15B:
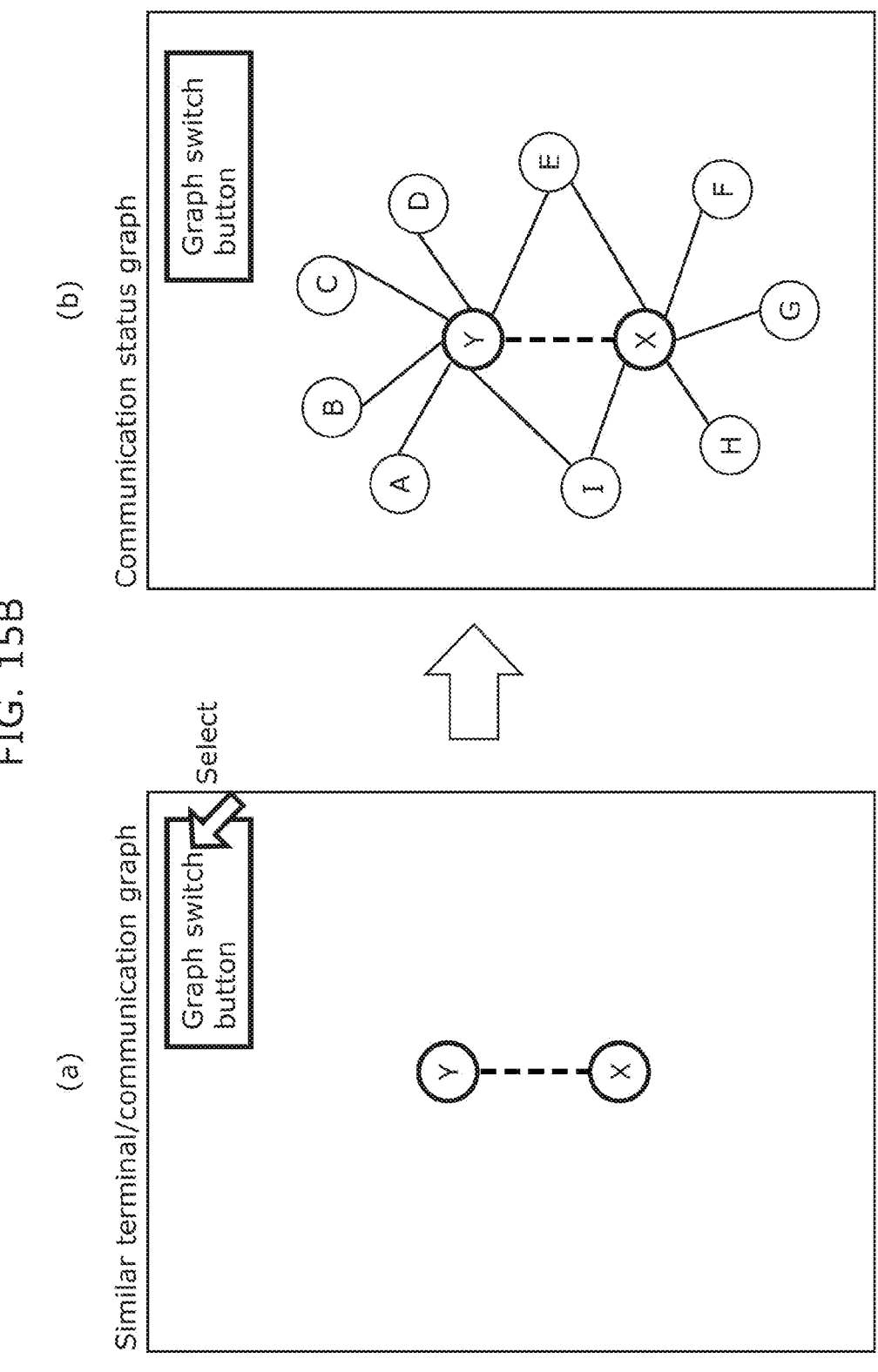
FIG. 15B is a diagram illustrating an example of switching of screen information according to Embodiment 1.

FIG. 15B is a diagram illustrating an example of switching of screen information according to Embodiment 1. FIG. 15B is one example of the graph information created by analysis auxiliary graph creation system 21. FIG. 15B illustrates, in (a), the similar terminal/communication graph included in the screen information, and illustrates, in (b), the communication status graph included in the screen information. Pressing the graph switch button allows switching between the similar terminal/communication graph and the communication status graph. The communication status graph is a graph used for existing IDS products; all the terminals which the source terminal and the destination terminal of communication that is a cause of an alert have communicated in the past are shown in the communication status graph.

The similar terminal/communication graph and the communication status graph have different purposes of use. By switching between the terminal/communication graph and the communication status graph, an analyst can use both the graphs to understand an alert generated.

1.3.4 Example of Screen after Analysis of Non-WL Communication

The following will describe an example of the screen displayed after the non-WL communication is analyzed using the screen information illustrated in FIG. 13A to FIG. 15B.

Figure 16:
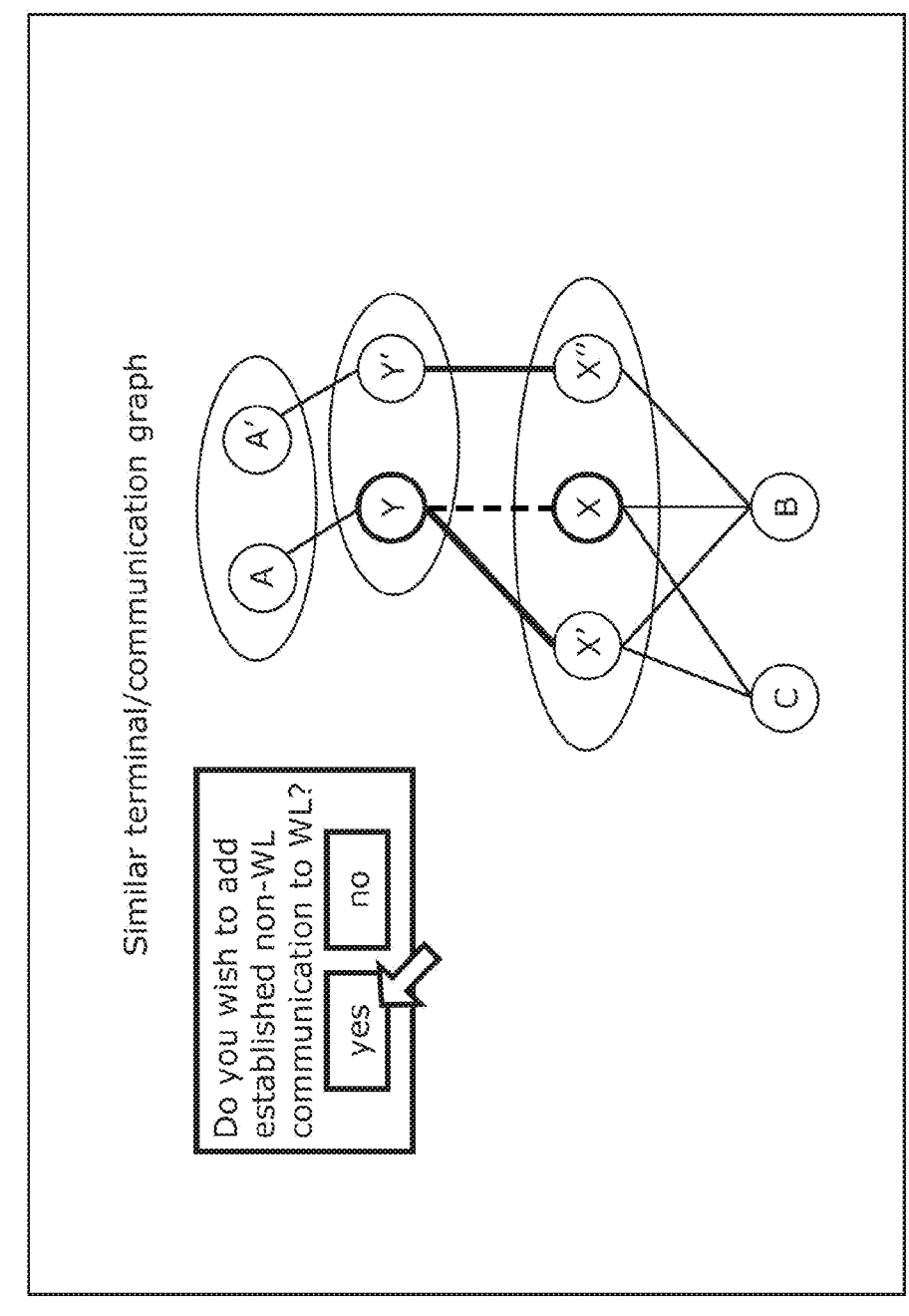
FIG. 16 is a diagram illustrating one example of screen information according to Embodiment 1 that is displayed on a screen when adding non-WL communication to WL.

FIG. 16 is a diagram illustrating one example of screen information according to Embodiment 1 that is displayed on a screen when adding non-WL communication to WL. The screen information illustrated in FIG. 16 is one example of the graph information created by analysis auxiliary graph creation system 21. In the example illustrated in FIG. 16, NW graph display 2110 shows, in the input window, a message such as "Do you wish to add the established non-WL communication to the WL?" and an operation button for determining whether to add the non-WL communication to the WL.

In the present exemplary embodiment, using the screen information illustrated in FIG. 13A to FIG. 15B, an analyst analyzes the non-WL communication and when determining that said non-WL communication is normal, the analyst selects the non-WL communication link, allowing the input window to be displayed. Subsequently, it is sufficient that the analyst press the operation button "Yes", for example, in the input window displayed. Thus, WL change operator 2108 adds said non-WL communication to whitelist 22.

In this manner, an analyst can add the non-WL communication to whitelist 22 by a simple operation. Thus, even when said non-WL communication link is established, a false detection can be avoided, allowing for a reduction in the occurrence of false detections.

Figure 17:
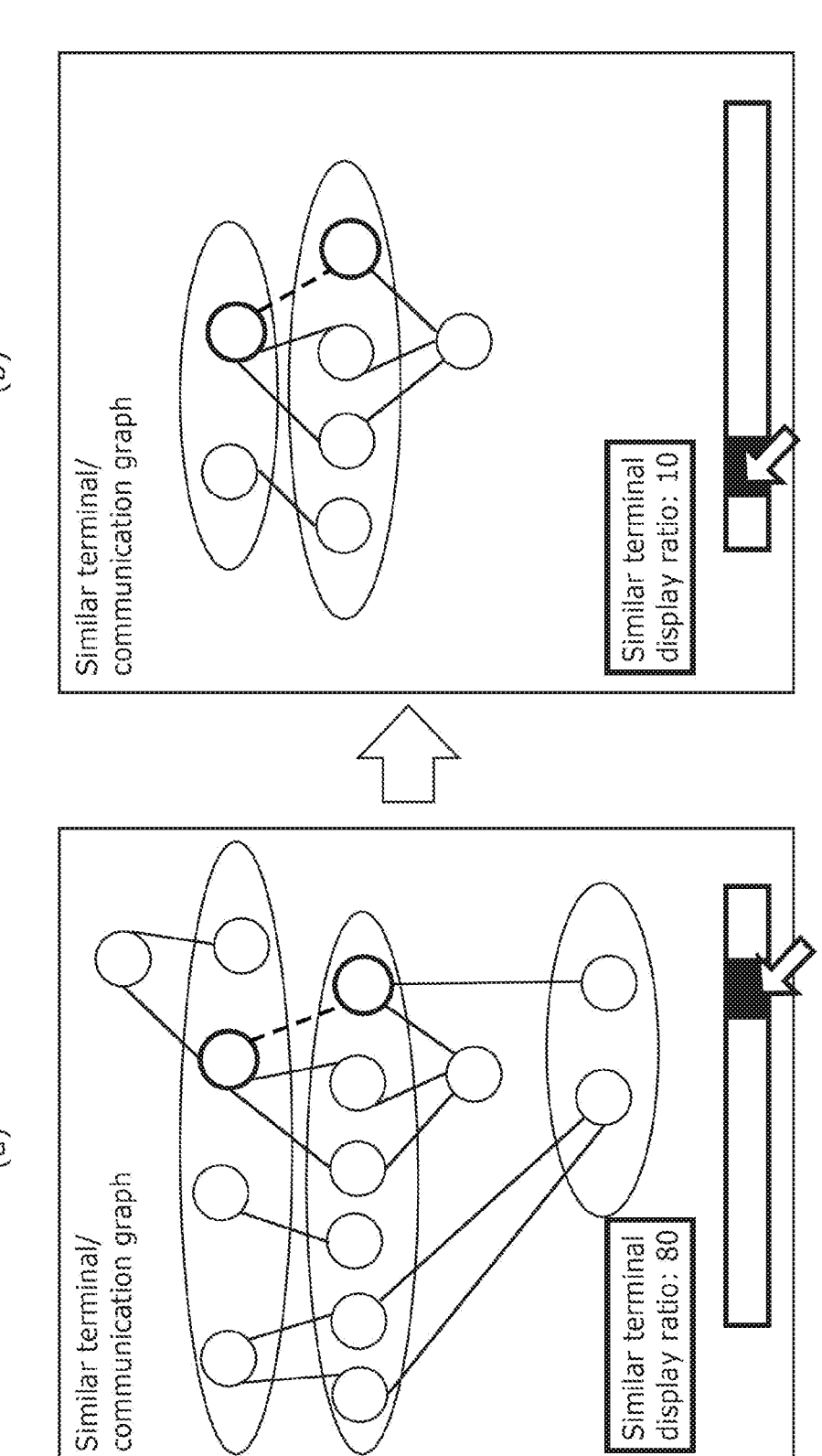
FIG. 17 is a diagram illustrating one example of a portion of screen information according to Embodiment 1 that is displayed on a screen when adjusting range a similar a display of terminal/communication graph.

1.3.5 Example of Screen for Adjusting Display Range of Similar Terminal/Communication Graph FIG. 17 is a diagram illustrating one example of a portion of screen information according to Embodiment 1 that is displayed on the screen when adjusting the display range of the similar terminal/communication graph. The similar terminal/communication graph illustrated in FIG. 17 is a portion of the screen information and is one example of the graph information created by analysis auxiliary graph creation system 21. Furthermore, the similar terminal/communication graph illustrated in FIG. 17 includes a scrollbar for adjusting, by NW graph display 2110, a threshold value of the degree of similarity between each of the terminals (the destination terminal and the source terminal) of the non-WL communication link and a terminal similar thereto. According to the threshold value changed by an analyst operation on the scrollbar, the NW graph with an updated number of similar terminals is displayed on the screen. Note that with the default settings, the position of the scrollbar has been adjusted so that the number of similar terminals is approximately 10, for example.

In the example illustrated in FIG. 17, the scrollbar corresponds to the display ratio of similar terminals, and the position of the scrollbar with the default settings is in the middle (where the display ratio is 50), for example. As illustrated in (a) in FIG. 17, when the scrollbar is moved to the right and the display ratio increases to 80, the threshold value of the degree of similarity is reduced, meaning that even similar terminals having a low degree of similarity with the terminals of the non-WL communication link are displayed on the similar terminal/communication graph. In contrast, as illustrated in (b) in FIG. 17, when the scrollbar is moved to the left and the display ratio increases to 10, the threshold value of the degree of similarity is increased, meaning that only similar terminals having a high degree of similarity with the terminals of the non-WL communication link are displayed on the similar terminal/communication graph.

In this manner, in the example illustrated in FIG. 17, the display range of terminals similar to the terminals of the non-WL communication link can be adjusted by an operation on the scrollbar, and thus checking of the validity of the non-WL communication can be made easier.

1.4 Advantageous Effects, Etc

With the whitelist often used to detect a cyber-attack, a false detection tends to occur due to an insufficient learning period or the like. Assume that the use of a whitelist in the operation begins while learning thereof is still insufficient; when non-WL communication that is actually normal is established, an analyst is supposed to manually analyze said non-WL communication and add said non-WL communication to the whitelist, which may impose a burden on the analyst and lead to a failure to properly handle a cyber-attack to be dealt with. A method for determining priorities for non-WL communication through machine learning has been proposed, but an analyst may find it difficult to intuitively judge whether non-WL communication that has been given a rank of priority is anomalous, which may result in the failure to properly address the issue.

In contrast, with the communication analysis system according to Embodiment 1 described above, it is possible to easily analyze whether non-WL communication is anomalous.

More specifically, using the past communication information and the primary similar communication link for a newly established non-WL communication link, the communication analysis system according to Embodiment 1 can create a NW graph for analysis as graph information for analyzing said non-WL communication. Note that using the past communication information and the primary similar communication link and the secondary similar communication link for a newly established non-WL communication link, a NW graph for analysis can be created as graph information for analyzing said non-WL communication. Thus, since the details of the newly established non-WL communication to be checked are extracted and displayed as the NW graph for analysis, a user who is an analyst can use the NW graph for analysis to intuitively judge whether the non-WL communication is anomalous and easily check the validity of said non-WL communication.

In the NW graph for analysis, information is presented that indicates whether a terminal similar to a terminal of the non-WL communication link has performed communication similar to the non-WL communication. Note that the similar terminal is a terminal having a communication tendency similar to that of a terminal of the non-WL communication link or a terminal having a role similar to that of a terminal of the non-WL communication link as described above. The fact that said non-WL communication is valid refers to the fact that said non-WL communication is communication that should be established in normal operation. In contrast, the fact that said non-WL communication is anomalous refers to the fact that said non-WL communication is communication that should not be established in normal operation.

Thus, with the communication analysis system according to Embodiment 1, the information for assisting an alert analysis of the newly established non-WL communication can be presented to an analyst, allowing for an efficient alert analysis of the non-WL communication link.

Furthermore, the communication analysis system according to Embodiment 1 may create a message as auxiliary information for an analyst to conduct an analysis, and display the message. This allows a user to use the message to understand the operating procedure and cause the comparison information to be displayed, or find whether there is primary similar communication similar to the non-WL communication, for example, and cause the information to be compared and checked to be displayed, for example; thus, the user can easily conduct an analysis.

Embodiment 2

Embodiment 1 describes communication analysis system 20 that is used while whitelist 22 that has completed learning is used in operation. Embodiment 2 will describe communication analysis system 20A that is used before whitelist 22 that has completed learning is put into operation.

In the case where whitelist 22 is used on-site, a learning period in which learning of whitelist 22 can become sufficient is unknown because said learning period varies from site to site. There are also cases where a sufficient learning period cannot be provided because the operation is started earlier than anticipated. When whitelist 22 that has not undergone sufficient learning is used in operation, a normal communication link may be falsely detected as a non-WL communication link and moreover, a large number of such false detections may occur. Furthermore, it is difficult to manually add information of a normal communication link included in the equipment information or the like to whitelist 22 that has not undergone sufficient learning before the start of operation because there are innumerable communication links that have not been established in the learning period.

In this regard, the inventors discovered that when an unestablished communication link that had not been established in the learning period, but is likely to be a normal communication link is added to the whitelist before the whitelist is put into operation, the whitelist can be efficiently used in operation, and it is possible to reduce false detections that occur after the whitelist is applied. Furthermore, the inventors discovered that by efficiently using the whitelist in operation in this manner, it is possible to easily check the validity of non-WL communication that occurs while the whitelist is used in operation, allowing alerts to be more efficiently addressed.

This has led to the idea of communication analysis system 20A capable of providing auxiliary graph information for an analyst to analyze whether innumerable communication links that have not been established in the learning period includes a communication link that can be established as a normal communication link, which will be described below.

Hereinafter, with reference to the drawings, communication analysis system 20A according to Embodiment 2 will be described focusing on features different from those according to Embodiment 1.

2 Overall Configuration

Figure 18:
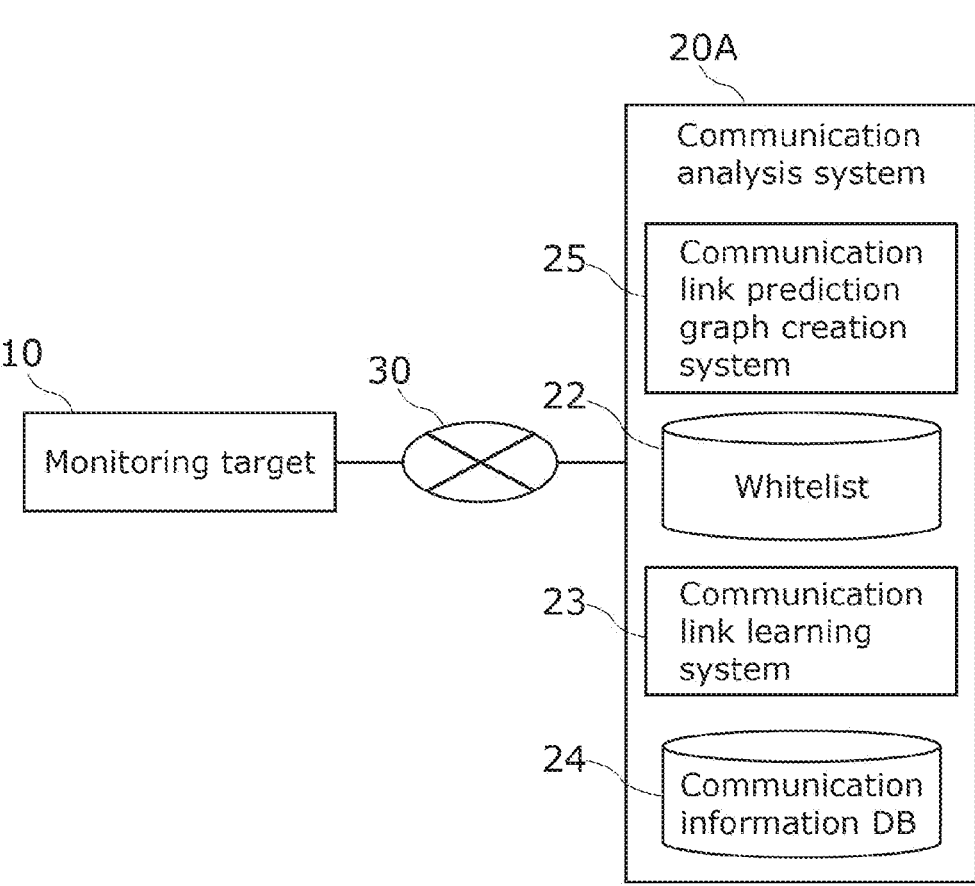
FIG. 18 is a diagram illustrating an overall configuration including a communication analysis system according to Embodiment 2.

FIG. 18 is a diagram illustrating an overall configuration including communication analysis system 20A according to Embodiment 2. Elements that are substantially the same as those illustrated in FIG. 1 are assigned the same reference signs and detailed description thereof will be omitted.

The overall configuration illustrated in FIG. 18 is different from the overall configuration illustrated in FIG. 1 in that communication analysis system 20A has a different configuration. The other parts are as described in Embodiment 1 and thus, description thereof will be omitted.

2.1 Communication Analysis System 20A

Communication analysis system 20A analyzes communication performed in a network of a plurality of terminals in a predetermined environment which are monitoring target 10.

Before whitelist 22 that has completed learning is put into operation, communication analysis system 20A creates and presents graph information for assisting the process of adding, to whitelist 22, a communication link predicted to be established as a normal communication link in the future among innumerable communication links that have not been established in the learning period.

Communication analysis system 20A according to the present exemplary embodiment includes communication link prediction graph creation system 25, whitelist 22, communication link learning system 23, and communication information DB 24, as illustrated in FIG. 18. Communication analysis system 20A illustrated in FIG. 18 is different from communication analysis system 20 illustrated in FIG. 1 in that analysis auxiliary graph creation system 21 is not included, but communication link prediction graph creation system 25 is included. The other parts are as described in Embodiment 1 and thus, description thereof will be omitted.

[2.1.1 Communication Link Prediction Graph Creation System 25]

Communication link prediction graph creation system 25 creates graph information for determining whether to add, to whitelist 22, a communication link of communication that is not included in whitelist 22 and has not been established in the past communication information (an unestablished communication link). In the present exemplary embodiment, using the machine learning model trained at communication link learning system 23 and the past communication information held in communication information DB 24, communication link prediction graph creation system 25 presents a communication link that is not included in whitelist 22, but may be established in the future.

Figure 19A:
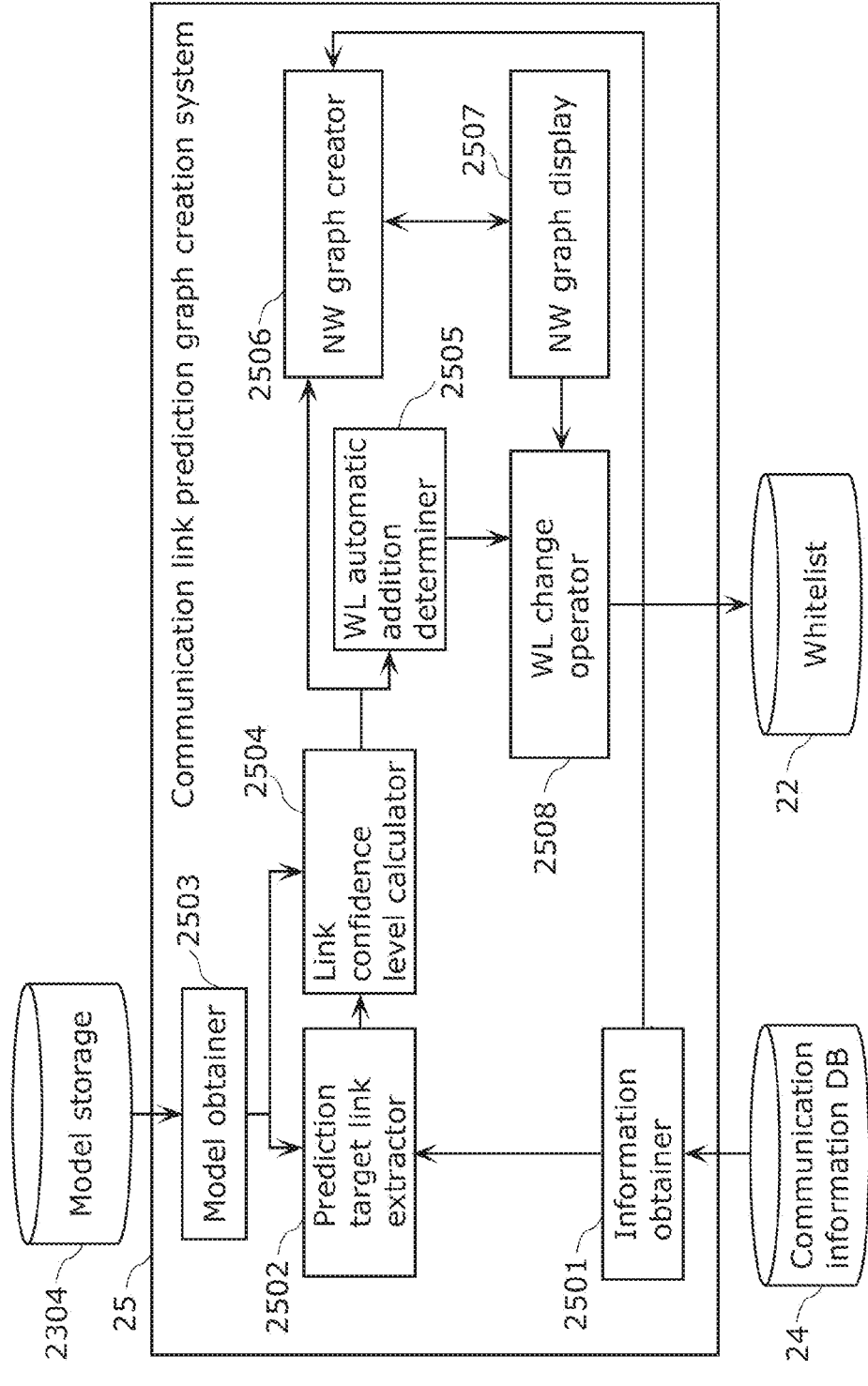
FIG. 19A is a block diagram illustrating one example of the configuration of a communication link prediction graph creation system according to Embodiment 2.
Figure 19B:
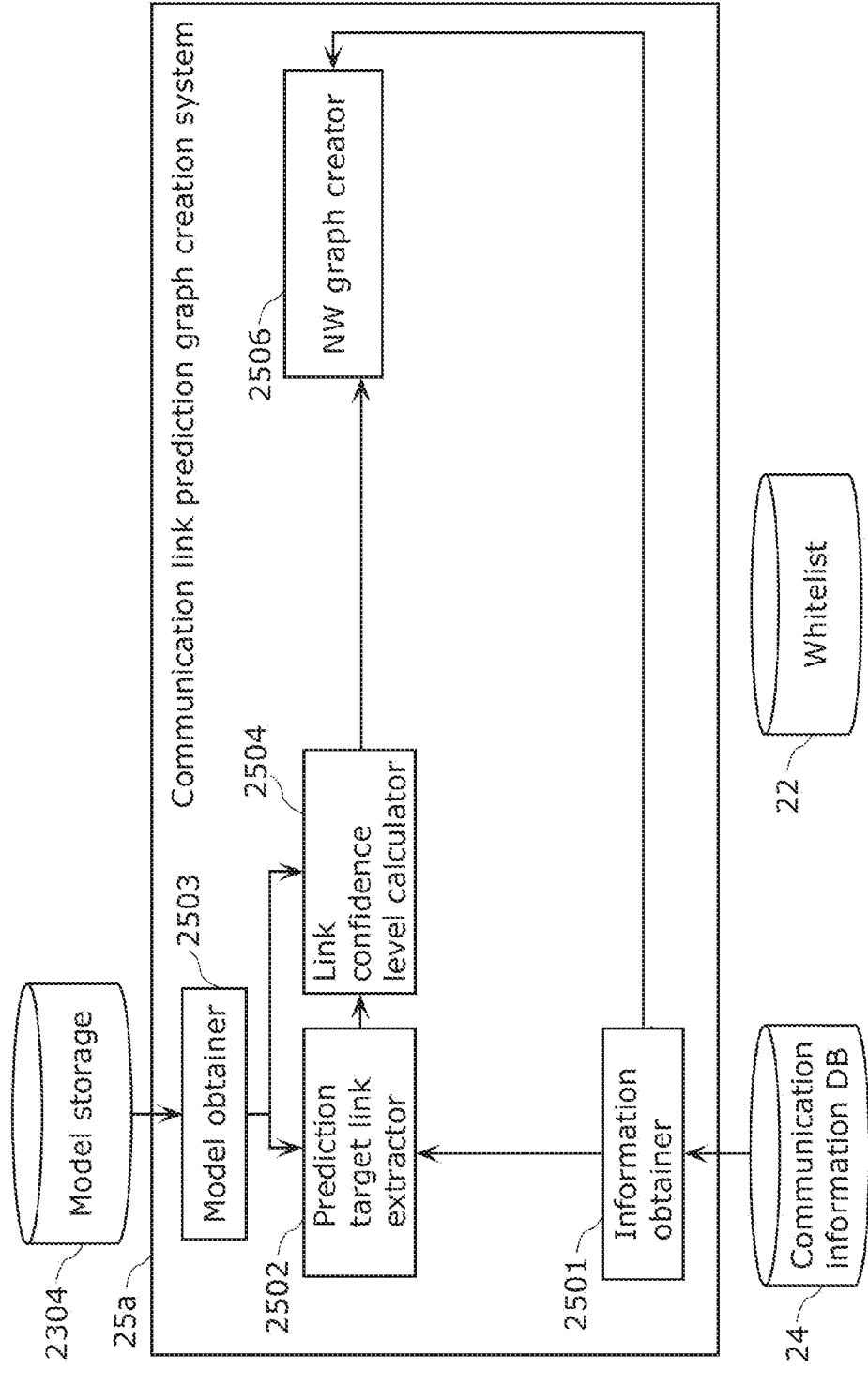
FIG. 19B is a block diagram illustrating minimum elements of the communication link prediction graph creation system illustrated in FIG. 19A.

FIG. 19A is a block diagram illustrating one example of the configuration of communication link prediction graph creation system 25 according to Embodiment 2. FIG. 19B is a block diagram illustrating minimum elements of communication link prediction graph creation system 25 illustrated in FIG. 19A.

As illustrated in FIG. 19A, communication link prediction graph creation system 25 includes information obtainer 2501, prediction target link extractor 2502, model obtainer 2503, link confidence level calculator 2504, WL automatic addition determiner 2505, NW graph creator 2506, NW graph display 2507, and WL change operator 2508. It is sufficient that communication link prediction graph creation system 25a include, as minimum elements, information obtainer 2501, prediction target link extractor 2502, model obtainer 2503, link confidence level calculator 2504, and NW graph creator 2506, as illustrated in FIG. 19B.

Communication link prediction graph creation system 25, which includes a computer including a memory and a processor (a microprocessor), for example, implements the functions of each element by the processor executing a predetermined program stored in the memory.

Information obtainer 2501 obtains past communication information from communication information DB 24. Information obtainer 2501 is, for example, a communication interface. As described above, the past communication information includes communication information indicating which terminal (a destination terminal and a source terminal) each terminal in monitoring target 10 has communicated with in the past using which protocol, for example.

Model obtainer 2503 obtains a machine learning model from model storage 2304 of communication link learning system 23. In the present exemplary embodiment, model obtainer 2503 obtains the machine learning model generated by learning the communication performed by monitoring target 10. As described above, the machine learning model has been trained in communication link learning system 23.

Prediction target link extractor 2502, which includes a computer including a memory and a processor (a microprocessor), for example, may implement the following extraction function by the processor executing a predetermined program stored in the memory.

On the basis of the past communication information obtained by information obtainer 2501, prediction target link extractor 2502 extracts an unestablished communication link which is at least one communication link that is a prediction target and which is a communication link of communication that has not been established in said past communication information. Here, prediction target link extractor 2502 may calculate the degree of similarity between the plurality of terminals using the machine learning model that has been trained, and extract an unestablished communication link using the degree of similarity calculated and the past communication information, for example.

In this manner, on the basis of the past communication information obtained by information obtainer 2501, prediction target link extractor 2502 extracts an unestablished communication link that is a prediction target.

Note that prediction target link extractor 2502 may extract a similar terminal using a predetermined rule. Furthermore, using a predetermined rule, prediction target link extractor 2502 may extract an unestablished communication link that is a prediction target.

Link confidence level calculator 2504, which includes a computer including a memory and a processor (a microprocessor), for example, may implement the following calculation function by the processor executing a predetermined program stored in the memory.

Link confidence level calculator 2504 calculates a confidence level indicating the likelihood that the unestablished communication link extracted by the prediction target link extractor will be established as a normal communication link in the future. The confidence level can also be called the probability that the unestablished communication link will be established in the future, that is, the probability of establishment of the unestablished communication link. Furthermore, for example, using the machine learning model that has been trained, link confidence level calculator 2504 may calculate a confidence level of the unestablished communication link extracted by prediction target link extractor 2502. Note that using a predetermined rule, link confidence level calculator 2504 may calculate a confidence level of the unestablished communication link extracted by prediction target link extractor 2502.

WL automatic addition determiner 2505 implements the following determination function by the processor executing a predetermined program stored in the memory.

By determining whether the confidence level calculated by link confidence level calculator 2504 is greater than or equal to a threshold value, WL automatic addition determiner 2505 determines whether to add communication of the unestablished communication link to whitelist 22. For example, when WL automatic addition determiner 2505 determines that the calculated confidence level is greater than or equal to the threshold value, WL automatic addition determiner 2505 instructs WL change operator 2508 to add, to whitelist 22, the communication of the unestablished communication link that has a confidence level greater than or equal to the threshold value. This allows WL automatic addition determiner 2505 to cause WL change operator 2508 to add, to whitelist 22, the communication of the unestablished communication link that has a confidence level greater than or equal to said threshold value.

In this manner, in the present exemplary embodiment, WL automatic addition determiner 2505 allows whitelist 22 to automatically incorporate an unestablished communication link having a confidence level, which is calculated by link confidence level calculator 2504, greater than or equal to said threshold value. Note that WL automatic addition determiner 2505 may be configured to operate only when the setting of automatic addition to whitelist 22 is ON.

NW graph creator 2506, which includes a memory and a processor (a microprocessor), for example, may implement the following creation function by the processor executing a predetermined program stored in the memory.

NW graph creator 2506 creates graph information for assisting the process of adding, to whitelist 22, a communication link that is predicted to be established as a normal communication link in the future among communication links that have not been established in the learning period. More specifically, using the unestablished communication link extracted by prediction target link extractor 2502, the confidence level calculated by link confidence level calculator 2504, and the past communication information obtained by information obtainer 2501, NW graph creator 2506 creates graph information for determining whether to add a communication link to whitelist 22. The graph information created herein includes a NW graph in which the unestablished communication link and the information regarding the unestablished communication link are mapped, for example.

In the present exemplary embodiment, NW graph creator 2506 creates a NW graph in which an unestablished communication link has been mapped on the communication link established in the past, and further maps, on the NW graph created, information regarding the confidence level and a list of unestablished communication links, thereby creating graph information. Furthermore, according to a user operation, NW graph creator 2506 may create information regarding the NW graph and cause NW graph display 2507 to display the information.

NW graph display 2507 displays, on the screen, the NW graph created by NW graph creator 2506. NW graph display 2507, which is a display or a touch panel, for example, may perform various processes according to an operation performed at a predetermined position on the touch panel or an operation performed at a predetermined position on the display using an input device such as a computer mouse.

In the present exemplary embodiment, NW graph display 2507 presents, in addition to the NW graph created by NW graph creator 2506, information regarding said NW graph such as the list of unestablished communication links included in said NW graph, to a user who is an analyst. Moreover, NW graph display 2507 may further present, to the user, information regarding the NW graph created according to a user operation.

Here, for example, in the case were NW graph display 2507 displays, on the screen, the list of unestablished communication links included in the NW graph, NW graph display 2507 may display, on the screen, a checkbox that allows, for each of the unestablished communication links in said list, a user to select whether to add the unestablished communication link to whitelist 22. Subsequently, NW graph display 2507 may further display, on the screen, a button for adding, to whitelist 22, the unestablished communication link selected by using the checkbox among the unestablished communication links in said list. Thus, the user can add the unestablished communication link to whitelist 22 by a simple operation.

Furthermore, for example, NW graph display 2507 may display, on the screen, a scrollbar for performing the operation to adjust the threshold value of the confidence level of the unestablished communication link. In this case, according to the threshold value changed by the user operation performed on scrollbar, NW graph display 2507 can update the unestablished communication link and the information regarding the unestablished communication link to be shown in the NW graph, and display, on the screen, the unestablished communication link and the information regarding the unestablished communication link that have been updated. Such an operation performed on the scrollbar allows adjustment to the unestablished communication link and the information regarding the unestablished communication link (the display range thereof). This allows a user to easily determine whether the unestablished communication link is likely to be established as a normal communication link in the future; thus, an unestablished communication link that is likely to be established as a normal communication link in the future can be added to whitelist 22.

Furthermore, NW graph display 2507 may display, on the screen, comparison information for determining whether to add the selected unestablished communication link to whitelist 22 when a user selects one of the unestablished communication links in the NW graph displayed on the screen. The comparison information includes: detailed information of the unestablished communication link selected; and detailed information of past communication that is included in the past communication information and is similar to the unestablished communication link selected; these are displayed side by side on the screen.

When such comparison information is displayed, it is possible to easily determine whether the unestablished communication link is likely to be established as a normal communication link in the future. Note that NW graph display 2507 may display a message related to an operating procedure for displaying the comparison information and guide a user so that the comparison information is displayed on the screen. Thus, by referring to the operating procedure, the user can cause the comparison information to be displayed.

WL change operator 2508 adds the communication of the unestablished communication link to whitelist 22 according to an instruction from a user. In the present exemplary embodiment, according to an instruction from NW graph display 2507 or an instruction from WL automatic addition determiner 2505, WL change operator 2508 adds, to whitelist 22, the communication of the unestablished communication link having a confidence level greater than or equal to the threshold value.

2.2 Operation of Communication Analysis System 20A

Next, the operation of communication analysis system 20A configured as described above will be described.
[2.2.1 Operation in Analysis Method]
FIG. 20 is a flowchart illustrating an operation in an analysis method performed by communication analysis system 20A according to Embodiment 2. FIG. 20 illustrates, as the operation in the analysis method, a communication link prediction graph creation process performed by the minimum elements of communication link prediction graph creation system 25 illustrated in FIG. 19B.

First, communication link prediction graph creation system 25 of communication analysis system 20A obtains the past communication information from communication information DB 24 (S21). More specifically, communication link prediction graph creation system 25 obtains the past communication information from communication information DB 24 that holds past communication information including information indicating the past communication performed by monitoring target 10.

Next, communication link prediction graph creation system 25 extracts an unestablished communication link on the basis the past communication information obtained in Step S21 (S22). The unestablished communication link is at least one communication link that is a prediction target and is a communication link of communication that is not included in whitelist 22 and has not been established in the past communication information.

Next, communication link prediction graph creation system 25 calculates a confidence level indicating the likelihood that the unestablished communication link extracted in Step S22 will be established as a normal communication link in the future (S23).

Next, using the unestablished communication link extracted in Step S22, the confidence level calculated in Step S23, and the past communication information obtained, communication link prediction graph creation system 25 creates a NW graph in which the unestablished communication link and the information regarding the unestablished communication link are mapped (S24).

By using such an analysis method, before whitelist 22 is put into operation, it is possible to create graph information for assisting the process of adding, to whitelist 22, a communication link predicted to be established as a normal communication link in the future among communication links that have not been established in the learning period.
[2.2.2 Detailed Operation in Analysis Method]
Next, a communication link prediction graph creation process performed by communication analysis system 20A illustrated in FIG. 19A will be described as a detailed operation in the analysis method.

FIG. 21 is a flowchart illustrating the overall process of communication link prediction graph creation system 25 according to Embodiment 2.

First, communication link prediction graph creation system 25 determines whether a WL learning period, that is, the learning period for whitelist 22, has ended (S51). The learning period is, for example, a period in which the past communication information used to create whitelist 22 is collected and in which the past communication performed by monitoring target 10 and included in the past communication information is collected.

When the WL learning period has not ended in Step S51 (no in S51), communication link prediction graph system 25 ends the processing.

On the other hand, when the WL learning period has ended in Step S51 (yes in S51), communication link prediction graph system 25 extracts all the communication links observed in the learning period (S52). In the present embodiment, communication link prediction graph system 25 extracts all the communication links from the past communication information.

Next, using all the communication links extracted in Step S52, communication link prediction graph creation system 25 performs an unestablished communication link selection process of selecting an unestablished communication link that is a prediction target (S53).

Next, communication link prediction graph system 25 performs a confidence level calculation process of calculating a confidence level of the unestablished communication link that has been selected in Step S53 (S54).

Next, communication link prediction graph system 25 extracts an established communication link having a confidence level, which has been calculated in Step S54, greater than or equal to the threshold value among the unestablished communication links selected in Step S53 (S55).

Next, communication link prediction graph creation system 25 checks whether the setting of WL addition is the setting of automatic addition (S56).

When the setting of WL addition is the setting of automatic addition in Step S56 (yes in S56), communication link prediction graph creation system 25 adds, to whitelist 22, the unestablished communication link extracted in Step S55 (S57).

On the other hand, when the setting of WL addition is not the setting of automatic addition in Step S56 (no in S56), communication link prediction graph creation system 25 performs a NW graph creation process of creating a NW graph related to the unestablished communication link extracted in Step S55 (S58). The NW graph created here is graph information for assisting the process of adding, to whitelist 22, the communication link that is predicted to be established as a normal communication link in the future. Note that the graph information may include: a NW graph indicating the communication link established in the past; and information for displaying, on said NW graph, the unestablished communication link extracted in Step S55, for example.

With reference to FIG. 22 to FIG. 27, Step S53, Step S54, and Step S58 indicated in FIG. 21 will be described in detail below.

Figure 22:
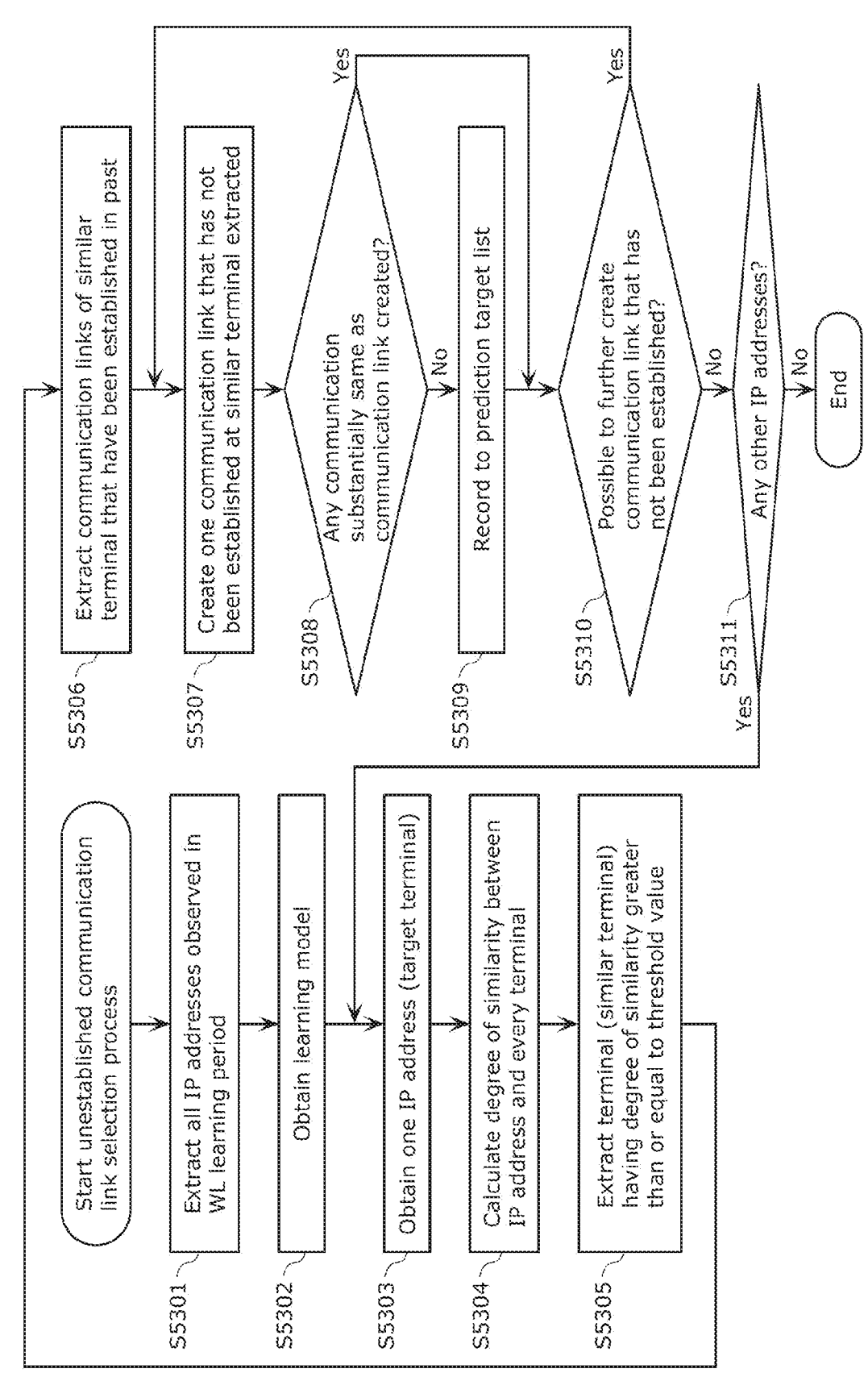
FIG. 22 is a flowchart illustrating one example of an unestablished communication link selection process illustrated in FIG. 21.

FIG. 22 is a flowchart illustrating one example of the unestablished communication link selection process illustrated in FIG. 21. FIG. 22 illustrates the unestablished communication link selection process performed by prediction target link extractor 2502 of communication link prediction graph creation system 25.

As indicated in FIG. 22, first, prediction target link extractor 2502 extracts the IP address observed in the WL learning period (S5301). In the present exemplary embodiment, from the past communication information in communication information DB 24, prediction target link extractor 2502 extracts all the IP addresses as information indicating all the terminals observed. Note that as the information indicating all the terminals observed, all the IP addresses observed and all the protocols observed may be extracted.

Next, prediction target link extractor 2502 obtains the machine learning model trained by communication link learning system 23 (S5302).

Next, prediction target link extractor 2502 obtains (selects) one IP address (target terminal) from among all the IP addresses extracted in Step S5301 (S5303).

Next, using the machine learning model obtained in Step S5302, prediction target link extractor 2502 calculates a degree of similarity between every one of the terminals and the target terminal having the IP address obtained (S5304). The terminals herein are terminals each having one of all the IP addresses observed in the past and included in the past communication information.

Next, prediction target link extractor 2502 extracts, as a similar terminal, a terminal having a degree of similarity, which has been calculated in Step S5304, greater than or equal to a threshold value (S5305). In the present exemplary embodiment, using the machine learning model obtained in Step S5302, prediction target link extractor 2502 calculates a degree of similarity between the target terminal and every one of the terminals observed thus far. This machine learning model has acquired the vector representation of each of the plurality of terminals in monitoring target 10 described above.

Note that the graph analysis technique disclosed in NPL 2 can be used as a method for calculating a degree of similarity between terminals. Specifically, first, using the machine learning model generated by learning the past communication information, that is, the machine learning model obtained in Step S5302, an embedded vector of a fixed length is calculated as the vector representation of every one of the terminals observed thus far. Next, a degree of cosine similarity between the vector representations of the target terminal and every one of the terminals is calculated, and thus the degree of similarity is obtained.

Next, from the past communication information obtained, prediction target link extractor 2502 extracts all the communication links of the similar terminal that have been established in the past (S5306). More specifically, prediction target link extractor 2502 extracts a communication protocol involving the similar terminal as a source terminal or a destination terminal from a communication link that is a unique combination of a source terminal, a destination terminal, and a communication protocol (a communication triplet) included in the past communication information. For example, using the machine learning model obtained in Step S5302, prediction target link extractor 2502 extracts a communication protocol involving the similar terminal as a source terminal or a destination terminal from the aforementioned communication link that is a unique combination.

Next, prediction target link extractor 2502 creates one communication link (such as a combination of a source terminal, a destination terminal, and a communication protocol) that has not been established at the similar terminal obtained in Step S5306 (S5307). Specifically, prediction target link extractor 2502 creates one communication link (such as a combination of a source terminal, a destination terminal, and a communication protocol) that has not been established and is different from any of the communication links of the similar terminal that have been obtained in Step S5306.

Next, prediction target link extractor 2502 determines whether the past communication information includes communication that is substantially the same as the unestablished communication link that has been created in Step S5307 (S5308). Here, the communication that is substantially the same is, for example, communication of a communication link including the same destination terminal (or the same source terminal) and the same communication protocol as those included in the unestablished communication link.

When the past communication information does not include communication that is substantially the same in Step S5308 (no in Step S5308), prediction target link extractor 2502 records the communication link created in Step S5307 to a prediction target list as an unestablished communication link candidate (S5309).

Figures 23, 24, 25:
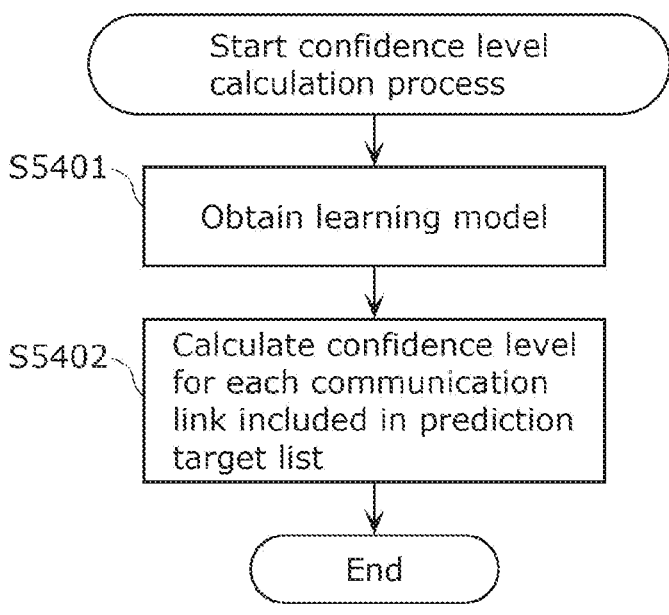
FIG. 23 is a diagram illustrating one example of a prediction target list including an unestablished communication link candidate according to Embodiment 2.
FIG. 24 is a flowchart illustrating one example of a confidence level calculation process illustrated in FIG. 21.
FIG. 25 is a diagram illustrating one example of a prediction target list according to Embodiment 2 to which a confidence level calculated has been added.

FIG. 23 is a diagram illustrating one example of the prediction target list including the unestablished communication link candidate according to Embodiment 2. In the example illustrated in FIG. 23, prediction target link extractor 2502 records the communication link created in Step S5307, in the form of a communication triplet including a source terminal (Src IP), a destination terminal (Dst IP), and a communication protocol (Protocol).

On the other hand, when the past communication information includes communication that is substantially the same in Step S5308 (yes in Step S5308), prediction target link extractor 2502 determines whether it is possible to further create a communication link that has not been established at the similar terminal obtained in Step S5306 (S5310). In other words, prediction target link extractor 2502 determines whether it is possible to create a communication link that has not been established at the similar terminal obtained in Step S5306 other than the unestablished communication link created in Step S5307.

When there is another past communication link in Step S5310 (yes in Step S5310), prediction target link extractor 2502 returns to Step S5307, and selects (obtains) the next one communication link from among the communication links of the similar terminal that have been obtained in Step S5306.

On the other hand, when there is no other past communication link in Step S5310 (no in Step S5310), prediction target link extractor 2502 determines whether there is another IP address (S5311). In other words, prediction target link extractor 2502 determines whether there is an IP address other than the IP address selected (obtained) in Step S5303.

When there is another IP address in Step S5311 (yes in Step S5311), prediction target link extractor 2502 returns to Step S5303 and obtains the next one IP address.

On the other hand, when there is no other IP address in Step S5311 (no in Step S5311), prediction target link extractor 2502 ends the processing.

Note that the unestablished communication link selection process is not limited to the processes described with reference to FIG. 22. For example, prediction target link extractor 2502 may first extract a list of all the observed IP addresses and protocols from the past communication information in communication information DB 24. Next, with reference to the extracted list, prediction target link extractor 2502 may create all the combinations of the observed IP addresses and protocols, and extract a combination (thus-far generated combination) of an IP address and a protocol that has been thus far generated. Subsequently, prediction target link extractor 2502 may remove the thus-far generated combination from all the combinations to create a prediction target list which is a list of unestablished communication link candidates.

FIG. 24 is a flowchart illustrating one example of the confidence level calculation process illustrated in FIG. 21. FIG. 24 illustrates the confidence level calculation process performed by link confidence level calculator 2504 of communication link prediction graph creation system 25.

As illustrated in FIG. 24, first, link confidence level calculator 2504 obtains a machine learning model (communication link learning model) (S5401).

Next, using the machine learning model obtained in Step S5401, link confidence level calculator 2504 calculates a confidence level for each communication link included in the prediction target list (S5402). FIG. 25 is a diagram illustrating one example of the prediction target list according to Embodiment 2 to which the confidence level calculated has been added. FIG. 25 illustrates an example in which the confidence level calculated by link confidence level calculator 2504 has been added to the prediction target list illustrated in FIG. 23. In FIG. 25, the confidence level is represented by a score from 0 to 100 where a score closer to 100 indicates higher confidence of presence.

Furthermore, in the present exemplary embodiment, using the machine learning model obtained in Step S5402, link confidence level calculator 2504 calculates a confidence level for each communication link included in the prediction target list. By learning the past communication information, this machine learning model has acquired the vector representation of each of the plurality of terminals in monitoring target 10 and also has acquired a matrix representation related to the relationship such as the protocol. Therefore, using this machine learning model, a confidence level can be calculated for each communication link.

Note that the graph analysis technique disclosed in NPL 2 can be used as a method for calculating the aforementioned confidence level. Specifically, first, the past communication information is learned, and thus a machine learning model that can also be used as a communication link learning model is generated. The machine learning model generated in this manner has acquired the embedded vector (vector representation) of a fixed length calculated for each terminal and the matrix (matrix representation) calculated for each protocol. Subsequently, using the embedded vector of the fixed length calculated for each terminal and the matrix calculated for each protocol, the confidence level of the target communication link is calculated. For example, when x is the vector of the source terminal of the target communication link, y is the vector of the destination terminal of the target communication link, A is the matrix of the target protocol, and P is the confidence level of the communication link to be calculated, the equation $P = x \times A \times y$ is calculated using the communication link learning model; thus, the confidence level of the communication link can be calculated.

FIG. 26 is a flowchart illustrating one example of the prediction NW graph creation process illustrated in FIG. 21. FIG. 26 illustrates the NW graph creation process that is performed by NW graph creator 2506 of communication link prediction graph creation system 25.

As illustrated in FIG. 26, first, NW graph creator 2506 obtains the past communication information from communication information DB 24 (S5801).

Next, NW graph creator 2506 creates graph information from the past communication information obtained in Step S5801 (S5802). More specifically, NW graph creator 2506 creates graph information for displaying, in the NW graph, past communication links and terminals to be displayed (within the display range) among terminal-to-terminal communication links and terminals that are included in the past communication information obtained in Step S5801.

Next, NW graph creator 2506 obtains the prediction target list recorded by prediction target link extractor 2502 (S5803). The prediction target list includes one or more communication links that are the unestablished communication link candidates created by prediction target link extractor 2502.

Next, NW graph creator 2506 updates the graph information so that among the unestablished communication link candidates included in the prediction target list obtained, an unestablished communication link candidate having a confidence level greater than or equal to a threshold value will be shown with highlights in the NW graph as an unestablished communication link that is likely to be established as normal communication in the future (S5804).

FIG. 27 is a diagram illustrating one example of unestablished communication links in the prediction target list indicated in FIG. 26 that are to be shown with highlights in the NW graph. FIG. 27 illustrates an example in which the threshold value of the score indicating the confidence level is set to 60; the unestablished communication link indicated by a circle (O) will be shown with highlights in the NW graph.

Next, NW graph creator 2506 updates the graph information so that information regarding the unestablished communication link will be shown in the NW graph (S5805).

2.3 Example of Screen

The following will describe an example of a screen on which the graph information is shown.

2.3.1 Example of Screen for Analyzing Unestablished Communication Link

First, an example of a screen will be described on which graph information for analyzing an unestablished communication link that can be established as a normal communication link is displayed before whitelist 22 is put into operation.

Figure 28:
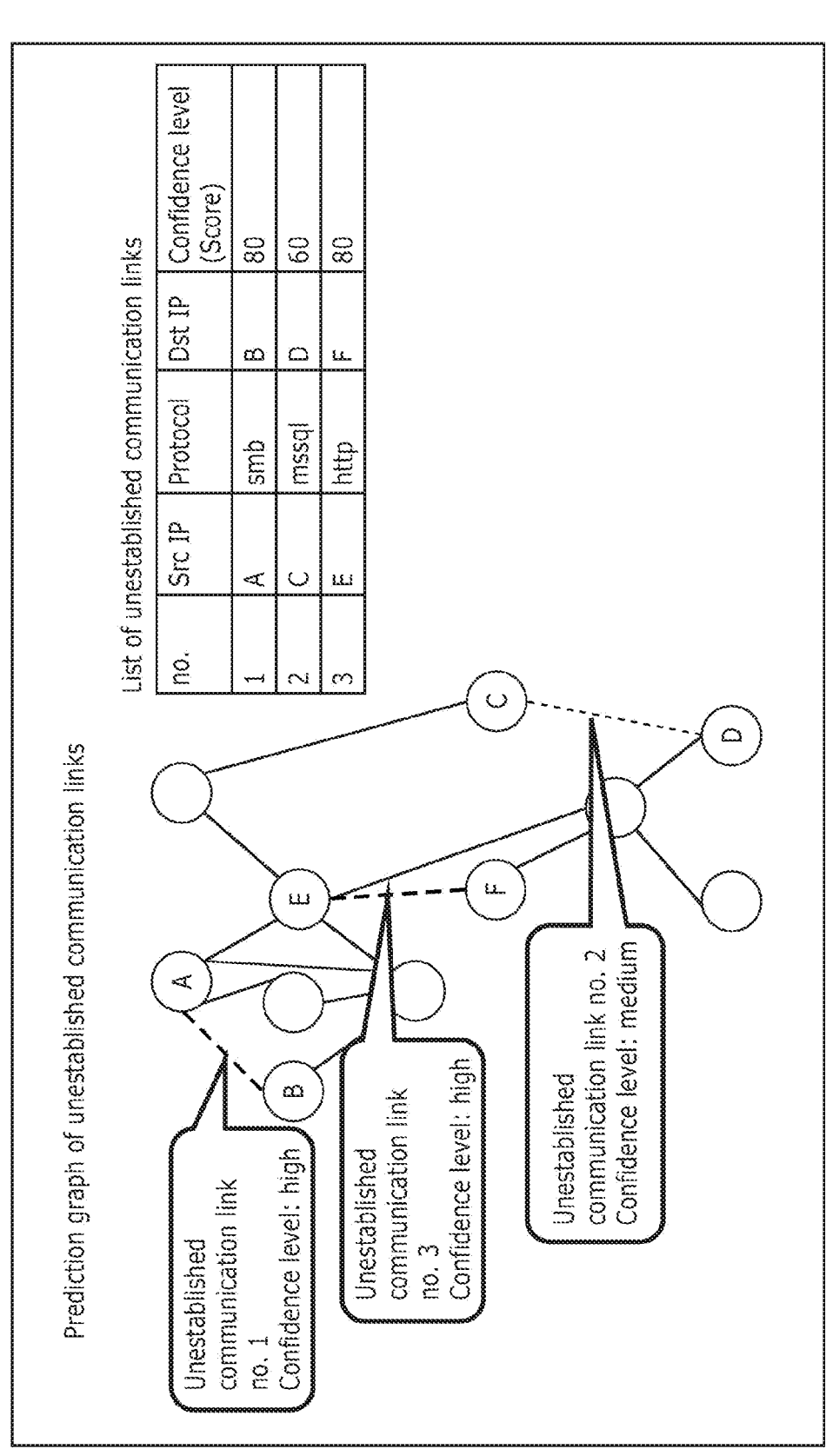
FIG. 28 is a diagram illustrating one example of screen information to be displayed on a screen for analysis of unestablished communication links according to Embodiment 2.

FIG. 28 is a diagram illustrating one example of screen information to be displayed on the screen for analysis of unestablished communication links according to Embodiment 2. The screen information illustrated in FIG. 28, which is one example of the graph information created by communication link prediction graph creation system 25, is presented by NW graph display 2507 to an analyst.

In the example of the screen illustrated in FIG. 28, a prediction graph of unestablished communication links and a list including the unestablished communication links and the confidence levels thereof are shown. The unestablished communication links and the confidence levels thereof correspond to the aforementioned information regarding the unestablished communication link.

The prediction graph of unestablished communication links illustrated in FIG. 28 shows: a NW graph created from the past communication information and showing past communication links within the display range; and unestablished communication links that may be established during the operation. Furthermore, in the example of the screen illustrated in FIG. 28, the information regarding the unestablished communication links appears in word balloons on the unestablished communication links on said NW graph, and among the unestablished communication links on said NW graph, an unestablished communication link having a high confidence level is shown with highlights. Note that the example illustrated in FIG. 28 shows the information regarding the unestablished communication link when the following settings are configured: a confidence level score of not less than 0, but less than 60 indicates "Confidence level: low"; a confidence level score of not less than 60, but less than 80 indicates "Confidence level: medium"; and a confidence level score of not less than 80 indicates "Confidence level: high".

Figure 29:
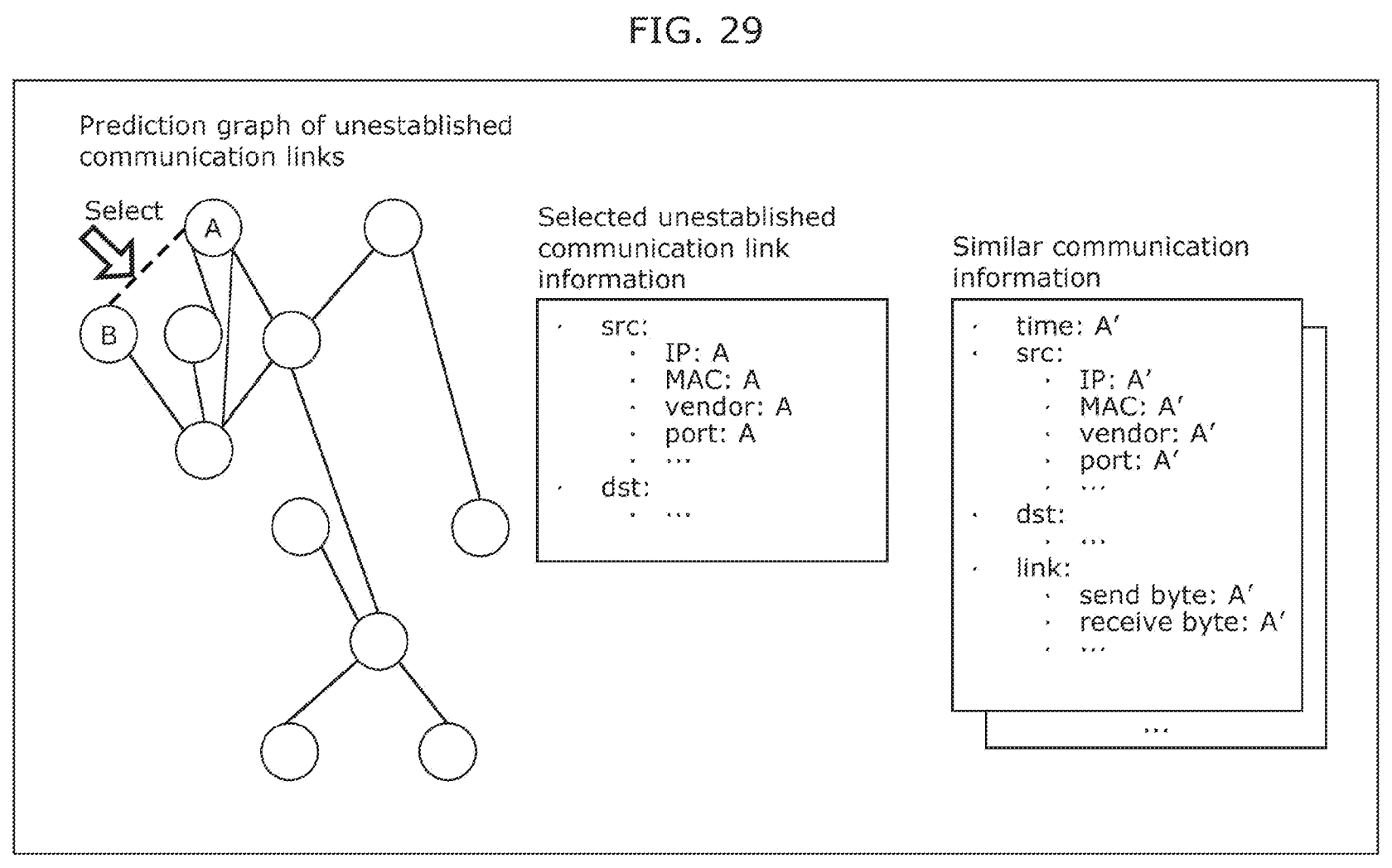

FIG. 29 is a diagram illustrating another example of screen information to be displayed on the screen for analysis of unestablished communication links according to Embodiment 2. FIG. 29 illustrates one example of the screen displayed when one unestablished communication link is selected on the screen illustrated in FIG. 28.

In the example of the screen illustrated in FIG. 29, selected unestablished communication link information and similar communication information are shown as comparison information. The selected unestablished communication link information is information regarding the unestablished communication link selected. The similar communication information is past communication information of a terminal similar to a terminal of the unestablished communication link selected, and is past communication information regarding communication (similar communication) that indicates at least one past communication link of the similar terminal used in the unestablished communication link selection process described above.

When the comparison information is shown in this manner, an analyst may be able to easily analyze the unestablished communication link predicted to be established as a normal communication link in the future.

In the present exemplary embodiment, an analyst can analyze, using the comparison information shown on the screen such as that illustrated in FIG. 29 and asset information, etc., separately held by himself or herself, the unestablished communication link selected, and consider whether to add, to whitelist 22, the unestablished communication link selected.

2.3.2 Example of Screen after Analysis of Unestablished Communication Link

The following will describe an example of a screen displayed after the unestablished communication link is analyzed using the screen information illustrated in FIG. 28 and FIG. 29.

Figure 30:
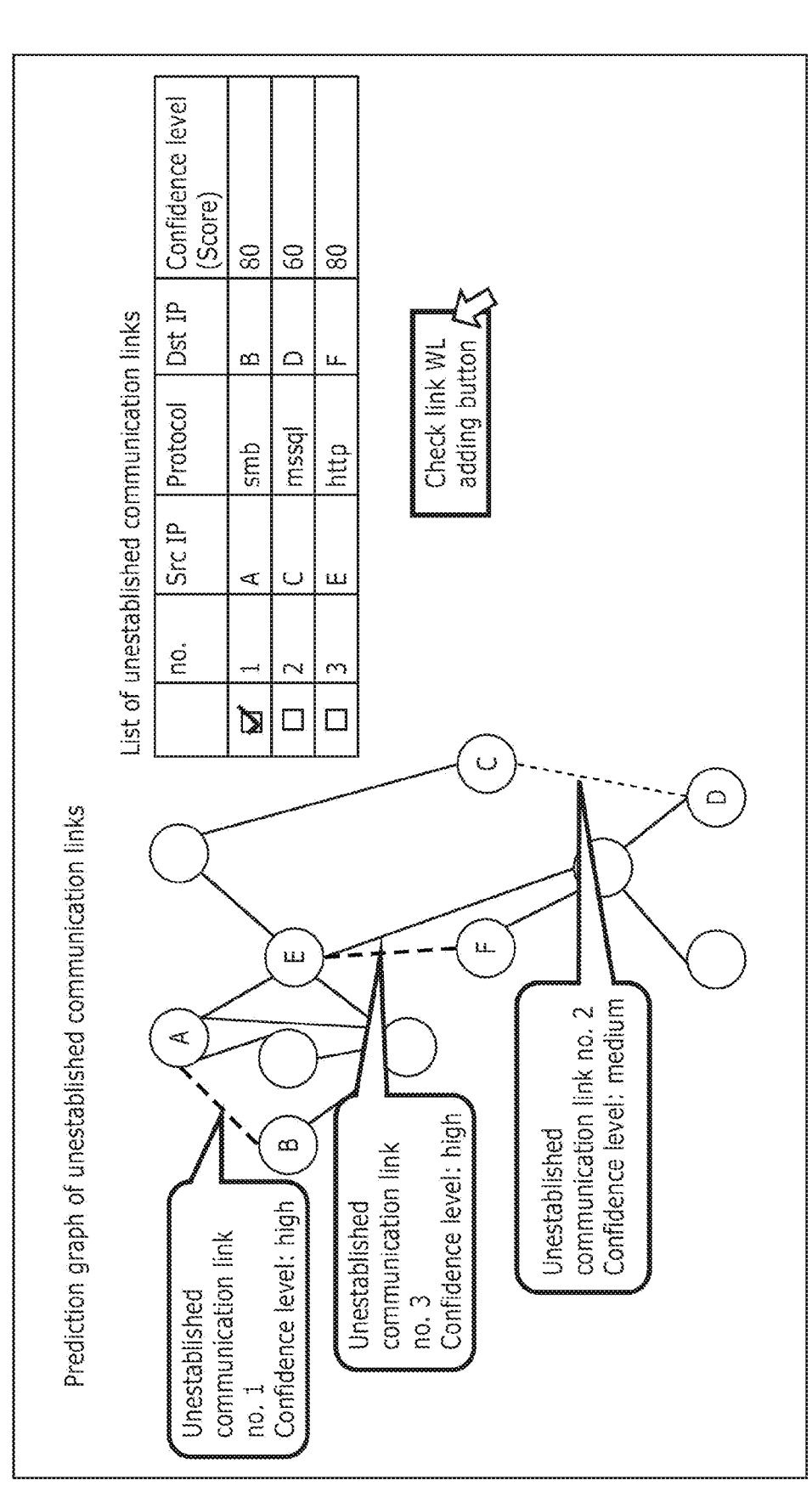
FIG. 30 is a diagram illustrating one example of screen information to be displayed on a screen when showing a prediction result of unestablished communication links according to Embodiment 2.

FIG. 30 is a diagram illustrating one example of screen information to be displayed on the screen when showing a prediction result of unestablished communication links according to Embodiment 2. The screen information illustrated in FIG. 30 is one example of the graph information created by communication link prediction graph creation system 25.

FIG. 30 shows one example of the case where checkboxes are displayed that allow a user to select whether to add, to whitelist 22, the respective unestablished communication links indicated in the list of unestablished communication links. Furthermore, in FIG. 30, as one example of the case where a button for adding the unestablished communication link selected by using the checkbox to whitelist 22 is displayed, a check link WL adding button is displayed.

It is sufficient that after the analysis, the analyst select a checkbox for an unestablished communication link that is to be added to whitelist 22 among the unestablished communication links indicated in the list of unestablished communication links illustrated in FIG. 30, and press the check link WL adding button. Accordingly, WL change operator 2508 adds, to whitelist 22, the unestablished communication link that is to be added.

In this manner, by a simple operation, an analyst can add, to whitelist 22, an unestablished communication link to be added that is predicted to be established as a normal communication link in the future.

2.3.3 Example of Screen for Adjusting Display Range of Prediction Graph

Figure 31:
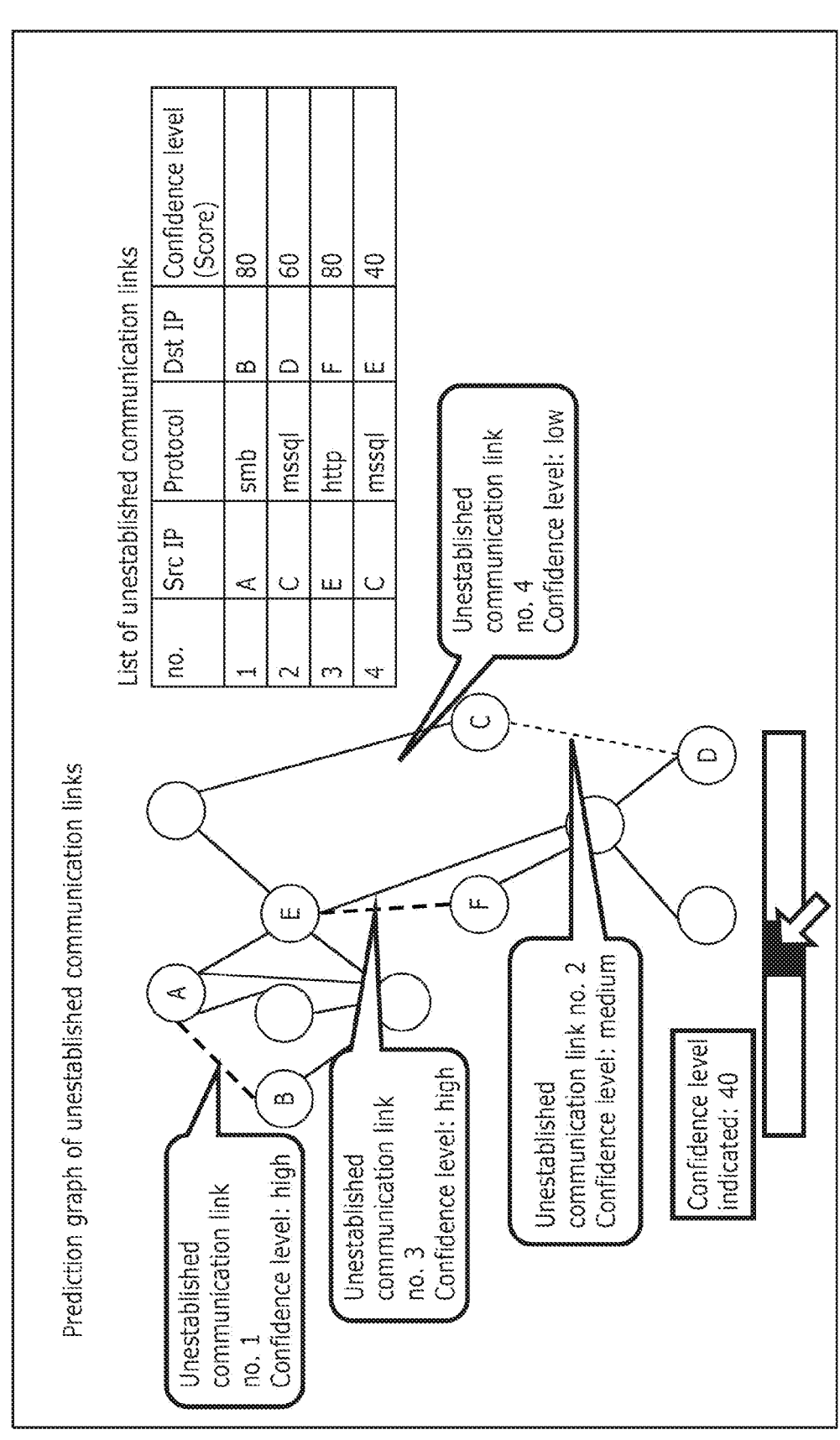
FIG. 31 is a diagram illustrating one example of screen information to be displayed on a screen when adjusting the display range of a graph of unestablished communication links according to Embodiment 2.

FIG. 31 is a diagram illustrating one example of screen information to be displayed on the screen when adjusting the display range of the graph of unestablished communication links according to Embodiment 2. The screen information illustrated in FIG. 31 is one example of the graph information created by communication link prediction graph creation system 25. Furthermore, the screen information illustrated in FIG. 31 includes a scrollbar for allowing NW graph display 2507 to perform the operation to adjust the threshold value of the confidence level of the unestablished communication link. According to the threshold value changed by an analyst operation on the scrollbar, the unestablished communication link and the information regarding the unestablished communication link that are shown in the NW graph are updated and displayed on the screen. Note that with the default settings, the position of the scrollbar has been adjusted so that approximately several unestablished communication links are displayed.

In this manner, in the example illustrated in FIG. 31, the display range of the unestablished communication link and the information regarding the unestablished communication link can be adjusted by the operation on the scrollbar, and thus it may be possible to facilitate the analysis of the unestablished communication link predicted to be established as a normal communication link in the future. Accordingly, it may be possible to facilitate the determination of whether to add, to whitelist 22, the unestablished communication link predicted to be established as a normal communication link in the future.

2.4 Advantageous Effects, Etc

If the operation is started with whitelist 22 that has not undergone sufficient learning, there may be a large number of false detections in which that non-WL communication links that are actually normal are falsely detected as non-WL communication links. Furthermore, it is difficult to manually add information of a normal communication link included in the equipment information or the like to whitelist 22 that has not undergone sufficient learning before the start of operation because there are innumerable communication links that have not been established in the learning period.

In this regard, with the communication analysis system according to Embodiment 2 described above, an unestablished communication link that had not been established in the learning period, but is likely to be a normal communication link can be analyzed and added to whitelist 22 before whitelist 22 is put into operation.

Specifically, before the operation, communication analysis system 20A extracts an unestablished communication link that had not been established in the learning period, had not been learned (in other words, is not included in whitelist 22), and is likely to be a normal communication link. Subsequently, communication analysis system 20A creates, as graph information to be presented to an analyst, information that can be used to determine whether to add the unestablished communication link to whitelist 22. Thus, an unestablished communication link that had not been established in the learning period, but is likely to be a normal communication link can be added to whitelist 22 before whitelist 22 is put into operation. As a result, it is possible to reduce false detections that may occur during the operation, meaning that whitelist 22 can be efficiently used in the operation; thus, an analyst can easily check the validity of non-WL communication that is established during the operation.

Other Possible Embodiments

The communication analysis system, the analysis method, and the recording medium according to one aspect of the present disclosure have been described thus far based on the exemplary embodiments, but the present disclosure is not limited to these exemplary embodiments. Various modifications to the present exemplary embodiments and forms configured by combining structural elements in different exemplary embodiments that can be conceived by those skilled in the art are included within the scope of the present disclosure as long as these do not depart from the essence of the present disclosure. For example, the following cases are also included in the present disclosure.

(1) The above exemplary embodiment has described an example where a similar terminal is extracted using the machine learning model, but a similar terminal may be extracted (determined) by a predetermined rule.

In this case, in accordance with the basic idea that terminal similarity equals role similarity, a similar terminal can be extracted using, as the predetermined rule mentioned above, a rule for categorizing terminals by the same role.

The role similarity can be determined using protocols being used, servers or clients, segment information, and the like as elements.

Note that when there are other construction contract documents, specifically, documents submitted by a vendor upon construction of equipment, a similar terminal may be determined according to the role of a terminal identified from the construction contract documents, instead of using the aforementioned elements.

FIG. 32 is a diagram illustrating a description example of a construction contract document for a building. As illustrated in FIG. 32, the name of equipment is stated for each terminal indicated by an IP address, and details described in association with the name of equipment show the role of the terminal.

Figure 33:
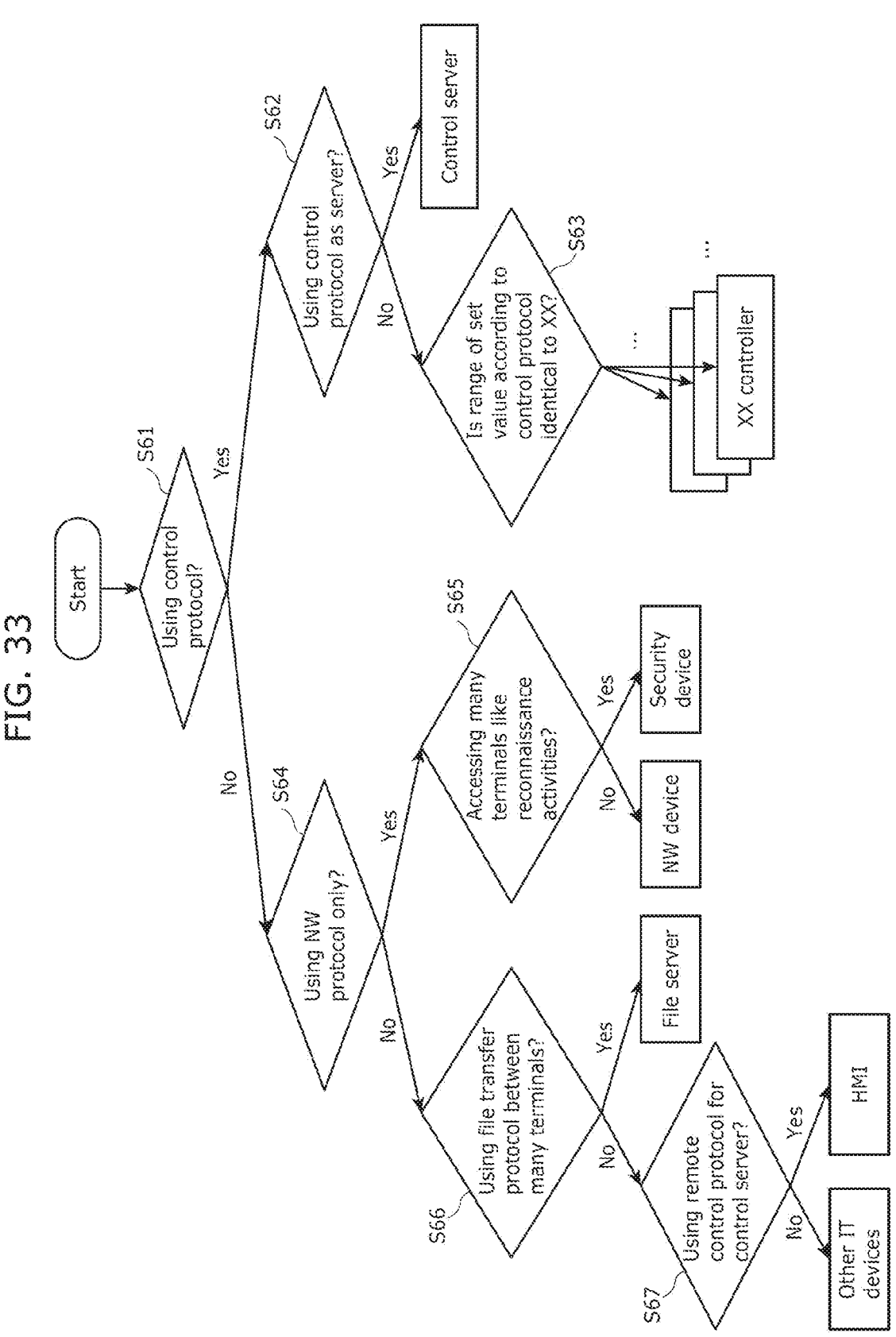
FIG. 33 is a flowchart illustrating processes to be performed when determining a similar terminal using a predetermined rule.

FIG. 33 is a flowchart illustrating processes to be performed when determining a similar terminal using a predetermined rule. In Step S61, Step S64, Step S66, and Step S67, the processes for categorizing the roles of terminals by the protocol being used are performed. In Step S62 and Step S63, the processes for categorizing the roles of terminals as a server or a client by how the control protocol is used are performed. Note that in Step S65, the process for categorizing the roles of terminals as a security device or a NW device by how an access is made, for example, is performed.

Note that the predetermined rule indicated in FIG. 33 is one example and is not limited thereto.

For example, when there are construction contract documents, it is sufficient that the predetermined rule be supplemented with details described in the construction contract documents. Even terminals placed into the same category may have different roles on different production lines. Therefore, the predetermined rule may be created such that terminals belonging to different segments are determined as having different roles even when the terminals belong to the same category.

(2) Furthermore, above Embodiment 2 has described an example where an unestablished communication link is extracted using the machine learning model, but an unestablished communication link may be extracted (determined) by a predetermined rule.

In this case, the result of categorizing terminals by the predetermined rule as described thus far in (1) can be used.

Furthermore, for example, when at least X terminals categorized as having role A perform specific communication with terminals categorized as having role B different from role A, it is likely that a terminal having role A will perform said specific communication with a terminal having role B. This means that the communication link between the terminal having role A and the terminal having role B is likely to be established via said specific communication. Therefore, the use of the value of X makes it possible to determine a confidence level of a communication link that has not been established. This confidence level is, in other words, how likely (what chances) the unestablished communication link will be established in the future.

Note that gradual threshold values may be empirically set to determine a confidence level.

Furthermore, the value of the confidence level may be weighted and adjusted for each group, that is, each of a plurality of terminals categorized as having the same role. For example, when the role is "other IT devices and the like", the number of terminals categorized as the same group increases, meaning that the weighting factor may be reduced. Such weighting allows for creation of a predetermined rule for extracting only an unestablished communication link having a high confidence level.

It is sufficient that an unestablished communication link having a confidence level greater than or equal to a set threshold value be eventually presented to a user as a target to be added to whitelist 22.

For example, assume that X is the number of events of set value changing communication performed between paired terminals from group A to group B, the weighting for group A is 0.8, and the weighting for group B is 0.9. In this case, Score, which indicates a confidence level of the set value changing communication being performed via a communication link that has not been established, can be calculated as follows.

$$Score = X*(0.8)*(0.9)$$

Furthermore, a communication link satisfying 0≤Score where θ is the threshold value can be extracted as a communication link between paired terminals that have not performed the set value changing communication between group A and group B (an unestablished communication link).

(3) Some or all of the structural elements included in the communication analysis system described may be specifically a computer system configured of a microprocessor, read only memory (ROM), random access memory (RAM), a hard disk unit, a display unit, a keyboard, and a mouse, for example. A computer program is recorded on the RAM or the hard disk unit. Each of the devices achieves its function as a result of the microprocessor operating according to the computer program. Here, the computer program is configured of a combination of command codes indicating instructions to the computer in order to achieve a predetermined function.

(4) Some or all of the structural elements included in the communication analysis system described above may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function as a result of the microprocessor operating according to the computer program.

(5) Some or all of the structural elements included in the communication analysis system described above may be implemented as a standalone module or an IC card that can be inserted into and removed from the device. The IC card or the module is a computer system configured of a microprocessor, ROM, and RAM, for example. The IC card or the module may include the aforementioned super multifunctional LSI. The IC card or the module achieves its functions as a result of the microprocessor operating according to the computer program. The IC card and the module may be tamper-proof.

INDUSTRIAL APPLICABILITY

The present disclosure can be used in communication analysis systems, analysis methods, and recording media, and can be used particularly in a communication analysis system, an analysis method, and a recording medium for easily analyzing whether a non-whitelist communication link is anomalous.

The invention claimed is:

1. A communication analysis system for analyzing communication performed in a network of a plurality of terminals in a predetermined environment, the plurality of terminals being a monitoring target, the communication analysis system comprising:

a whitelist created by learning communication established at the monitoring target;

a communication information DB that holds past communication information including information indicating past communication established at the monitoring target; and a communication link prediction graph creation system that creates graph information for determining whether to add, to the whitelist, a communication link of communication that is not included in the whitelist and has not been established in the past communication information, wherein the communication link prediction graph creation system includes:

an information obtainer that obtains the past communication information from the communication information DB;

a prediction target link extractor that extracts an unestablished communication link of communication that has not been established in the past communication information based on the past communication information obtained by the information obtainer, the link including one or more unestablished communication communication links each being a prediction target;

a link confidence level calculator that calculates a confidence level indicating a likelihood that the unestablished communication link extracted by the prediction target link extractor will be established as a normal communication link in the future; and a NW graph creator that creates a NW graph as the graph information for determining whether to add the communication link to the whitelist, using the unestablished communication link extracted by the prediction target link extractor, the confidence level calculated by the link confidence level calculator, and the past communication information obtained by the information obtainer, the NW graph being a graph in which the unestablished communication link and information regarding the unestablished communication link are mapped.

2. The communication analysis system according to claim 1, wherein the communication link prediction graph creation system further includes:

a NW graph display that displays, on a screen, the NW graph created by the NW graph creator; and a WL change operator that adds the communication of the unestablished communication link to the whitelist according to an instruction from a user.

3. The communication analysis system according to claim 2, wherein the NW graph display displays, on the screen, a scrollbar for performing an operation to adjust a threshold value of a confidence level of the unestablished communication link, and displays, on the screen, the NW graph in which the unestablished communication link and the information regarding the unestablished communication link that are shown have been updated according to the threshold value changed by the operation performed by the user on the scrollbar.

4. The communication analysis system according to claim 2, wherein the NW graph displayed on the screen includes a list of the one or more communication links included in the unestablished communication link, the NW graph display displays, on the screen, the list, a checkbox that allows the user to select whether to add each of the one or more communication links in the list to the whitelist, and a button for adding, to the whitelist, a communication link selected by using the checkbox among the one or more communication links.

5. The communication analysis system according to claim 2, wherein the communication link prediction graph creation system further includes:

a WL automatic addition determiner that determines whether the confidence level calculated by the link confidence level calculator is greater than or equal to a threshold value, to determine whether to add the communication of the unestablished communication link to the whitelist, and when the WL automatic addition determiner determines that the confidence level is greater than or equal to the threshold value, the WL automatic addition determiner instructs the WL change operator to add the communication of the unestablished communication link having the confidence level greater than or equal to the threshold value to the whitelist, and causes the WL change operator to add the communication of the unestablished communication link having the confidence level greater than or equal to the threshold value to the whitelist.

6. The communication analysis system according to claim 2, wherein when the user selects one communication link among the one or more communication links included in the unestablished communication link in the NW graph displayed on the screen, the NW graph display displays detailed information of the one communication link selected and detailed information of past communication that is included in the past communication information and is similar to the one communication link selected, side by side on the screen as comparison information for determining whether to add, to the whitelist, the one communication link selected.

7. The communication analysis system according to claim 1, wherein the prediction target link extractor calculates a degree of similarity between the plurality of terminals using a machine learning model that has been trained, and extracts the unestablished communication link using the degree of similarity calculated and the past communication information.

8. The communication analysis system according to claim 7, wherein the link confidence level calculator calculates the confidence level of the unestablished communication link using the machine learning model.

9. The communication analysis system according to claim 7, wherein the machine learning model is generated by learning the communication performed by the monitoring target, using link prediction or a node classification algorithm that allows creation of a vector of a fixed dimension for each terminal that has appeared in the communication and allows creation of a matrix of a fixed size for each communication type that has appeared in the communication.

10. The communication analysis system according to claim 9, wherein the machine learning model includes one of LinkFeat, COMPosition-based multi-relational Graph Convolutional Networks (COMPGCN), Relational Graph Convolutional Network (R-GCN), DistMult, Translating Embeddings for Modeling Multi-relational Data (TransE), Holographic Embeddings of Knowledge Graphs (HolE), or Complex Embeddings for Simple Link Prediction (ComplEx).

11. An analysis method for a computer to analyze communication performed in a network of a plurality of terminals in a predetermined environment, the plurality of terminals being a monitoring target, the analysis method comprising:

obtaining past communication information from a communication information DB that holds the past communication information, the past communication information including information indicating past communication established at the monitoring target;

extracting an unestablished communication link of communication that is not included in a whitelist created by learning communication established at the monitoring target and has not been established in the past communication information based on the past communication information obtained in the obtaining, the unestablished communication link including one or more communication links each being a prediction target;

calculating a confidence level indicating a likelihood that the unestablished communication link extracted in the extracting will be established as a normal communication link in the future; and creating a NW graph as graph information for determining whether to add the communication link to the whitelist, using the unestablished communication link extracted in the extracting, the confidence level calculated in the calculating, and the past communication information obtained in the obtaining, the NW graph being a graph in which the unestablished communication link and information regarding the unestablished communication link are mapped.

12. A non-transitory computer-readable recording medium having recorded thereon a program for causing a computer to perform an analysis method for analyzing communication performed in a network of a plurality of terminals in a predetermined environment, the plurality of terminals being a monitoring target, the program causing the computer to execute:

obtaining past communication information from a communication information DB that holds the past communication information, the past communication information including information indicating past communication established at the monitoring target;

an unestablished extracting communication link of communication that is not included in a whitelist created by learning communication established at the monitoring target and has not been established in the past communication information based on the past communication information obtained in the obtaining, the unestablished communication link including one or more communication links each being a prediction target;

calculating a confidence level indicating a likelihood that the unestablished communication link extracted in the extracting will be established as a normal communication link in the future; and creating a NW graph as graph information for determining whether to add the communication link to the whitelist, using the unestablished communication link extracted in the extracting, the confidence level calculated in the calculating, and the past communication information obtained in the obtaining, the NW graph being a graph in which the unestablished communication link and information regarding the unestablished communication link are mapped.

\* \* \* \* \*